US012387896B2

(12) United States Patent
Mizuma et al.

(10) Patent No.: US 12,387,896 B2
(45) Date of Patent: Aug. 12, 2025

(54) CONTACT DEVICE AND ELECTROMAGNETIC RELAY EQUIPPED WITH SAME

(71) Applicant: Panasonic Intellectual Property Management Co., Ltd., Osaka (JP)

(72) Inventors: Shohei Mizuma, Mie (JP); Masahiro Ito, Mie (JP); Takuma Nakagawa, Mie (JP); Tomokazu Harano, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 283 days.

(21) Appl. No.: 17/801,774

(22) PCT Filed: Feb. 25, 2021

(86) PCT No.: PCT/JP2021/006959
§ 371 (c)(1),
(2) Date: Aug. 23, 2022

(87) PCT Pub. No.: WO2021/177121
PCT Pub. Date: Sep. 10, 2021

(65) Prior Publication Data

US 2023/0162935 A1 May 25, 2023

(30) Foreign Application Priority Data

Mar. 3, 2020 (JP) ................................. 2020-036026

(51) Int. Cl.
*H01H 50/54* (2006.01)
*H01H 50/38* (2006.01)

(52) U.S. Cl.
CPC ............ *H01H 50/54* (2013.01); *H01H 50/38* (2013.01)

(58) Field of Classification Search
None
See application file for complete search history.

(56) References Cited

U.S. PATENT DOCUMENTS 3,887,888 A * 6/1975 Bayles .................... H01H 1/50 335/16
10,636,602 B2 * 4/2020 Iwamoto ................ H01H 50/38
(Continued)

FOREIGN PATENT DOCUMENTS

EP 3611748 A1 2/2020
JP S62-285325 A 12/1987
(Continued)

OTHER PUBLICATIONS

Extended European Search Report dated Jul. 12, 2023 issued in the corresponding European Patent Application No. 21764019.2.
(Continued)

*Primary Examiner* — Bernard Rojas
(74) *Attorney, Agent, or Firm* — Rimon P.C.

(57) ABSTRACT

Provided is a contact device including a first contact, a second contact that is movable relative to the first contact and is brought into contact with or separated from the first contact, a first body part including the first contact, a second body part including the second contact, and a yoke arranged adjacent to at least one of the first body part or the second body part. At least a part of the yoke is arranged along magnetic flux generated by a current flowing through one body part of the first body part and the second body part that is adjacent to the yoke, in a region where the first body part and the second body part overlap each other when viewed along an axis in which the first contact and the second contact move relative to each other while the first contact and the second contact are in contact with each other.

19 Claims, 32 Drawing Sheets

(56) References Cited

U.S. PATENT DOCUMENTS

| | | | | |
|---|---|---|---|---|
| 2012/0175344 | A1* | 7/2012 | Tachikawa | H01H 9/443 218/26 |
| 2013/0021122 | A1* | 1/2013 | Uchida | H01H 1/54 335/131 |
| 2013/0115807 | A1 | 5/2013 | Enomoto et al. | |
| 2013/0222084 | A1 | 8/2013 | Kato | |
| 2017/0032913 | A1* | 2/2017 | Lee | H01H 9/443 |
| 2018/0068818 | A1* | 3/2018 | Itoda | H01H 50/38 |

FOREIGN PATENT DOCUMENTS

| | | | |
|---|---|---|---|
| JP | H05-6644 | U | 1/1993 |
| JP | 2012-104277 | A | 5/2012 |
| JP | 2017-027892 | A | 2/2017 |
| JP | 2020-009675 | A | 1/2020 |

OTHER PUBLICATIONS

International Search Report and Written Opinion issued in International Patent Application No. PCT/JP2021/006959, mailed on May 18, 2021; with partial English translation.

* cited by examiner (a)

(b)

(a)

(b)

(a) (b)

(c)

(a)

(b)

(a)

(b)

CONTACT DEVICE AND ELECTROMAGNETIC RELAY EQUIPPED WITH SAME

CROSS-REFERENCE OF RELATED APPLICATIONS

This application is the U.S. National Phase under 35 U.S.C. § 371 of International Patent Application No. PCT/JP2021/006959, filed on Feb. 25, 2021, which in turn claims the benefit of Japanese Patent Application No. 2020-036026, filed on Mar. 3, 2020, the entire disclosures of which Applications are incorporated by reference herein.

TECHNICAL FIELD

The present invention relates to a contact device and an electromagnetic relay equipped with the contact device.

BACKGROUND ART

A conventional contact device is known to include a fixed contact portion having a fixed contact, and a movable contact portion having a movable contact which moves relative to the fixed contact and can be brought into contact with or separated from the fixed contact, as disclosed in Patent Literature 1.

In Patent Literature 1, bringing the fixed contact and the movable contact into contact with each other and separating them from each other switches between conduction and non-conduction between the fixed contact portion and the movable contact portion.

CITATION LIST

Patent Literature

Patent Literature 1: Japanese Unexamined Patent Application Publication No. 2012-104277

SUMMARY OF THE INVENTION

As in the prior art, when switching between conduction and non-conduction between the fixed contact portion and the movable contact portion by bringing the fixed contact and the movable contact into contact with and separating them from each other, it is preferable to prevent the movable contact and the fixed contact from being affected by an arc generated at contact parting.

It is thus an object of the present disclosure to obtain a contact device capable of preventing contacts from being affected by arcs in a more reliably manner, and an electromagnetic relay equipped with the contact device.

A contact device according to the present disclosure includes a first contact, a second contact that is movable relative to the first contact and is brought into contact with or separated from the first contact, a first body part including the first contact, a second body part including the second contact, and a yoke arranged adjacent to at least one of the first body part or the second body part. At least a part of the yoke is arranged along magnetic flux generated by a current flowing through one body part of the first body part and the second body part that is adjacent to the yoke, in a region where the first body part and the second body part overlap each other when viewed along a axis in which the first contact and the second contact move relative to each other while the first contact and the second contact are in contact with each other.

Advantageous Effects

The present disclosure makes it possible to obtain a contact device capable of preventing contacts from being affected by arcs in more reliable manner, and an electromagnetic relay equipped with the contact device.

DESCRIPTION OF EMBODIMENTS

Figure 1:
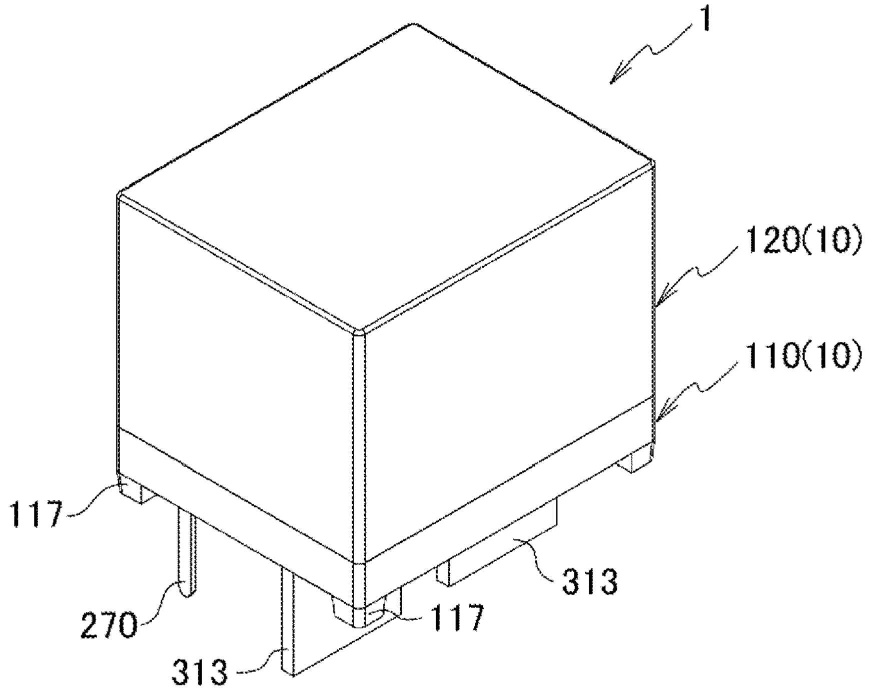
FIG. 1 includes schematic diagrams illustrating an electromagnetic relay according to one embodiment, where (a) is a perspective view viewed from one axis and (b) is a perspective view viewed from another axis.
Figure 1:
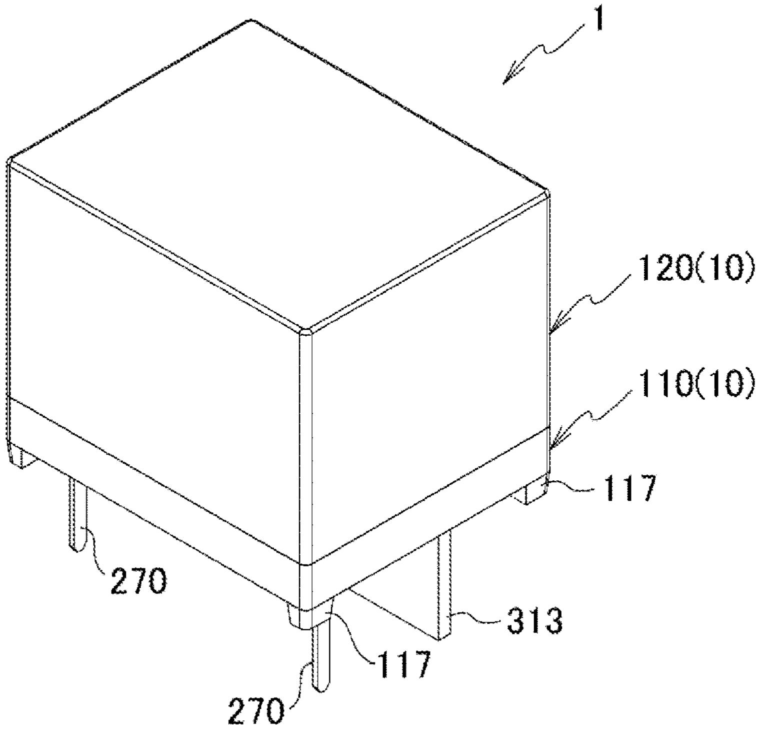

Referring to the drawings, a detailed description is given below of embodiments according to the present disclosure. Note that the longitudinal axis of a movable contact maker is described as a Y axis (width axis; direction in which a current flows through the movable contact maker; first axis). An axis in which a fixed contact and a movable contact face each other is described as an X axis (longitudinal axis; second axis), and an axis orthogonal to the X axis and the Y axis is described as a Z axis (vertical axis; third axis).

A direction in which a tip of a terminal part provided in a fixed contact portion protrudes from a case is described as being below in the vertical axis, a side where the fixed contact is arranged is described as being forward in the longitudinal axis, and a side where the movable contact is arranged is described as being backward in the longitudinal axis.

The following embodiments and modifications thereof include similar components. Thus, in the following description, common reference numerals are assigned to these similar components, and redundant descriptions are omitted.

An electromagnetic relay 1 according to the present embodiment is what is called a normally open type in which contacts are initially in an off state, and includes an electromagnet device (driving unit) 20 arranged backward in the X axis (longitudinal axis; second axis) and a contact device 30 arranged forward in the X axis, as illustrated in FIGS. 1 to 4. The electromagnet device 20 and the contact device 30 are housed in a case 10 formed in a hollow box shape from a resin material. Note that it is also possible to use what is called a normally closed type electromagnetic relay in which the contacts are initially in an on state.

The case 10 includes a base 110 and a cover 120, and has an outer surface in a substantially rectangular parallelepiped shape. The electromagnet device 20 and the contact device 30 are housed in an internal space 51 of the case 10 formed with the cover 120 attached to the base 110.

Note that the shape of the outer surface of the case 10 is not limited to a rectangular parallelepiped shape and may be any shape.

The base 110 includes a base part 111 in a rectangular plate shape extending along a substantially horizontal plane (axis crossing Z axis; XY plane). The base 110 includes a peripheral wall 112 extending upward from the peripheral edge of the base part 111, and a partition wall 113 formed to rise upward from a substantially central part in the X axis (longitudinal axis) (see FIGS. 2 to 4).

Figure 2:
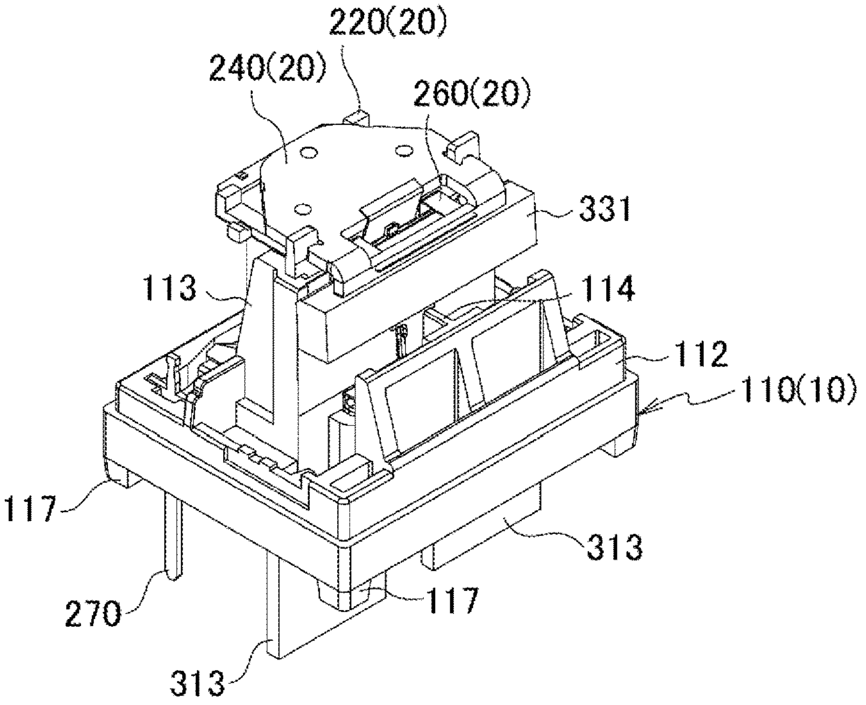
FIG. 2 includes schematic diagrams illustrating the electromagnetic relay according to one embodiment with a cover removed, where (a) is a perspective view viewed from one axis and (b) is a perspective view viewed from another axis.
Figure 2:
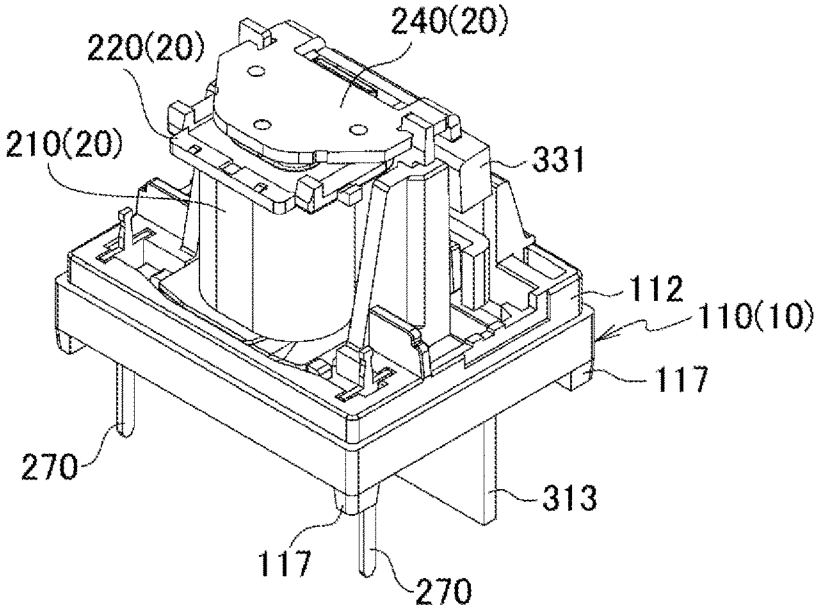
Figure 3:
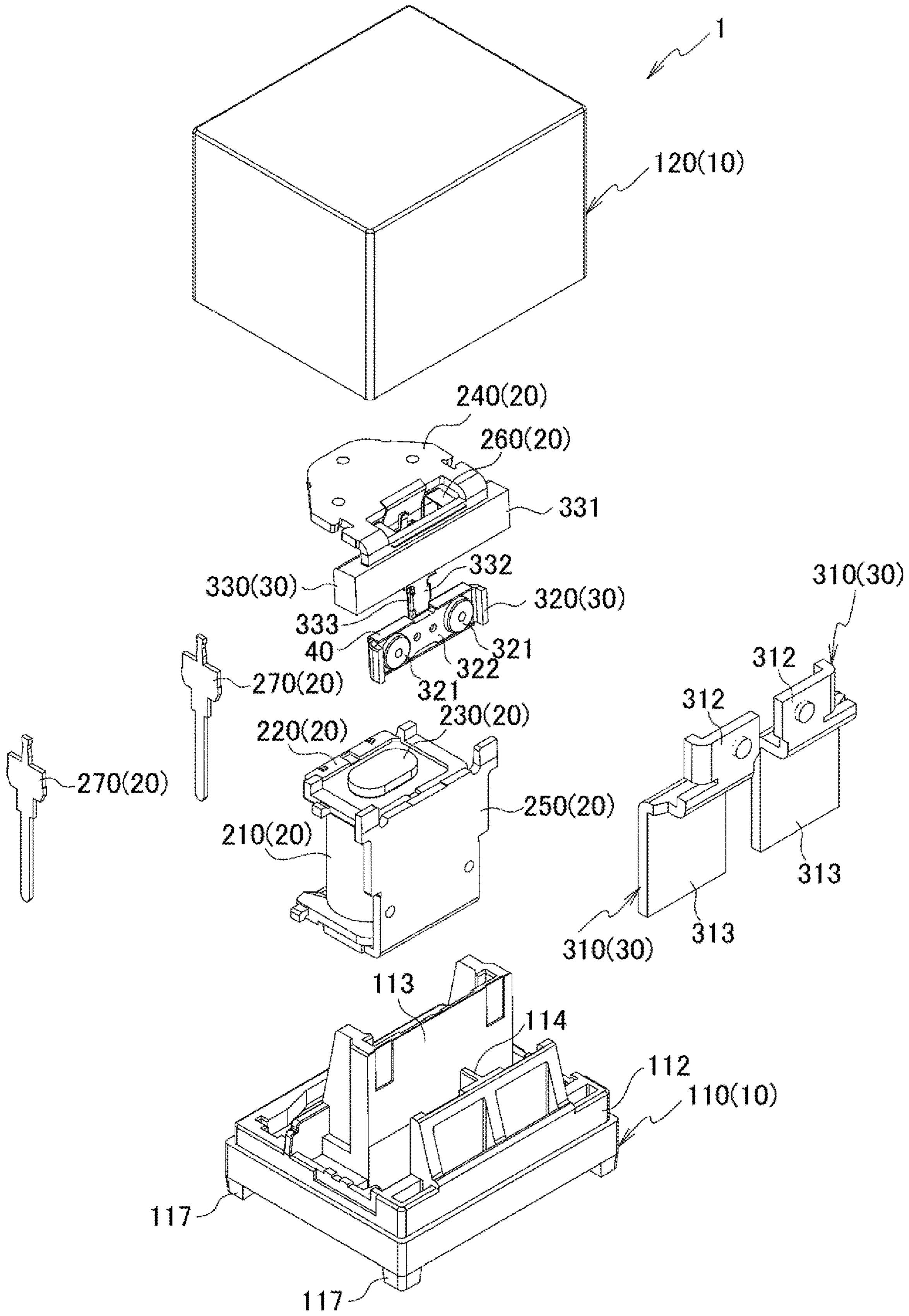
FIG. 3 is a diagram illustrating the electromagnetic relay according to one embodiment when exploded, which is an exploded perspective view viewed from one axis.
Figure 4:
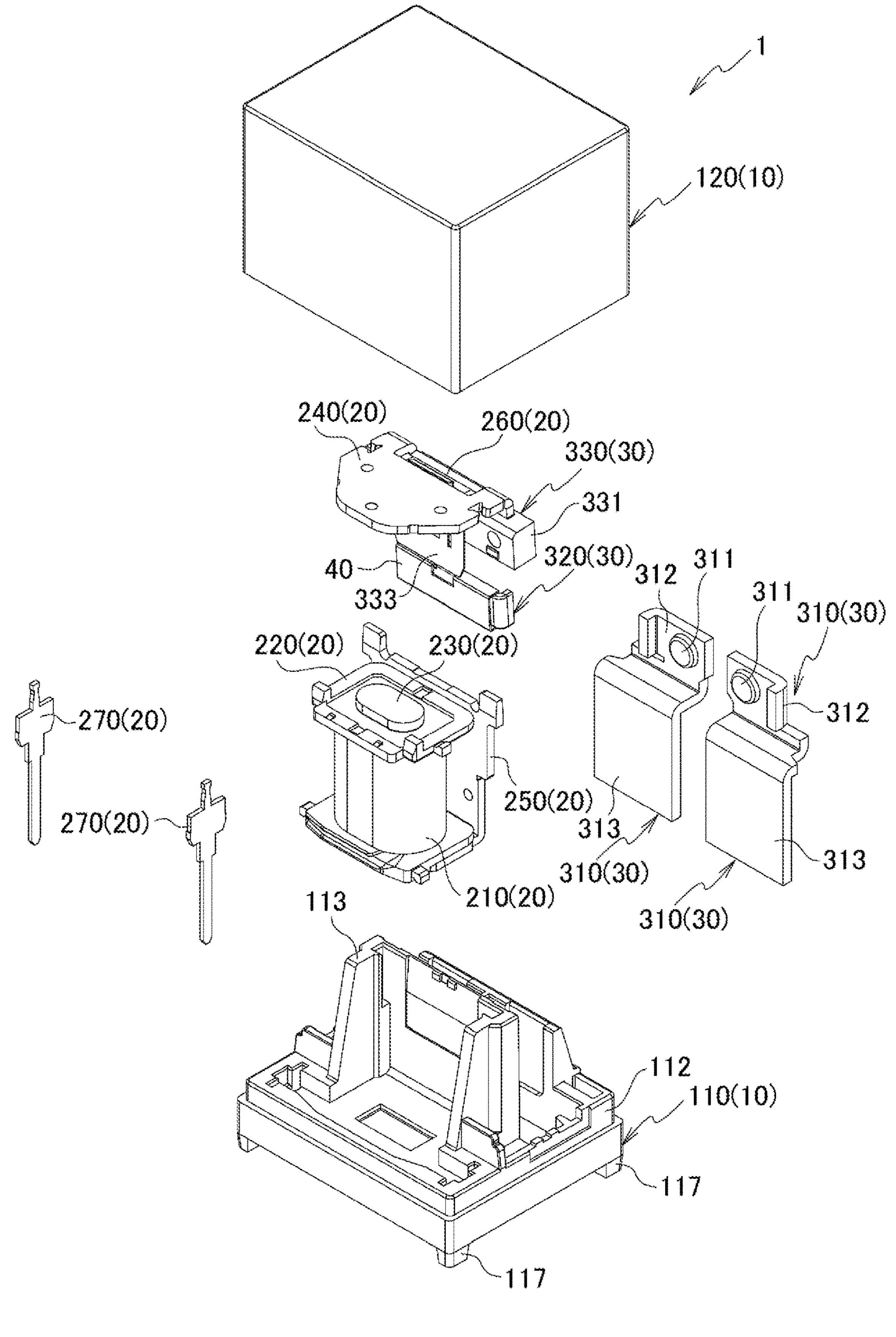
FIG. 4 is a diagram illustrating the electromagnetic relay according to one embodiment when exploded, which is an exploded perspective view viewed from another axis.

The electromagnet device 20 is arranged behind the partition wall 113, and the contact device 30 is arranged in front of the partition wall 113 (see FIGS. 2 to 4).

Meanwhile, the cover 120 has an approximate box shape opened downward, and the cover 120 is attached to the base 110 from above.

As described above, in the present embodiment, the internal space 51 of the case 10 is divided into two sections, front and back, by the partition wall 113 of the base 110. That is, the internal space 51 of the case 10 is divided into a space S2 formed behind the partition wall 113 and housing the electromagnet device 20, and a space S3 formed in front of the partition wall 113 and housing the contact device 30 (see FIGS. 5 and 6).

The base 110 includes a separation wall 114 formed in an approximate T-shape in a plan view in front of the partition wall 113. The separation wall 114 is for securing a creepage distance between a pair of fixed contact portions 310, 310 described later.

Note that reference numeral 117 in FIGS. 1 to 4 is a raising member for providing a gap between the base 110 and a printed circuit board (not illustrated) when the electromagnetic relay 1 is arranged on the printed circuit board.

The electromagnet device (driving unit) 20 is a device for generating electromagnetic force and includes a coil 210 for generating magnetic flux when energized, and a coil bobbin 220 in a hollow cylindrical shape around which the coil 210 is wound (see FIGS. 2 to 4).

As the coil 210, a conductor wire is usable, for example. The coil bobbin 220 is formed from a resin, which is an insulating material, and has an insertion hole penetrating in the Z axis (vertical axis; third axis) formed in a center part of the coil bobbin 220. The coil bobbin 220 includes a drum part in a substantially cylindrical shape, around which the coil 210 is wound on the outer surface thereof, and an upper flange part 222 in a substantially circular shape, which is provided in continuation from the upper end of the drum part to protrude outward in the radial direction of the drum part. Further, the coil bobbin 220 includes a lower flange part 223 in a substantially circular shape, which is provided in continuation from the lower end of the drum part to protrude outward in the radial direction of the drum part.

The electromagnet device 20 includes an iron core (fixed-side member) 230 inserted in the cylinder of the coil bobbin 220 and magnetized by the energized coil 210 (magnetic flux passes through).

The iron core 230 includes a shaft portion in a substantially cylindrical shape extending in the Z axis (vertical axis), and a head part 232 in a substantially cylindrical shape having a diameter larger than that of the shaft portion and provided in continuation from the upper end of the shaft portion (see FIGS. 3 and 4).

The electromagnet device 20 further includes an armature (movable-side member) 240 arranged to face the head part 232 of the iron core 230 in the vertical axis (Z axis).

The armature 240 is formed from a conductive metal and is arranged to be swingable in the vertical axis (Z axis) with respect to the head part 232 of the iron core 230. In the present embodiment, the armature 240 includes a horizontal wall part 241 facing the head part 232 of the iron core 230 in the vertical axis (Z axis), and a vertical wall part 242 extending downward from the front end of the horizontal wall part 241 in the X axis (longitudinal axis) (see FIGS. 5 and 6).

The electromagnet device 20 includes a heel piece 250 arranged around the coil 210 wound around the drum part. The heel piece 250 is a member in a substantially plate shape made from a magnetic material, and has an approximate L-shape in a side view (in a state viewed along the Y axis). That is, in the present embodiment, the heel piece 250 includes a vertical wall part 251 arranged in front of the coil 210 wound around the drum part to extend along a substantially vertical plane, and a horizontal wall part 252 extending backward from the lower end of the vertical wall part 251 (see FIGS. 5 and 6). The above-described heel piece 250 is formable through bending a single plate, for example.

The horizontal wall part 241 of the armature 240 is attached to the upper end of the vertical wall part 251 to be swingable in the vertical axis (Z axis). This enables the armature 240 to rotate in the vertical axis (Z axis) about a section supported by the heel piece 250.

Figure 5:
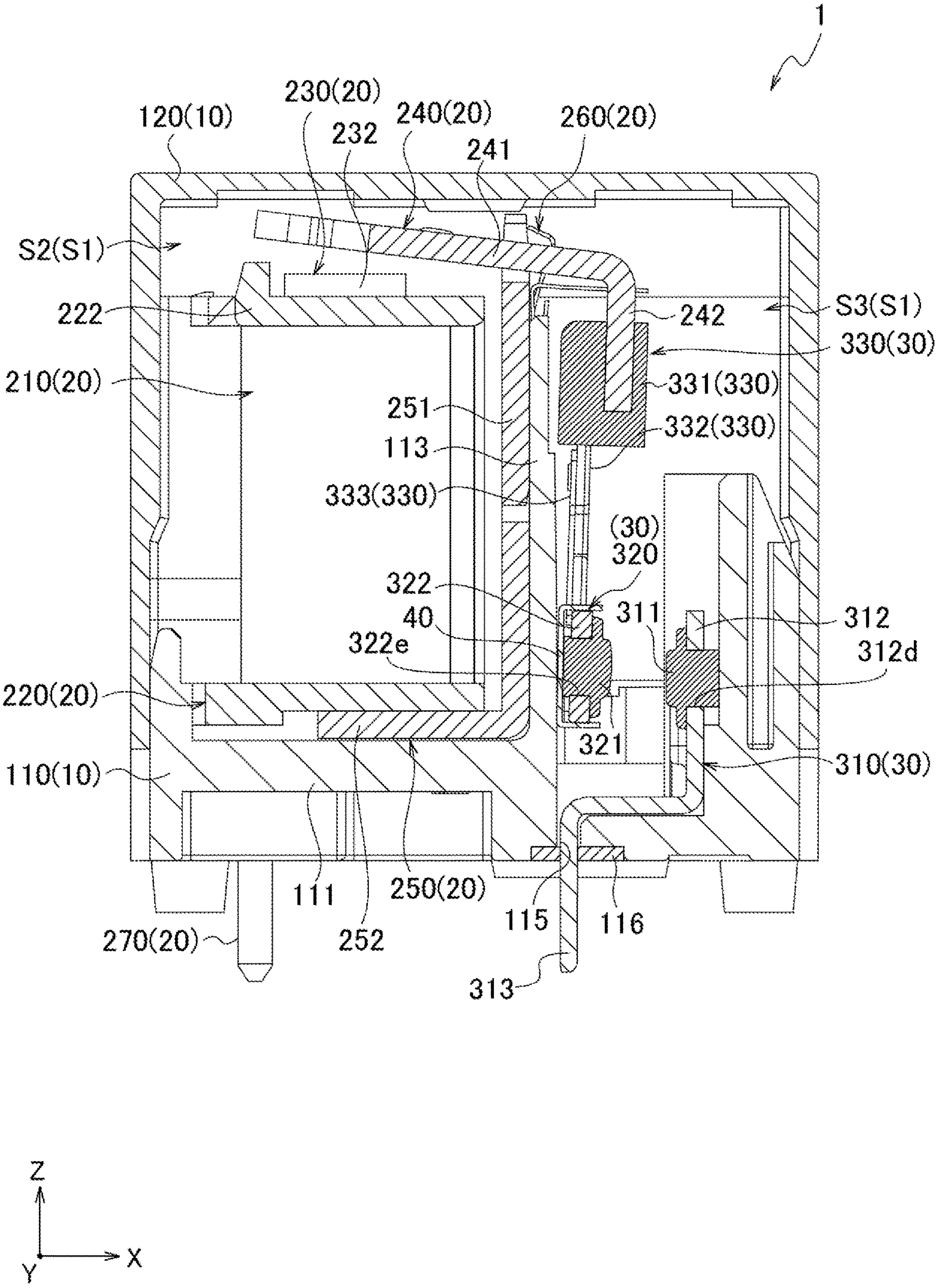
FIG. 5 is a rear schematic diagram illustrating a contact device according to one embodiment with contacts in a second position.
Figure 6:
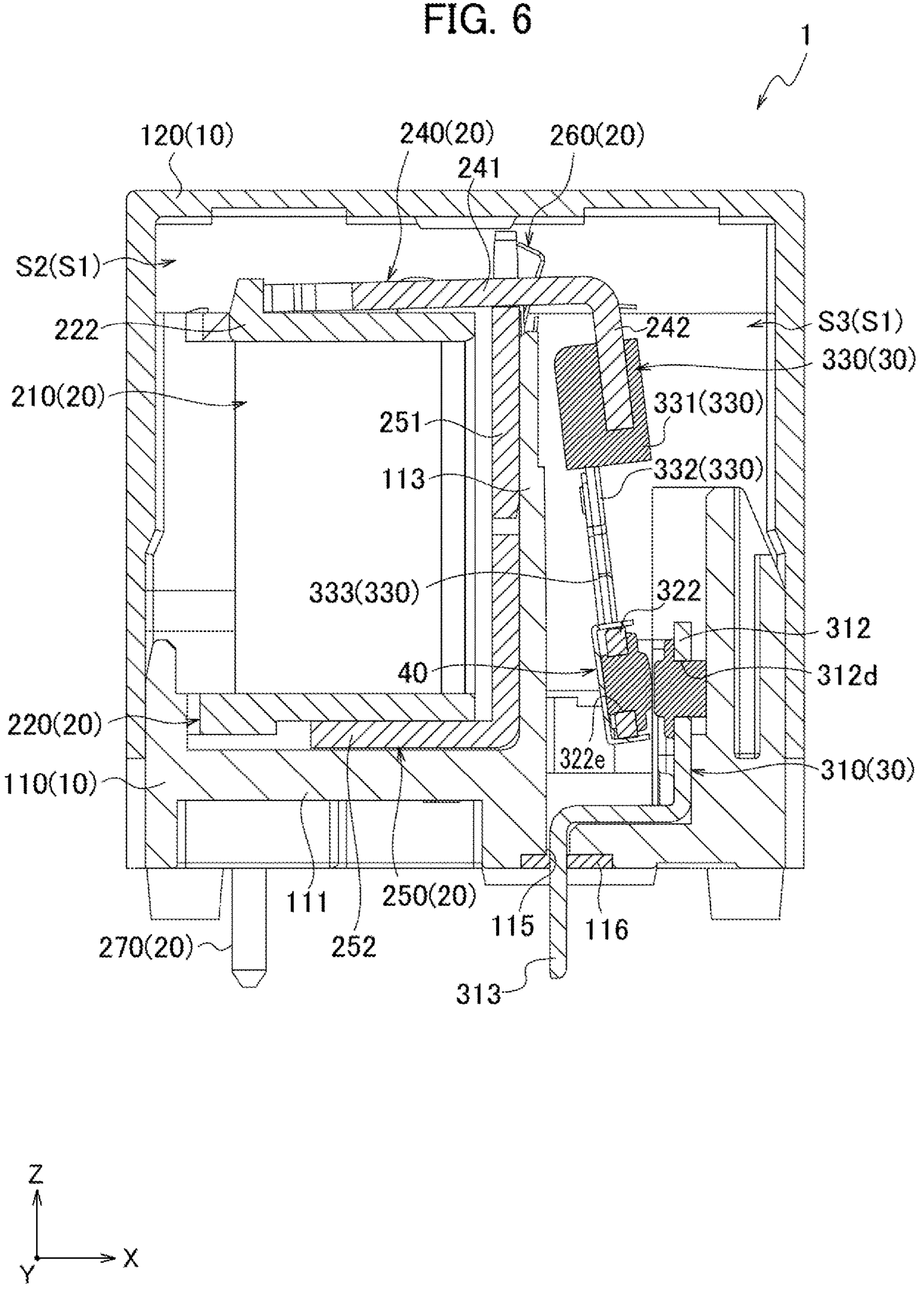
FIG. 6 is a rear schematic diagram illustrating a contact device according to one embodiment with contacts in a first position.

Further, in the present embodiment, the electromagnet device 20 includes a hinge spring 260 mounted over the armature 240 and the heel piece 250 so that the armature 240 is urged by the hinge spring 260 in a direction in which the horizontal wall part 241 separates from the head part 232 of the iron core 230 (see FIGS. 5 and 6).

The electromagnet device 20 is fixed to the coil bobbin 220 and includes a pair of coil terminals 270 to which both ends of the coil 210 are connected. The electromagnet device 20 is driven by energizing the coil 210 through the pair of coil terminals 270.

Specifically, the horizontal wall part 241 of the armature 240 is attracted to the head part 232 of the iron core 230 by energizing the coil 210, and the armature 240 is rotated so that the horizontal wall part 241 approaches the head part 232 of the iron core 230. That is, energizing the coil 210 through the pair of coil terminals 270 causes the horizontal wall part 241 of the armature 240 to rotate downward in the Z axis (vertical axis). Here, the vertical wall part 242 provided in continuation from the horizontal wall part 241 rotates forward in the X axis (longitudinal axis).

The swing range of the armature 240 is set between a position where the horizontal wall part 241 is farthest from the head part 232 of the iron core 230 and a position where the horizontal wall part 241 is closest to the head part 232 of the iron core 230.

In the present embodiment, the swinging range of the armature 240 is set between an initial position where the horizontal wall part 241 is arranged above the head part 232 of the iron core 230 with a predetermined gap therebetween and a contact position where the horizontal wall part 241 comes in contact with the head part 232 of the iron core 230.

Thus, in the present embodiment, when the coil 210 is energized, the armature 240 moves to the contact position where the horizontal wall part 241 comes in contact with the head part 232 of the iron core 230, and when the energization to the coil 210 is stopped, the armature 240 returns to the initial position with the urging force of the hinge spring 260.

As described above, the armature 240 according to the present embodiment is arranged to face the head part 232 of the iron core 230 with a predetermined gap therebetween when the coil 210 is not energized, and swings to be attracted toward the head part 232 of the iron core 230 when the coil 210 is energized.

By switching the driving state of the electromagnet device 20, it is possible to switch between conduction and non-conduction between the fixed contact portions 310 and the movable contact portion 320, which are paired with each other (having contacts that contact and separate from each other).

In the present embodiment, the contact device 30 is provided in front of the electromagnet device 20 to open and close the contacts as the coil 210 is energized and de-energized.

The contact device 30 includes the fixed contact portions (first contact portion) 310 and the movable contact portion (second contact portion) 320. The fixed contact portions 310 each include a fixed contact (first contact) 311 and a body part (first body part) 312 having the fixed contact 311. In contrast, the movable contact portion 320 includes movable contacts (second contact) 321 that move relative to the fixed contacts 311 and are able to contact with and separate from the fixed contacts 311, and a movable contact maker (second body part) 322 having the movable contacts 321.

In the present embodiment, the contact device 30 includes only one pair of the fixed contact portions 310 and the movable contact portion 320 paired with each other (having contacts that contact with and separate from each other) (see FIGS. 3 and 4).

In the present embodiment, the set of the fixed contact portions 310 and the movable contact portion 320 having contacts to be brought into contact with and separated from each other is composed of the pair of fixed contact portions 310 and one movable contact portion 320.

Specifically, two fixed contact portions 310 having a shape symmetrical to the XZ plane are the pair of fixed contact portions 310. The paired two fixed contact portions 310 are fixed to the base 110 (case 10) while being spaced apart in the Y axis (width axis; first axis).

Figure 7:
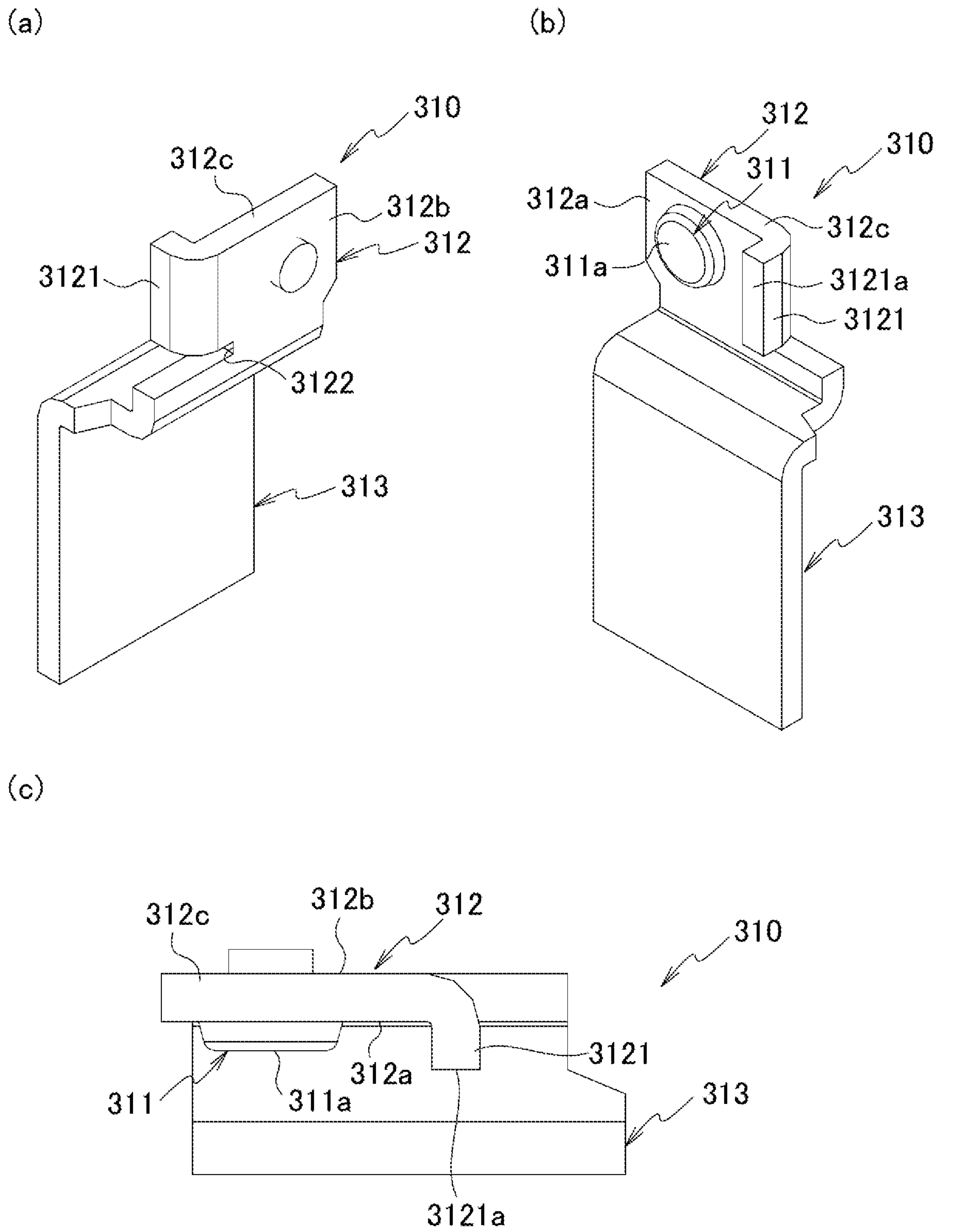
FIG. 7 includes diagrams illustrating a fixed contact portion according to one embodiment, where (a) is a perspective view viewed from one axis, (b) is a perspective view viewed from another axis, and (c) is a plan view.
Figure 8:
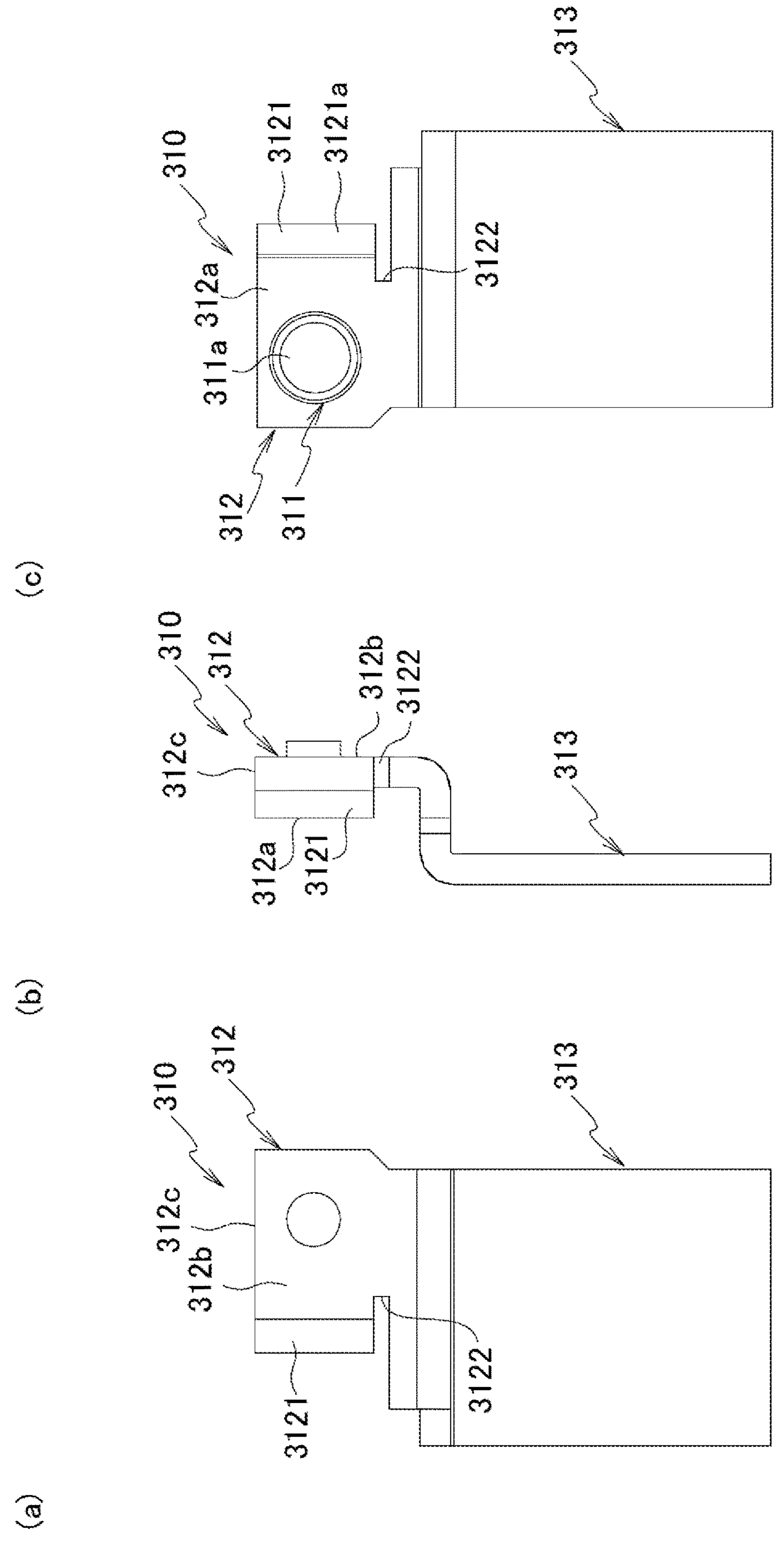
FIG. 8 includes diagrams illustrating a fixed contact portion according to one embodiment, where (a) is a rear view, (b) is a side view, and (c) is a front view.

Each of the fixed contact parts 310 includes the body part 312 having one fixed contact 311 (see FIGS. 7 and 8). In the present embodiment, a member intended to be a fixed contact is inserted in an insertion hole 312*d*, which is formed to penetrate the body part 312 in the plate thickness axis, rivet joining is carried out thereon, and thus the body part 312 has the fixed contact 311 (see FIGS. 5 and 6). As described above, in the present embodiment, the body part 312 has a function as a fixed-side contact holder for holding the fixed contact 311.

Note that the formation of the fixed contact 311 on the body part 312 is not limited to using rivet joining and can be performed with various methods. For example, it is possible to make a section, which is made to protrude through a doweling process performed on the body part 312, function as a fixed contact. It is also possible to make a part of the flat surface of the body part 312 function as a fixed contact by adopting a configuration with which the movable contact 321 is brought into contact with the part of the flat surface of the body part 312

Each of the fixed contact portions 310 includes a terminal part 313 provided in continuation from the lower end of the body part 312 to be fixed to the base 110 (case 10) with the tip thereof protruding outward (downward) from the base 110 (case 10).

In the present embodiment, the base 110 has an insertion hole 115 formed to penetrate in the Z axis (vertical axis). The tip (lower end) of each terminal part 313 is inserted in the insertion hole 115 from above, and each fixed contact portion 310 is fixed to the base 110 (case 10) with the tip (lower end) of the terminal part 313 protruding outward (downward) from the base 110 (see FIGS. 5 and 6). In the present embodiment, the fixed contact portions 310 are fixed to the base 110 (case 10) using an adhesive 116.

Here, each fixed contact portion 310 is fixed to the base 110 (case 10) with the fixed contact 311 facing backward in the X axis (longitudinal axis). That is, the fixed contact portion 310 is fixed to the base 110 (case 10) with a surface 312*a* of the body part 312 on which the fixed contact 311 is formed (rear surface; first surface; surface facing the movable contact 321) facing backward.

Note that the fixed contacts 311, the body parts 312, and the terminal parts 313 are formable from a conductive material, such as a copper-based material.

As described above, in the present embodiment, the two fixed contacts (first contact) 311 are arranged side by side in the Y axis, which is an axis orthogonal to (intersecting with) the axis in which the fixed contacts (first contact) 311 and the movable contact (second contact) 321 move relative to each other. One of the two body parts (first body part) 312 has one of the fixed contacts (first contact) 311, and the other of the two body parts has the other of the fixed contacts (first contact) 311.

Figure 9:
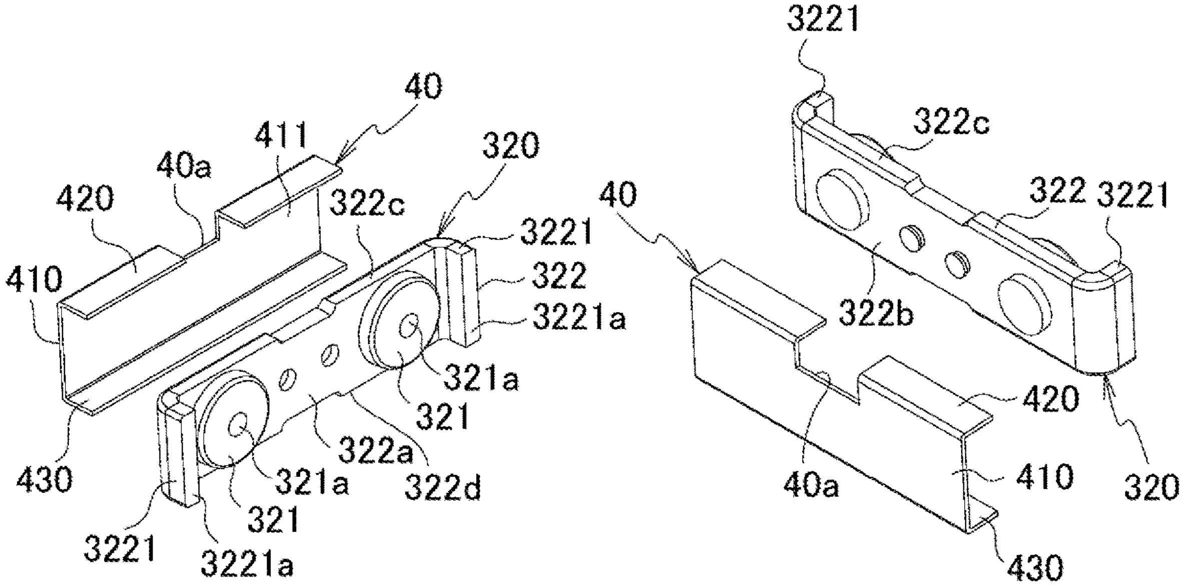
FIG. 9 includes schematic diagrams illustrating a movable contact maker according to one embodiment before a yoke is attached thereto, where (a) is a perspective view viewed from one axis, (b) is a perspective view viewed from another axis, and (c) is a side view.
Figure 9:
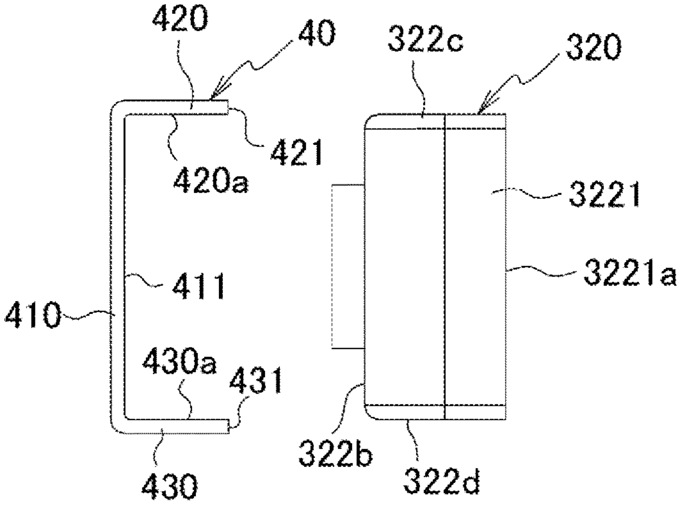
Figure 10:
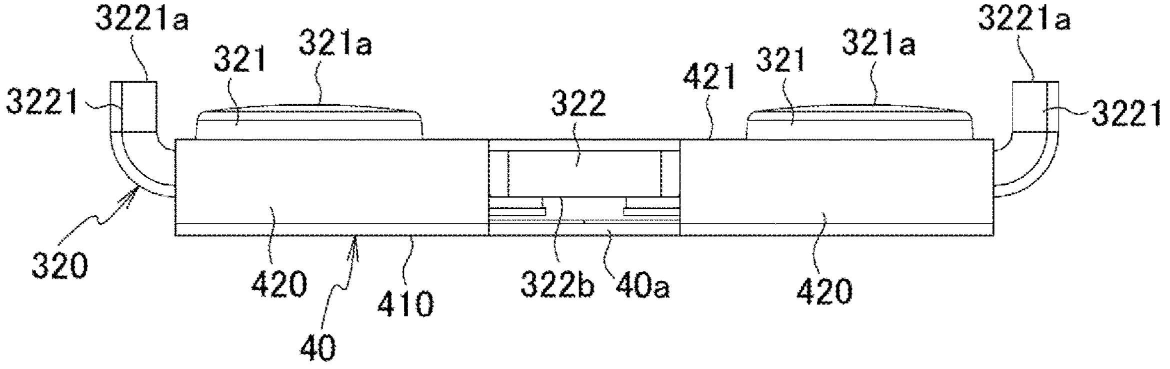
FIG. 10 includes schematic diagrams illustrating the movable contact maker according to one embodiment with the yoke attached thereto, where (a) is a plan view and (b) is a rear view.
Figure 10:
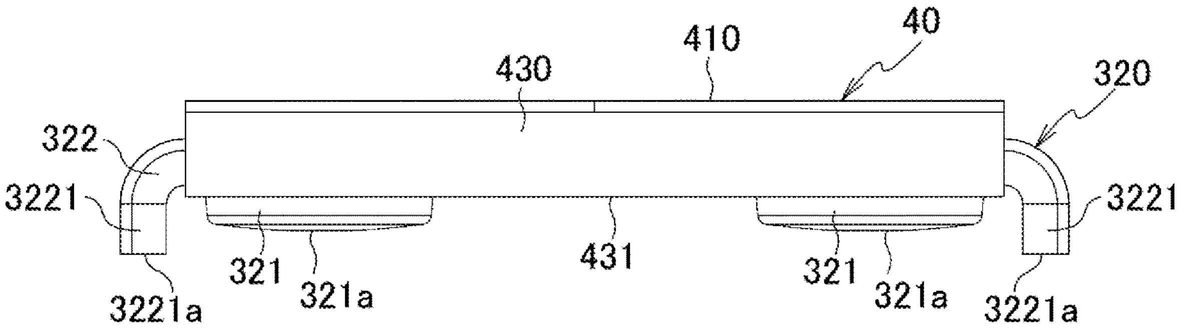
Figure 11:
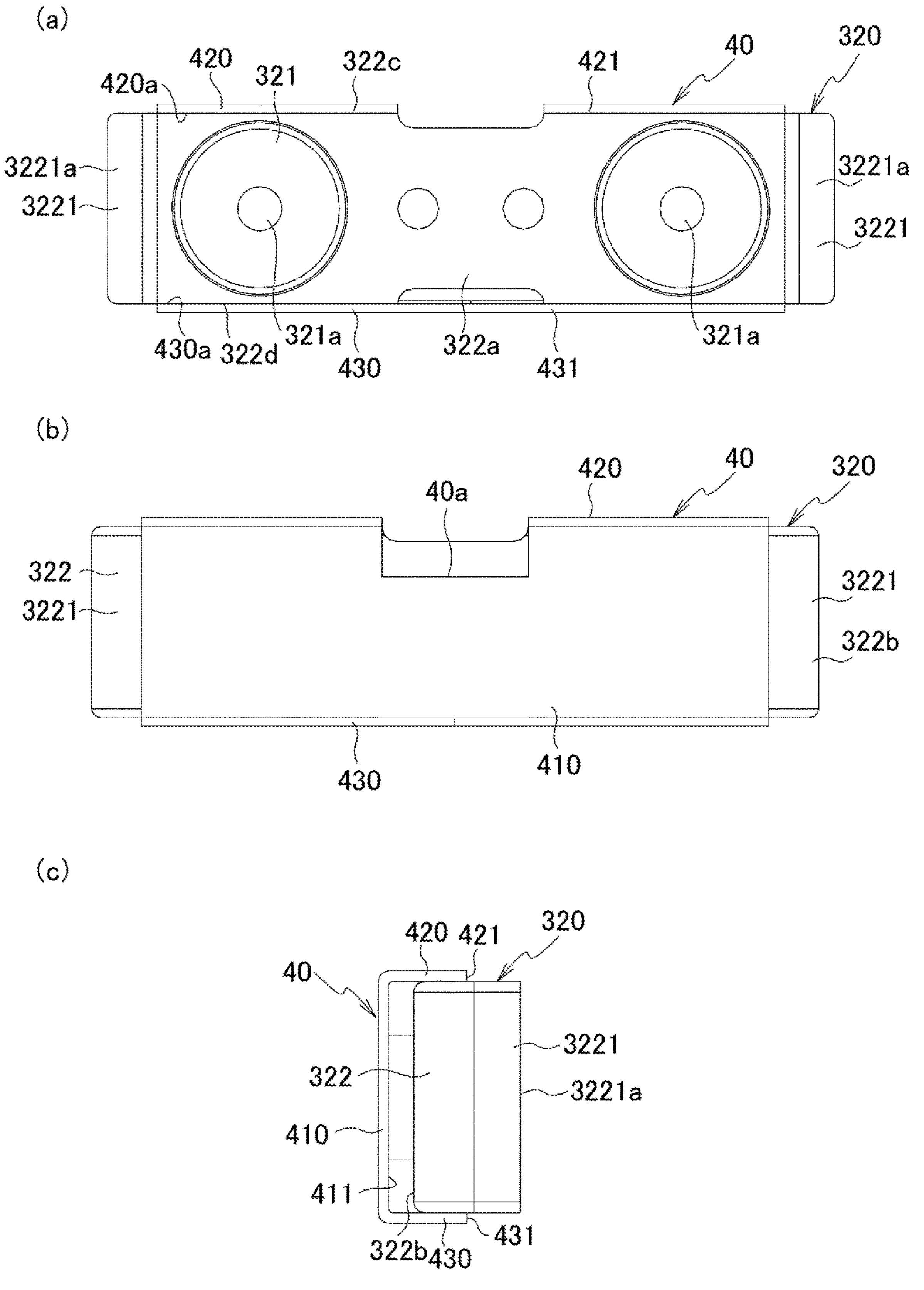
FIG. 11 includes schematic diagrams illustrating the movable contact maker according to one embodiment with the yoke attached thereto, where (a) is a front view, (b) is a rear view, and (c) is a side view.

Meanwhile, the one movable contact portion 320 includes one movable contact maker 322, and the movable contact maker 322 includes a pair of movable contacts 321 arranged side by side in the Y axis (width axis) (see FIGS. 9 to 11).

In the present embodiment, a member intended to be a movable contact is inserted in each of insertion holes 322*e* formed on both ends of the movable contact maker 322, which is in a substantially rectangular plate shape in the longitudinal axis, to penetrate in the thickness axis, rivet joining is carried out thereon, and thus the movable contact maker 322 has the movable contacts 321 (see FIGS. 5 and 6). As described above, in the present embodiment, the movable contact maker 322 has a function as a movable-side contact holder for holding the movable contacts 321.

Note that the formation of the movable contacts 321 on the movable contact maker 322 is not limited to using rivet joining and can be formed with various methods. For example, it is possible to make a section, which is made to protrude through a doweling process performed on the movable contact maker 322, function as a movable contact. It is also possible to make a part of the flat surface of the movable contact maker 322 function as a movable contact by having a configuration to bring the part of the flat surface of the movable contact maker 322 into contact with the fixed contact 311.

The one movable contact portion 320 is arranged to be positioned behind the paired two fixed contact portions 310 in the X axis (longitudinal axis) with the plate thickness axis substantially aligned in the X axis (longitudinal axis) and with the longitudinal axis substantially aligned in the Y axis (width axis) (see FIGS. 3 to 6). Here, the movable contact portion 320 is arranged in such a state that the movable contacts 321 are opposed to the fixed contacts 311 in the X axis (longitudinal axis). Specifically, the movable contact maker 322 is arranged such that the movable contact 321 formed on one side in the Y axis (width axis) is opposed in the X axis (longitudinal axis) to the fixed contact 311 of the fixed contact portion 310 arranged on the one side in the Y axis (width axis). In a similar manner, the movable contact maker 322 is arranged such that the movable contact 321 formed on the other side in the Y axis (width axis) is opposed in the X axis (longitudinal axis) to the fixed contact 311 of the fixed contact portion 310 arranged on the other side in the Y axis (width axis). Thus, one movable contact (second contact) 321 is brought into contact with and separated from one fixed contact (first contact) 311 of the two fixed contacts (first contact) 311, and the other movable contact (second contact) 321 is brought into contact with and separated from the other fixed contact (first contact) 311 of the two fixed contacts (first contact) 311. One movable contact maker (second body part) 322 is made to have two movable contacts (second contact) 321.

Note that the movable contacts 321 and the movable contact maker 322 are formable from a conductive material, such as a copper-based material.

The pair of fixed contact portions 310 and one movable contact portion 320, having the above-described configuration is housed in the above-described space S3 (see FIGS. 5 and 6) as a set.

Here, the movable contact portion 320 is arranged in the space S3 to be swingable in the X axis (longitudinal axis) relative to the pair of fixed contact portions 310.

Specifically, the contact device 30 includes a movable body 330 that swings in the X axis (longitudinal axis) as the armature 240 swings. The movable body 330 holds the movable contact portion 320, and thus the movable contact portion 320 swings in the X axis (longitudinal axis) relative to the pair of fixed contact portions 310.

In the present embodiment, the movable body 330 is formed from an insulating resin material and includes a holder part 331 whose upper part is provided in continuation from the vertical wall part 242 of the armature 240, a movable plate 332 provided in continuation from the lower part of the holder portion 331, and a movable spring 333 connecting the movable plate 332 and the movable contact maker 322.

With such a configuration, the movable contact portion 320 swings in the X axis (longitudinal axis) relative to the pair of fixed contact portions 310 as the armature 240 swings. Thus, the movable contacts 321 pivot in an arc centered on the upper end of the vertical wall part 242.

Therefore, in the present embodiment, the tangential axis of the arc (movement path of the movable contacts 321) drawn by the movable contacts 321 while swinging is the axis in which the fixed contacts (first contact) 311 and the movable contacts (second contact) 321 move relative to each other.

Thus, strictly speaking, the axis in which the fixed contacts (first contact) 311 and the movable contacts (second contact) 321 move relative to each other is different between when the armature 240 is in the initial position and when the armature 240 is in the contact position.

However, in the present embodiment, the angle (central angle) of the arc drawn by the movable contacts 321 while swinging is relatively small, and the movable contacts 321 are configured to be positioned at the lowest end between when the armature 240 is in the initial position and when the armature 240 is in the contact position (see FIGS. 5 and 6). Thus, the tangential axis of the arc drawn by the movable contacts 321 while swinging is substantially parallel to the X axis.

Therefore, in the present embodiment, it is possible for the axis in which the fixed contacts 311 and the movable contacts 321 move relative to each other to be approximated by the X axis (longitudinal axis; axis in which the fixed contact 311 and the movable contact 321 are opposed each other).

Thus, when the axis in which the fixed contacts 311 and the movable contacts 321 move relative to each other is approximated by the X axis, the state seen along the axis in which the fixed contacts (first contact) 311 and the movable contacts (second contact) 321 move relative to each other can also be approximated by the state seen along the X axis. Thus, in the following description, the state seen along the axis in which the fixed contacts (first contact) 311 and the movable contacts (second contact) 321 move relative to each other is in some cases described as the state seen along the X axis.

Next, an example of the operation of the electromagnetic relay 1 (the electromagnet device 20 and the contact device 30) having the above-described configuration is described.

First, when the coil 210 is not energized, the horizontal wall part 241 of the armature 240 moves away from the head part 232 of the iron core 230 through the elastic force of the hinge spring 260. Here, since the vertical wall part 242 of the armature 240 is located behind in the X axis (longitudinal axis), the movable body 330 is also located behind in the X axis (longitudinal axis). That is, the movable contact portion 320 held by the movable body 330 is separated from the fixed contact portions 310, and the movable contacts 321 are separated from the fixed contacts 311 (see FIG. 5).

When the coil 210 is energized from this off state, the horizontal wall part 241 of the armature 240 is attracted downward (the iron core 230 side) by the electromagnetic force and moves close to the head part 232 of the iron ore 230 against the elastic force of the hinge spring 260. The vertical wall part 242 rotates forward with the downward rotation of the horizontal wall part 241 (iron core 230 side), and the movable body 330 rotates forward with the forward rotation of the vertical wall part 242. As a result, the movable contact maker 322 held by the movable body 330 rotates forward toward the fixed contact portion 310, and the movable contacts 321 of the movable contact maker 322 are brought into contact with the fixed contacts 311 of the fixed contact portions 310. Thus, the pair of fixed contact portions 310 are electrically connected by the movable contact portion 320 (see FIG. 6).

In contrast, when the energization to the coil 210 is stopped, the horizontal wall part 241 of the armature 240 rotates upward (away from the iron core 230) due to the urging force of the hinge spring 260 and returns to the initial position.

The vertical wall part 242 rotates backward with the upward rotation of the horizontal wall part 241, and the movable body 330 rotates backward with the backward rotation of the vertical wall part 242. As a result, the movable contact maker 322 held by the movable body 330 rotates backward away from the fixed contact portions 310, and the movable contacts 321 of the movable contact maker 322 are separated from the fixed contacts 311 of the fixed contact portions 310. In this way, the electrical connection between the pair of fixed contact portions 310, 310 is disconnected.

As described above, in the present embodiment, when the armature 240 is in the initial position, the movable contacts 321 and the fixed contacts 311 are separated from each other in a second position (see FIG. 5). In contrast, when the armature 240 is in the contact position, the movable contacts 321 and the fixed contacts 311 are in contact in a first position (see FIG. 6).

Thus, during the period when the coil 210 is not energized, the pair of fixed contact portions 310, 310 are insulated, and during the period when the coil 210 is energized, the pair of fixed contact portions 310, 310 are electrically connected. As described above, in the present embodiment, the movable contacts (second contact) 321 are configured to reciprocate (rotate) in the second axis (X axis; longitudinal axis) relative to the fixed contacts (first contact) 311 between the first position and the second position.

Here, when the movable contacts 321 and the fixed contacts 311 are positioned in the first position in contact with each other, a current I flows through the movable contact maker 322 mainly along the longitudinal axis (Y axis).

Figure 12:
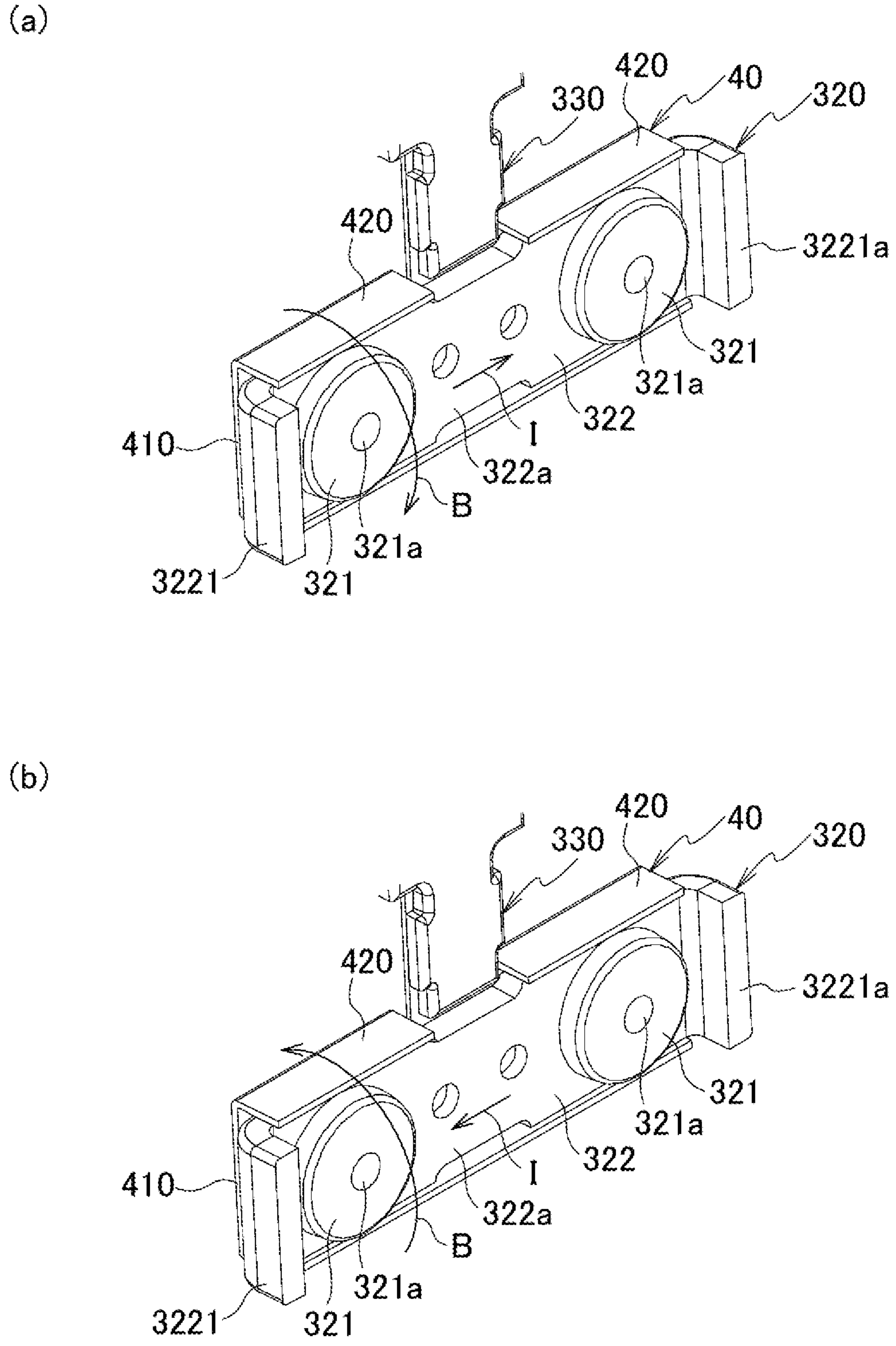
FIG. 12 includes diagrams illustrating magnetic flux generated by a current flowing through the movable contact maker according to one embodiment, where (a) is a diagram illustrating magnetic flux generated by a current flowing to one side and (b) is a diagram illustrating magnetic flux generated by a current flowing to the other side.

Here, for example, as illustrated in FIG. 12(*a*), when the current I flows from the movable contact 321 on the left side (front side in FIG. 12(*a*)) to the movable contact 321 on the right side (rear side in FIG. 12(*a*)), magnetic flux B is generated from above to below on a surface (first surface) 322*a* of the movable contact maker 322 on which the movable contacts 321 are formed. Note that the surface 322*a* of the movable contact maker 322 on which the movable contacts 321 are formed is a surface located to face the opposing body part (first body parts 312) and is referred to as a front surface 322*a* in some cases below.

Figure 13:
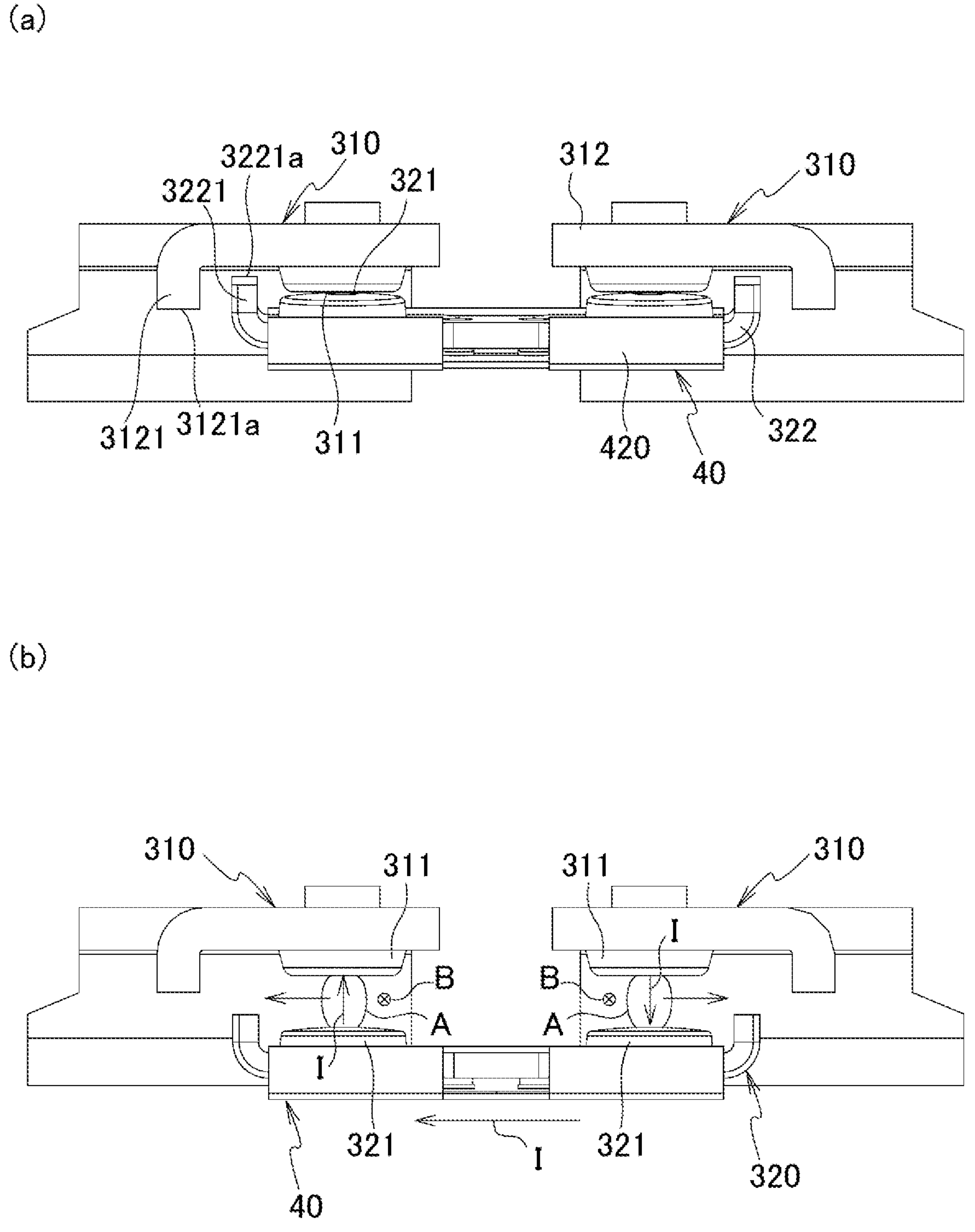
FIG. 13 includes diagrams illustrating the fixed contact portions, the movable contact maker, and the yoke according to one embodiment, where (a) is a plan view illustrating the contacts in a first position, and (b) is a plan view illustrating the contacts in a second position.

When the energization to the coil 210 is stopped, contact parting is started in which the movable contacts 321 are separated from the fixed contacts 311 (moved from the state in FIG. 13(*a*) to the state in FIG. 13(*b*)).

When the contact parting is started, an arc A is generated between the movable contacts 321 and the fixed contacts 311 in the initial stage of the contact parting, and the arc A causes the current to be continued in the energized state (see FIG. 13(*b*)).

Here, when the current I flows from the movable contact 321 on the right side to the movable contact 321 on the left side in FIG. 13(*b*) (when a current flows in the same direction as in FIG. 12(*a*)), the current I flowing from the movable contact 321 toward the fixed contact 311 on the left side in FIG. 13(*b*) flows through the arc A generated at the movable contact 321 and the fixed contact 311.

In contrast, the current I flowing from the fixed contact 311 toward the movable contact 321 on the right side in FIG. 13(*b*) flows through the arc A generated at the movable contact 321 and the fixed contact 311.

As described above, magnetic flux B flowing from above to below is generated near the front surface 322*a* of the movable contact maker 322, that is, in the space where the arcs A exist.

Thus, the current I flowing from the movable contact 321 toward the fixed contact 311 on the left side in FIG. 13(*b*) and the magnetic flux B flowing from above to below cause a Lorentz force to the left side (outside in the Y axis) to be applied to the arc A generated at the movable contact 321 and the fixed contact 311.

As a result, the arc A generated at the movable contact 321 and the fixed contact 311 on the left side in FIG. 13(*b*) is extended to the left side (outside in the Y axis) in FIG. 13(*b*).

The current I flowing from the fixed contact 311 toward the movable contact 321 on the right side in FIG. 13(*b*) and the magnetic flux B flowing from above to below causes a Lorentz force to the right side (outside in the Y axis) to be applied to the arc A generated at the movable contact 321 and the fixed contact 311.

As a result, the arc A generated at the movable contact 321 and the fixed contact 311 on the right side in FIG. 13(*b*) is extended to the right side (outside in the Y axis) in FIG. 13(*b*).

Then, the arcs A generated in respective sets of the movable contact 321 and the fixed contact 311 are each extended outward in the Y axis to be extinguished. In this way, the current between the fixed contact portions 310 and the movable contact portion 320 is cut.

Note that although not illustrated, when the current I flows from the movable contact 321 on the left toward the movable contact 321 on the right in FIG. 13(*b*) (when the current flows in the same direction as in FIG. 12(*b*)), the current I flowing from the fixed contact 311 toward the movable contact 321 on the left in FIG. 13(*b*) flows through the arc A generated at the movable contact 321 and the fixed contact 311.

The current I flowing from the movable contact 321 toward the fixed contact 311 on the right side in FIG. 13(*b*) flows through the arc A generated at the movable contact 321 and the fixed contact 311.

In this case, as described above, the magnetic flux B flowing from below to above is generated near the front surface 322*a* of the movable contact maker 322, that is, in the space where the arcs A exist.

Thus, the current I flowing from the fixed contact 311 toward the movable contact 321 on the left side in FIG. 13(*b*) and the magnetic flux B flowing from below to above causes a Lorentz force to the left side (outside in the Y axis) to be applied to the arc A generated at the movable contact 321 and the fixed contact 311.

As a result, the arc A generated at the movable contact 321 and the fixed contact 311 on the left side in FIG. 13(*b*) is extended to the left side (outside in the Y axis) in FIG. 13(*b*).

The current I flowing from the movable contact 321 toward the fixed contact 311 on the right side in FIG. 13(*b*) and the magnetic flux B flowing from below to above causes a Lorentz force to the right side (outside in the Y axis) to be applied to the arc A generated at the movable contact 321 and the fixed contact 311.

As a result, the arc A generated at the movable contact 321 and the fixed contact 311 on the right side in FIG. 13(*b*) is extended to the right side (outside in the Y axis) in FIG. 13(*b*).

Then, the arcs A generated in respective sets of the movable contact 321 and the fixed contact 311 are each extended outward in the Y axis to be extinguished As described above, the contact device 30 according to the present embodiment is configured such that arcs A generated between the movable contacts 321 and the fixed contacts 311 are extended outward in the Y axis to be extinguished regardless of the direction of the current.

Thus, even when an AC current flows through the contact device 30 as in an AC relay, it is possible to extend the arcs A generated between the movable contacts 321 and the fixed contacts 311 outside in the Y axis and extinguish the arcs.

When an arc A is generated between the movable contact 321 and the fixed contact 311, the movable contact 321 and the fixed contact 311 may be welded by the arc heat. The movable contact 321 and the fixed contact 311 may be deteriorated by the arc heat.

Thus, when the arcs A are generated between the movable contacts 321 and the fixed contacts 311, the contacts (the movable contacts 321 and the fixed contacts 311) may be affected by the arcs. In particular, in an electromagnetic relay in which a large current flows, contacts (movable contacts 321 and fixed contacts 311) are to be affected to a great extent by the arcs.

Thus, it is preferable to extinguish the arcs A generated between the movable contacts 321 and the fixed contacts 311 in a more reliable and more quick manner and to prevent the contacts (the movable contacts 321 and the fixed contacts 311) from being affected by the arcs.

Thus, the present embodiment makes it possible to extinguish the arcs A generated between the movable contacts 321 and the fixed contacts 311 in a more reliable and quick manner Specifically, a yoke 40 is arranged adjacent to at least one of the body parts (first body part) 312 or the movable contact maker (second body part) 322.

Arranging the yoke 40 to face at least one of the body parts 312 or the movable contact maker 322 makes it possible to enhance the intensity of the magnetic flux B generated around the body part adjacent to the yoke 40, and to extinguish the arcs A in a more reliable and quick manner.

In the present embodiment, as illustrated in FIGS. 9 to 11, the yoke 40 is arranged adjacent to the movable contact maker (second body part) 322, which is the body part of at least one of the body parts 312 or the movable contact maker 322.

At least a part of the yoke 40 is arranged along the magnetic flux B that is generated by the current I flowing through the movable contact maker (the body part adjacent to the yoke 40) 322 and is generated in the region R1.

Figure 14:
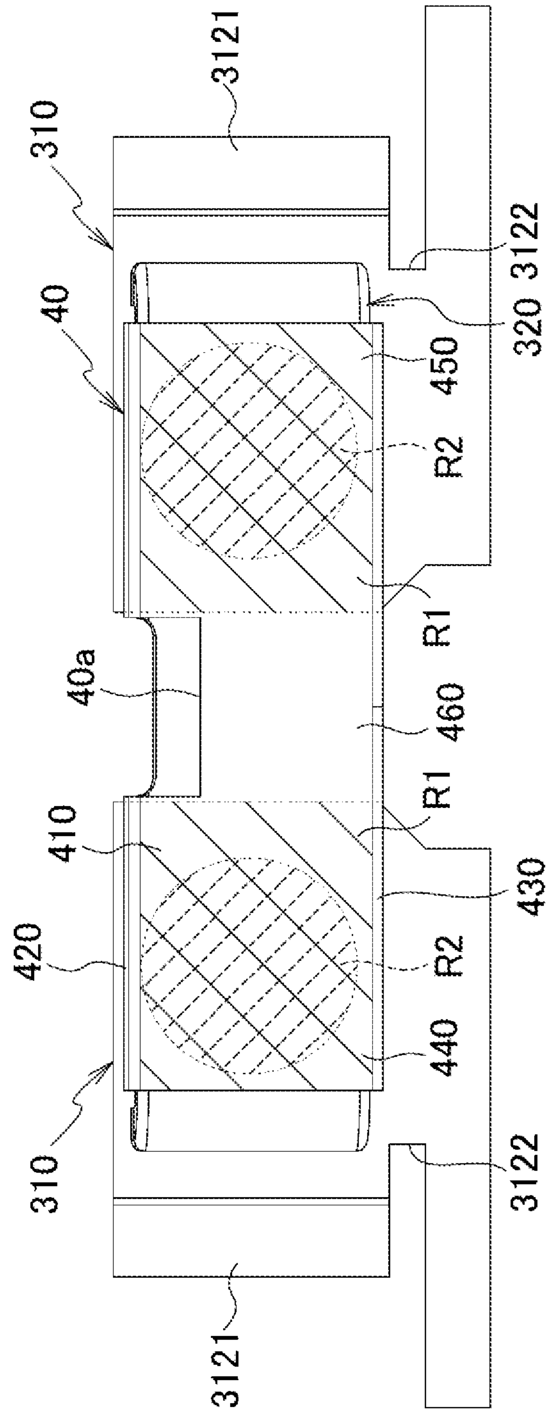
FIG. 14 is a diagram illustrating the fixed contact portions, the movable contact maker, and the yoke according to one embodiment with the contacts in the first position, as viewed along a movement axis of the movable contact maker.

Note that the region R1 is a region where the body parts (first body part) 312 and the movable contact maker (second body part) 322 overlap each other when the state in which the fixed contacts 311 and the movable contact 321 are in contact with each other is viewed along the X axis (as viewed along the axis in which the fixed contacts 311 and the movable contact 321 move relative to each other) (see FIG. 14).

As described above, in the present embodiment, at least a part of the yoke 40 is arranged along the magnetic flux B generated around the movable contact maker (second body part) 322 in a space belonging to the region R1 of the space near the movable contact maker (second body part) 322.

Arranging the yoke 40 as described above makes it possible to concentrate the magnetic flux B generated around the movable contact maker (second body part) 322 in the yoke 40. Consequently, it is possible to increase the intensity of the magnetic flux B generated around the movable contact maker (second body part) 322 (the magnetic field around the movable contact maker 322 is strengthened) and to extinguish the arcs A generated between the movable contact 321 and the fixed contacts 311 in a more reliable and quick manner.

Further, in the present embodiment, the yoke 40 includes a section arranged adjacent to a surface (second surface) 322*b* of the movable contact maker 322 opposite to the surface where the movable contacts 321 are formed. Note that the surface of the movable contact maker 322 opposite to the surface where the movable contacts 321 are formed is a surface located on the opposite side to the side facing the opposing body part (first body part 312) and is referred to as a back surface 322*b* in some cases below.

In the present embodiment, the yoke 40 includes a sidewall 410 in a substantially rectangular shape elongated in the Y axis, a top wall 420 provided in continuation from the upper end of the sidewall 410, and a bottom wall 430 provided in continuation from the lower end of the sidewall 410 and extending in the same direction as the top wall 420.

A front surface 411 of the side wall 410 is arranged to face the back surface 322*b* of the movable contact maker 322 with a tip 421 of the top wall 420 and a tip 431 of the bottom wall 430 facing forward in the X axis (longitudinal axis).

Thus, in the present embodiment, the side wall 410 of the yoke 40 is the section arranged adjacent to the surface (second surface) 322*b* of the movable contact maker 322 opposite to the surface where the movable contacts 321 are formed.

Here, the side wall 410 of the yoke 40 is arranged to overlap with the contacts (movable contacts 321) of the body part (movable contact maker 322) to face the yoke 40, when viewed along the X axis (viewed along the axis in which the fixed contacts 311 and the movable contacts 321 move relative to each other). Thus, the side wall 410 of the yoke 40 is arranged to overlap a contact region R2 where the fixed contacts (first contact) 311 and the movable contacts (second contact) 321 come into contact, when viewed along the X axis (viewed along the axis in which the fixed contacts 311 and the movable contacts 321 move relative to each other).

Thus, in the present embodiment, a section of the side wall 410 of the yoke 40 is a part that overlaps the contact region R2 where the fixed contacts (first contact) 311 and the movable contacts (second contact) 321 come into contact, when viewed along the axis in which the fixed contacts (first contact) 311 and the movable contacts (second contact) 321 move relative to each other (see FIG. 14). Here, the side wall 410 is arranged to overlap the entire area of the contact region R2.

Here, in the present embodiment, one movable contact maker 322 includes two movable contacts (second contact) 321 arranged side by side in the Y axis (the axis crossing the axis in which the first contact and the second contact move relative to each other). Further, one (for example, on the left side in FIG. 14) of the two body parts (first body part) 312 has one fixed contact (first contact) 311, and the other (for example, on the right side in FIG. 14) of the two body parts 312 has the other fixed contact (first contact) 311.

One movable contact 321 of the two movable contacts (second contact) 321 contacts with and separates from one fixed contact 311 of the two fixed contacts (first contact) 311, and the other movable contact 321 contacts with and separates from the other fixed contact 311.

Thus, in the present embodiment, the yoke 40 includes a first yoke 440 arranged on one end where one fixed contact 311 and one movable contact 321, which contact with and separate from each other, are located, and a second yoke 450 arranged on the other end where the other fixed contact 311 and the other movable contact 321, which contact with and separate from each other, are located. The first yoke 440 and the second yoke 450 are connected by a connecting section 460.

As described above, in the present embodiment, one in which the first yoke 440 and the second yoke 450 are integrated by the connecting section 460 is exemplified as the yoke 40.

In the present embodiment, the yoke 40 has a shape in which a notch 40*a* is provided at the center part in the Y axis, and the length in the Z axis of the center part in the Y axis is shorter than those of both end parts in the Y axis. The notch 40*a* is provided to prevent the yoke 40 from interfering with the movable body 330.

A section where the notch 40*a* is formed at the center part in the Y axis serves as the connecting section 460, and sections at both ends in the Y axis serve as the first yoke 440 and the second yoke 450. Making the length of the connecting section 460 in the Z axis shorter than those of the first yoke 440 and the second yoke 450 as described above enables the magnetic flux B generated around the movable contact maker 322 to be concentrated toward the first yoke 440 and the second yoke 450 in a more efficient manner, thereby enhancing the intensity of the magnetic flux B generated around the contacts (the fixed contacts 311 and the movable contacts 321 contacting and separating each other).

In the present embodiment, the yoke 40 is fixed to the movable contact maker (the body part adjacent to the yoke 40) 322.

Specifically, the movable contact maker 322 is held between the top wall 420 and the bottom wall 430 to fix the yoke 40 to the movable contact maker 322. Note that the yoke 40 may be fixed to the movable contact maker 322 by means of caulking, brazing, adhesive, or the like.

Then, by holding the movable contact maker 322 between the top wall 420 and the bottom wall 430, a lower surface 420*a* of the top wall 420 comes in surface contact with an upper surface (third surface) 322*c* provided in continuation from the front surface 322*a* and the rear surface 322*b* of the movable contact maker 322. The upper surface 430*a* of the bottom wall 430 comes in surface contact with a lower surface (third surface) 322*c* provided in continuation from the front surface 322*a* and the rear surface 322*b* of the movable contact maker 322.

As described above, in the present embodiment, the top wall 420 and the bottom wall 430 of the yoke 40 constitute a section arranged along the third surface provided in continuation from the front surface 322*a* and the rear surface 322*b* of the movable contact maker 322.

The tip 421 of the top wall 420 and the tip 431 of the bottom wall 430 are made to protrude forward (outward) from the front surface (first surface) 322*a* of the movable contact maker 322.

In the present embodiment, since the movable contact 321 is formed in the movable contact maker 322 through rivet joining, a gap is formed between the front surface 411 of the side wall 410 and the back surface (outer surface) 322*b* of the movable contact maker (the body part adjacent to the yoke 40) 322 with the yoke 40 fixed to the movable contact maker 322.

Thus, in the present embodiment, the side wall 410 of the yoke 40 is also a section spaced apart from the outer surface (back surface 322*b*) of the body part (movable contact maker 322) to face the yoke 40.

Note that in the present embodiment, the yoke 40 is arranged on the movable contact maker (second body part) 322 as an example, but the yoke 40 may be arranged on the body parts (first body part) 312.

In this case, the front surface 312*a* of the body part 312, which is a surface to face the opposing body part (second body part 322), serves as the first surface. The back surface 312*b* of the body part 312, which is a surface opposite to the surface to face the opposing body part (first body part 312), serves as the second surface. The upper surface 312*c* provided in continuation from the front surface 312*a* and the rear surface 312*b* of the body part 312 serves as the third surface.

The present embodiment has a configuration that enables the arcs A generated between the movable contacts 321 and the fixed contacts 311 to be moved more quickly away from the movable contacts 321 and the fixed contacts 311.

Figure 15:
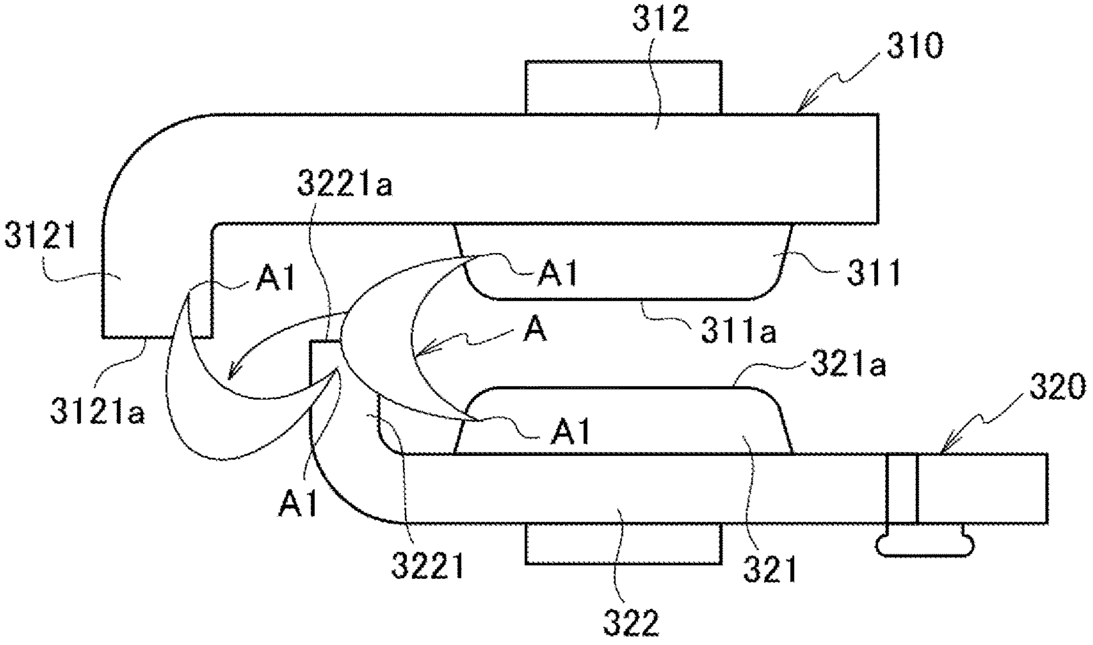
FIG. 15 is a diagram illustrating how an arc moves toward a protrusion part in the contact device according to one embodiment.

Specifically, as illustrated in FIGS. 7, 8, and 15, each body part (first body part) 312 has a first protrusion part 3121 protruding toward the movable contact maker (second body part) 322 formed at an end part of the body part in the Y axis (an axis crossing the axis in which the fixed contacts 311 and the movable contacts 321 move relative to each other).

In the present embodiment, the first protrusion part 3121 is formed on the body part 312 by forming a notch 3122 extending in the Y axis and opening outward in the Y axis below the fixed contact 311, and by bending the end at the outward side in the Y axis and above the notch 3122 backward (toward the movable contact maker 322).

Here, the first protrusion part 3121 is formed so that a tip 3121*a* of the first protrusion part 3121 is located to the rear (closer to the movable contact maker 322) of a tip (top) 311*a* of the fixed contact 311.

Second protrusion parts 3221 protruding toward the body parts (first body part) 312 are formed at both ends of the movable contact maker (second body part) 322 in the Y axis (an axis crossing the axis in which the fixed contacts 311 and the movable contacts 321 move relative to each other).

In the present embodiment, the second protrusion parts 3221 are formed on the movable contact maker 322 by forming the movable contact maker 322 in a shape in which both ends in the Y axis of a substantially rectangular plate-like member elongated in the Y axis are bent forward (toward the body parts 312).

Here, the second protrusion parts 3221 are formed so that tips 3221*a* of the second protrusions 3221 are located in front (closer to the body part 312) of tips (tops) 321*a* of the movable contacts 321.

In the present embodiment, the tip 3221*a* of the second protrusion part 3221 is positioned more inwardly in the Y axis (the axis crossing the axis in which the fixed contacts 311 and the movable contacts 321 move relative to each other) than the tip 3121*a* of the first protrusion part 3121 (see FIG. 15).

By forming the body parts (first body part) 312 and the movable contact maker (second body part) 322 in the shape described above, when an arc A is generated between the movable contact 321 and the fixed contact 311, starting points (discharge point) A1 of the arc A are respectively moved toward the first protrusion part 3121 and the second protrusion part 3221 from the movable contact 321 and the fixed contact 311.

Specifically, a Lorentz force outwardly in the Y axis acts on the arc A generated between the movable contact 321 and the fixed contact 311, so that the arc A is elongated outwardly in the Y axis, and thus the arc A generated between the movable contact 321 and the fixed contact 311 moves to the first protrusion part 3121 and the second protrusion part 3221.

Here, in the present embodiment, the notch 3122 is formed below the fixed contact 311 of the body part 312, and the first protrusion part 3121 is formed above the notch 3122.

Thus, by providing the notch 3122 in the body part 312, the arc A moves outward in the Y axis along the notch 3122 with the Lorentz force acting on the arc A. This enables the arc A to be moved away from the fixed contact 311 more quickly.

In the present embodiment, since the tip 3221*a* of the second protrusion part 3221 is located more inward in the Y axis than the tip 3121*a* of the first protrusion part 3121, the arc A moved to the first protrusion part 3121 and the second protrusion part 3221 is thus extended outward in the Y axis and backward in the X axis.

Figure 16:
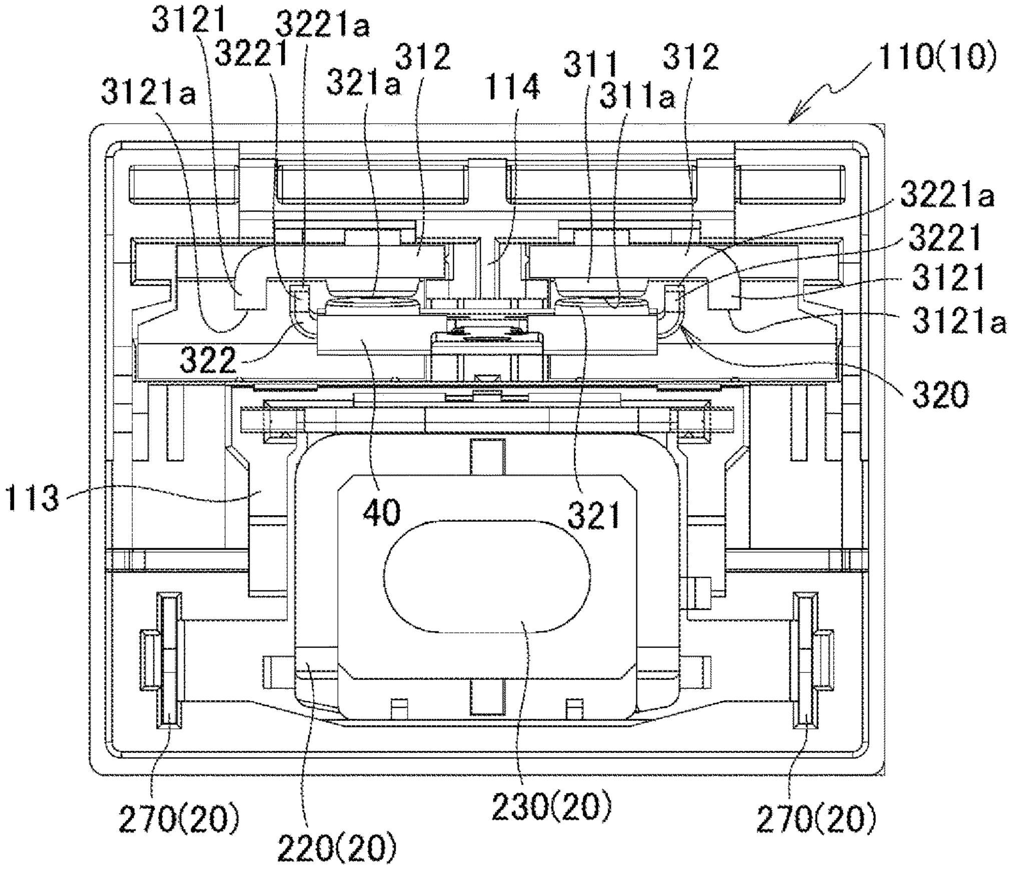
FIG. 16 is a diagram illustrating a relationship between a direction in which an arc moves and a base in the contact device according to one embodiment.

Thus, in the present embodiment, as illustrated in FIG. 16, a space is formed outside the first protrusion parts 3121 and the second protrusion parts 3221 in the Y axis and behind them in the X axis with the body parts 312 and the movable contact maker 322 housed in the case 10.

In this way, it is possible to prevent in a more reliable manner the case 10 and members housed in the case 10 from being affected by the arc A extended outward in the Y axis and backward in the X axis.

Figure 17:
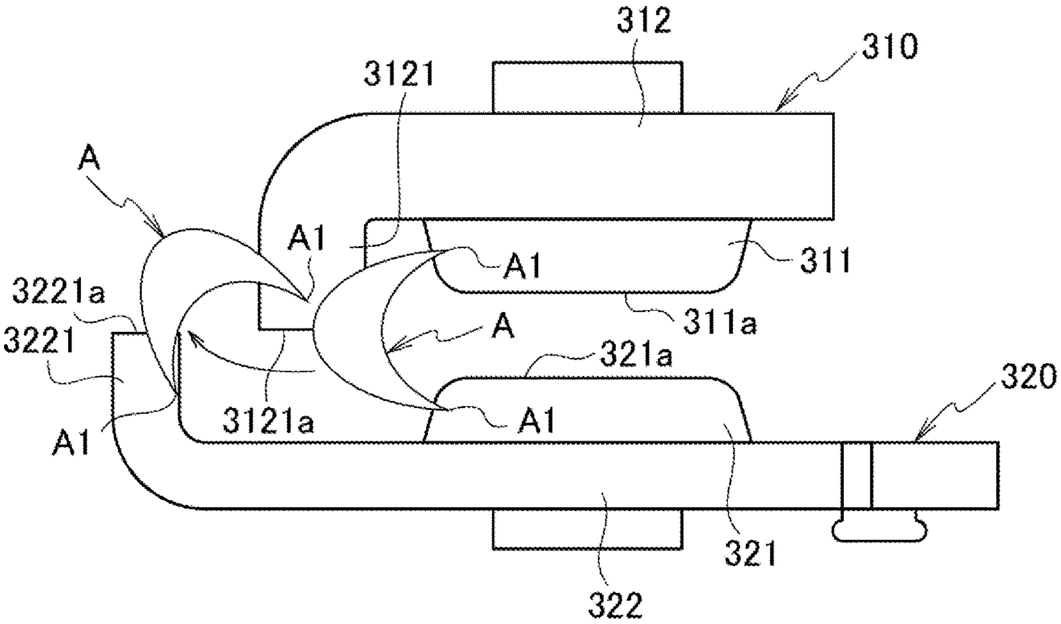
FIG. 17 is a diagram illustrating how an arc moves toward the protrusion part in a contact device according to a modification.

Note that as illustrated in FIG. 17, the tip of the second protrusion part may be located more outside than the tip of the first protrusion part in the axis crossing the axis in which the first contact and the second contact move relative to each other.

For example, when a space is formed outside the first protrusion part 3121 and the second protrusion part 3221 in the Y axis and in front of them in the X axis with the body parts 312 and the movable contact maker 322 housed in the case 10, the configuration illustrated in FIG. 17 is preferable.

Note that in the present embodiment, both the body parts (first body part) 312 and the movable contact maker (second body part) 322 are provided with protrusions as an example, but either of them may be provided with protrusions, or no protrusions may be provided.

Next, with reference to FIGS. 18 to 45, description is given of a various arrangement pattern of the yoke 40. Note that, FIGS. 18 to 45 are given of the movable contact maker (second body part) 322 as the body part adjacent to the yoke 40. However, it is also possible to make the body parts (first body part) 312 as the body part adjacent to the yoke 40.

At least a part of each yoke 40 shown in FIGS. 18 to 45 is arranged along the magnetic flux B that is generated by the current I flowing through the movable contact maker (the body part adjacent to the yoke 40) 322 and is generated in the region R1.

Here, FIGS. 18 to 32 are given of the arrangement pattern of the yoke 40, when the movable contact maker (the body part adjacent to the yoke 40) 322 has two contacts (when one body part has two contacts).

Figure 18:
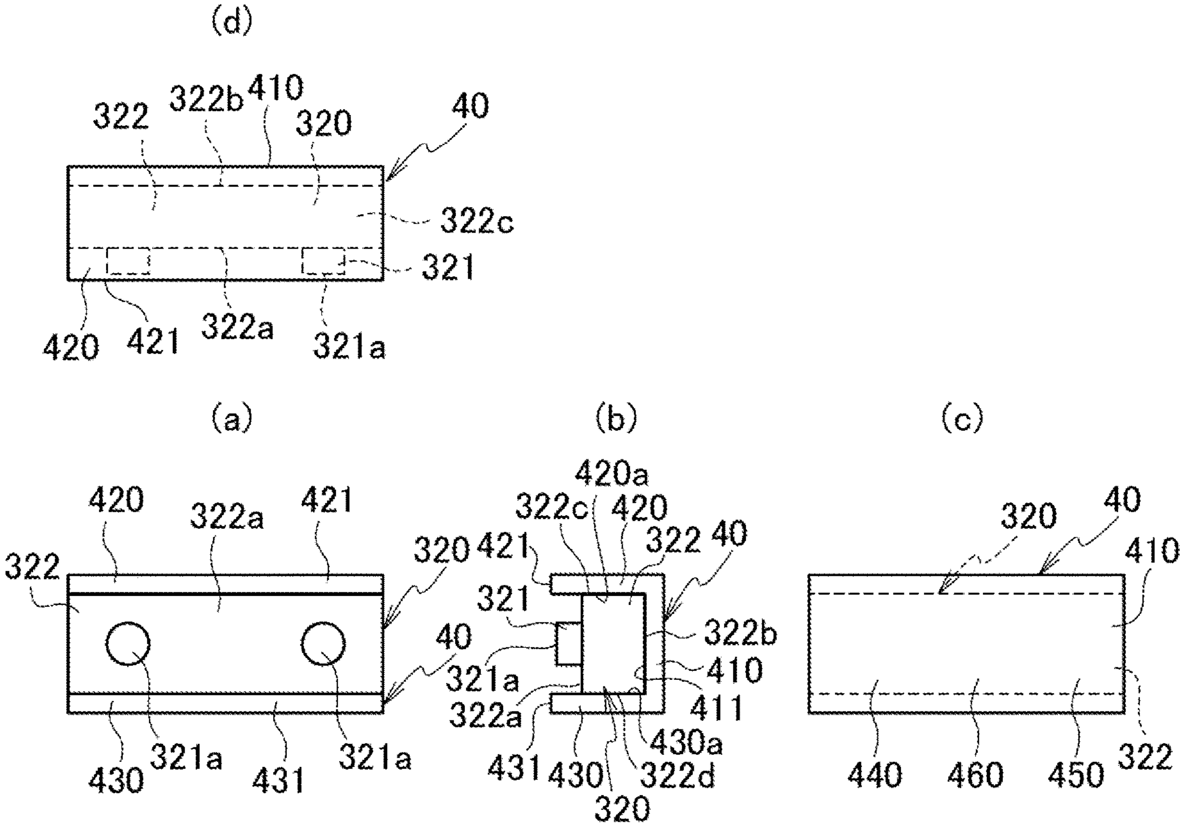
FIG. 18 includes schematic diagrams illustrating a yoke according to a first modification arranged adjacent to the movable contact maker, where (a) is a front view, (b) is a side view, (c) is a rear view, and (d) is a plan view.

First, it is possible to arrange the yoke 40 shown in FIG. 18 adjacent to the movable contact maker 322 having two contacts.

The yoke 40 shown in FIG. 18 has substantially the same structure as the yoke 40 described in the above embodiment. That is, one in which the first yoke 440 and the second yoke 450 are integrated by the connecting section 460 is exemplified as the yoke 40 shown in FIG. 18. Note that the yoke 40 shown in FIG. 18 has a shape in which a notch 40*a* is not provided and the length in the vertical axis of the connecting section 460 is the same as that of the first yoke 440 and the second yoke 450.

Further, the yoke 40 shown in FIG. 18 includes the sidewall 410, the top wall 420 and the bottom wall 430, and is fixed to the movable contact maker 322.

Then, the front surface 411 of the side wall 410 is arranged to face the back surface (second surface) 322*b* of the movable contact maker 322 with the tip 421 of the top wall 420 and the tip 431 of the bottom wall 430 facing the opposing body part (in FIG. 18, body part 312).

The side wall 410 is also arranged to overlap the entire area of the contact region R2 where the fixed contacts (first contact) 311 and the movable contacts (second contact) 321 come into contact, when viewed along the axis in which the fixed contacts 311 and the movable contacts 321 move relative to each other.

Here, the yoke 40 shown in FIG. 18 is arranged in such a state that the front surface 411 of the side wall 410 comes in surface contact with the back surface (second surface) 322*b* of the movable contact maker 322. Thus, when the front surface 411 of the side wall 410 comes in surface contact with the back surface (second surface) 322*b* of the movable contact maker 322, it is possible to concentrate the magnetic flux B near the outer surface of the movable contact maker 322, and it is possible to increase the intensity of the magnetic flux B acting on the arc A.

Also, in the yoke 40 shown in FIG. 18, the tip 421 of the top wall 420 and the tip 431 of the bottom wall 430 are made to protrude outward from the front surface (first surface) 322*a* of the movable contact maker 322.

Further, in the yoke 40 shown in FIG. 18, the tip 421 of the top wall 420 and the tip 431 of the bottom wall 430 are made to protrude outward from tips (tops) 321*a* of the movable contacts 321. This makes it possible to exist the yoke 40 concentrating the magnetic flux B upward and downward of the arc A. Therefore, it is possible to increase the intensity of the magnetic flux B acting on the arc A.

Figure 19:
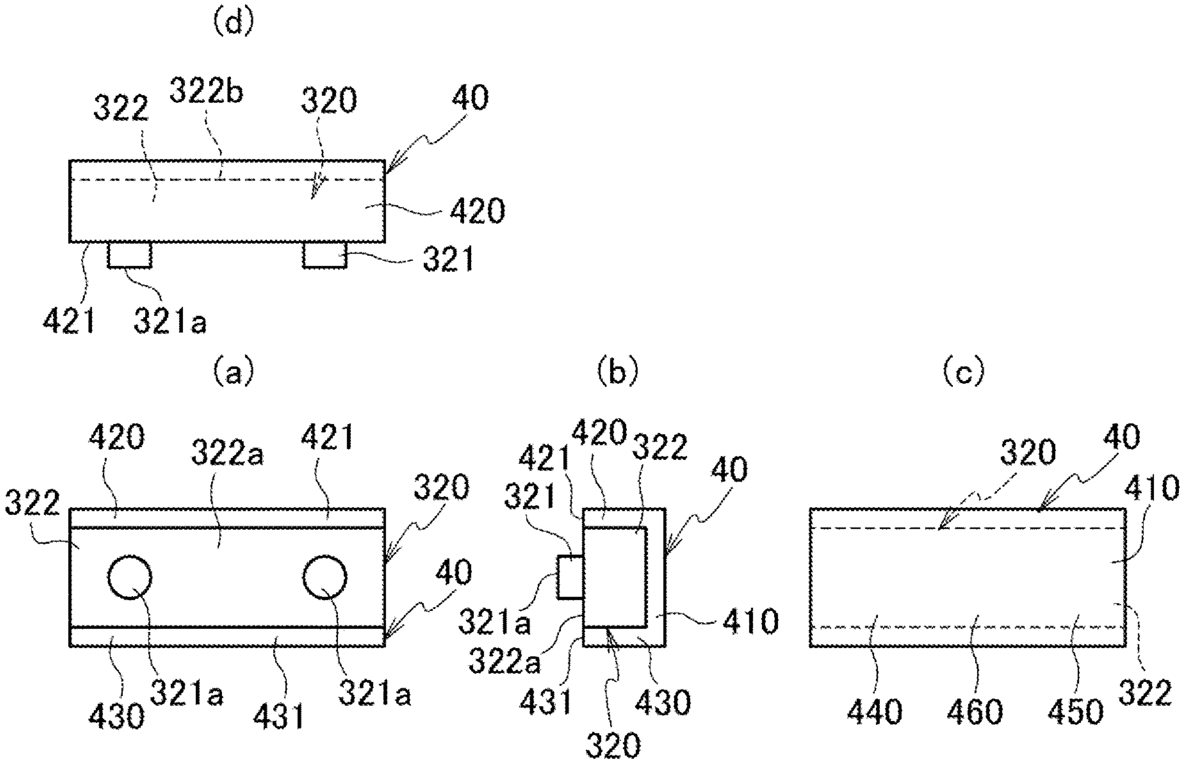
FIG. 19 includes schematic diagrams illustrating a yoke according to a second modification arranged adjacent to the movable contact maker, where (a) is a front view, (b) is a side view, (c) is a rear view, and (d) is a plan view.

Alternatively, the yoke 40 shown in FIG. 19 may be realized. The yoke 40 shown in FIG. 19 also has substantially the same structure as the yoke 40 shown in FIG. 18.

Here, in the yoke 40 shown in FIG. 19, the tip 421 of the top wall 420 and the tip 431 of the bottom wall 430 are not made to protrude outward from the front surface (first surface) 322*a* of the movable contact maker 322.

Note that, in FIG. 19, the tip 421 of the top wall 420 and the tip 431 of the bottom wall 430 are substantially flush with the front surface (first surface) 322*a* of the movable contact maker 322 as an example, but at least one of the tip 421 of the top wall 420 or the tip 431 of the bottom wall 430 may be located inside to the front surface (first surface) 322*a* of the movable contact maker 322.

Figure 20:
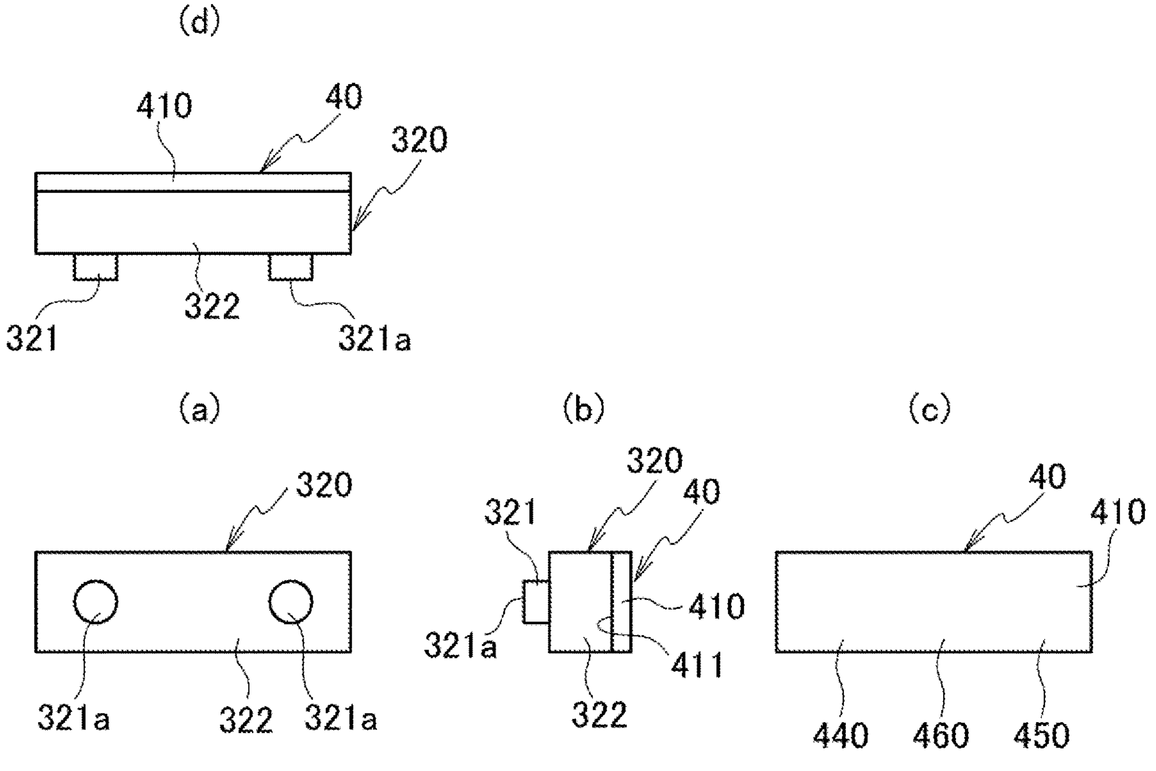
FIG. 20 includes schematic diagrams illustrating a yoke according to a third modification arranged adjacent to the movable contact maker, where (a) is a front view, (b) is a side view, (c) is a rear view, and (d) is a plan view.

Alternatively, the yoke 40 shown in FIG. 20 may be realized. The yoke 40 shown in FIG. 20 does not include the top wall 420 and the bottom wall 430, only includes the sidewall 410.

That is, the yoke 40 shown in FIG. 20 is only arranged to the back surface (second surface) 322*b* of the movable contact maker 322. This also makes it possible to concentrate the magnetic flux B near the outer surface of the movable contact maker 322, and it is possible to increase the intensity of the magnetic flux B acting on the arc A.

Figure 21:
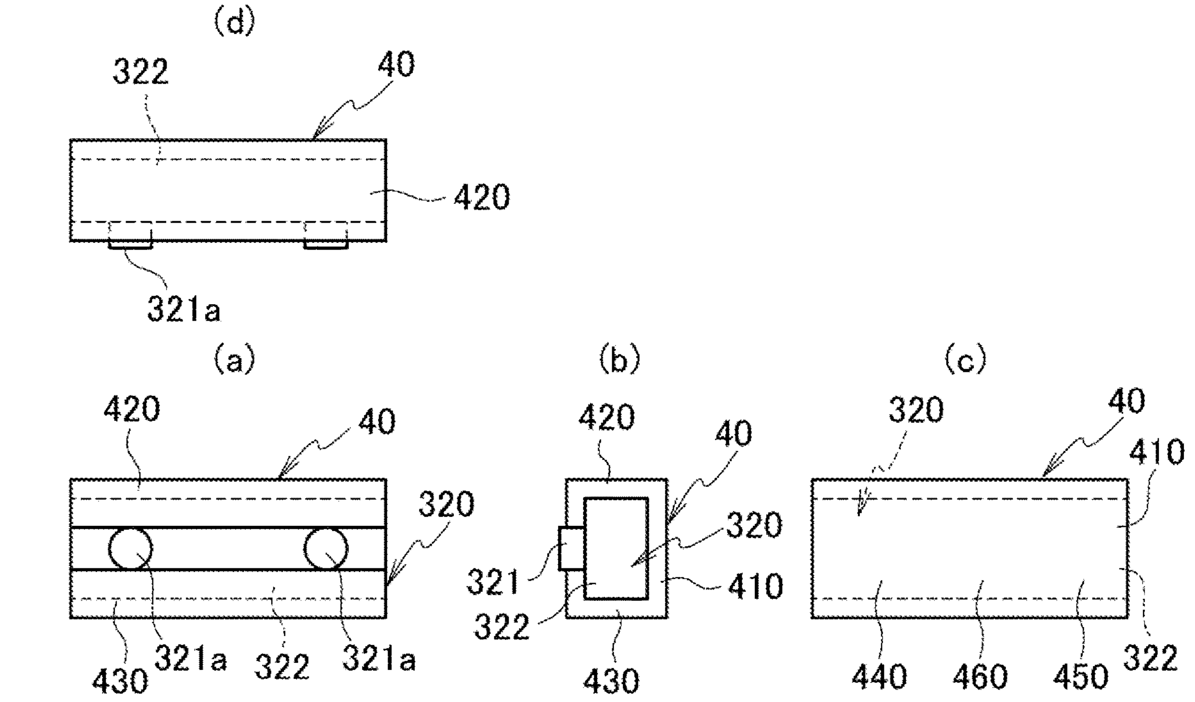
FIG. 21 includes schematic diagrams illustrating a yoke according to a fourth modification arranged adjacent to the movable contact maker, where (a) is a front view, (b) is a side view, (c) is a rear view, and (d) is a plan view.

Alternatively, the yoke 40 shown in FIG. 21 may be realized. The yoke 40 shown in FIG. 21 has a shape in which the section of the top wall 420 and the bottom wall 430 protruded outward from the movable contact maker 322 extend to the movable contacts 321.

That is, the yoke 40 shown in FIG. 21 is arranged so as to surround the movable contact maker 322. This makes it possible to more concentrate the magnetic flux B near the outer surface of the movable contact maker 322, and it is possible to more increase the intensity of the magnetic flux B acting on the arc A.

Note that, in the yoke 40 shown in FIG. 21, a section that the movable contacts 321 is formed has a belt-shaped exposed part (part uncovered in the yoke 40) extended from one end to the other end in the longitudinal axis when viewed from the front surface (first surface) 322*a* of the movable contact maker 322. That is, the yoke 40 shown in FIG. 21 has an approximate C-shape in a state viewed along the longitudinal axis of the movable contact maker 322. This makes it possible to fix the yoke 40 to the movable contact maker 322 without interfering with the movable contacts 321.

Figure 22:
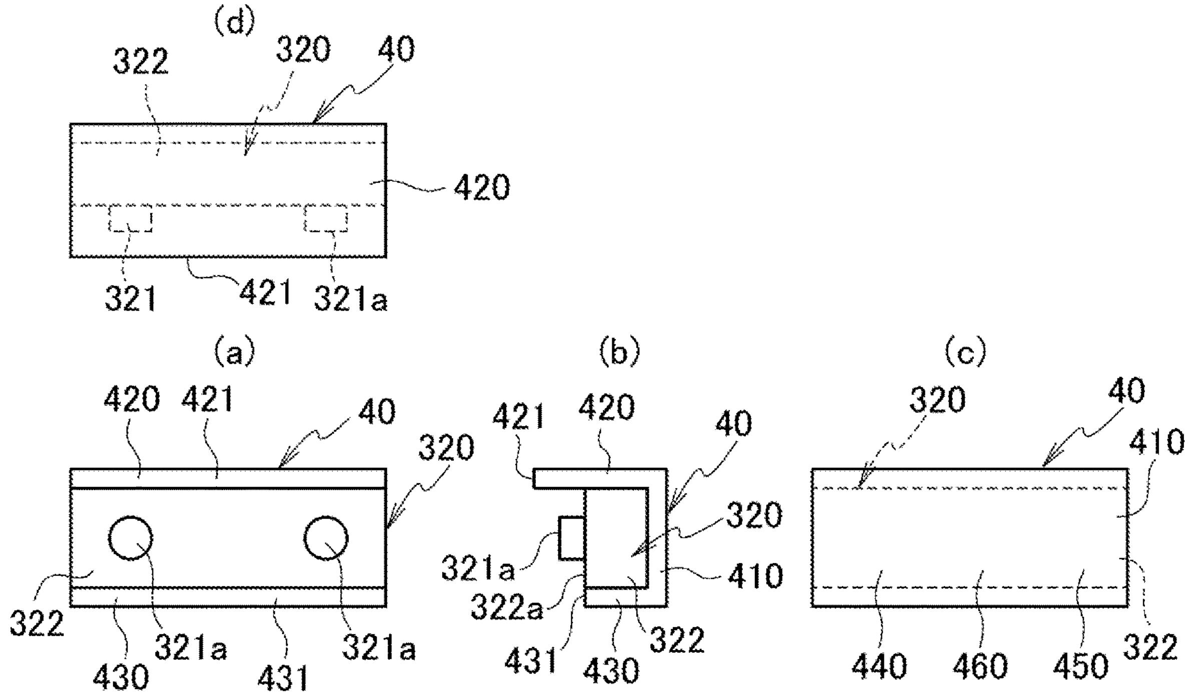
FIG. 22 includes schematic diagrams illustrating a yoke according to a fifth modification arranged adjacent to the movable contact maker, where (a) is a front view, (b) is a side view, (c) is a rear view, and (d) is a plan view.

Alternatively, the yoke 40 shown in FIG. 22 may be realized. In the yoke 40 shown in FIG. 22, the tip 421 of the top wall 420 is made to protrude outward from tips (tops) 321*a* of the movable contacts 321, but the tip 431 of the bottom wall 430 is not made to protrude outward from the front surface (first surface) 322*a* of the movable contact maker 322.

That is, the yoke 40 shown in FIG. 22 has an asymmetrical shape in the vertical axis when viewed along the longitudinal axis of the movable contact maker 322.

This also makes it possible to concentrate the magnetic flux B near the outer surface of the movable contact maker 322, and it is possible to increase the intensity of the magnetic flux B acting on the arc A.

Note that, in the yoke 40 shown in FIG. 22, the tip 421 of the top wall 420 is made to protrude outward from tips (tops) 321*a* of the movable contacts 321 as an example, but the tip 421 of the top wall 420 may be made not to protrude outward from tips (tops) 321*a* of the movable contacts 321.

Figure 23:
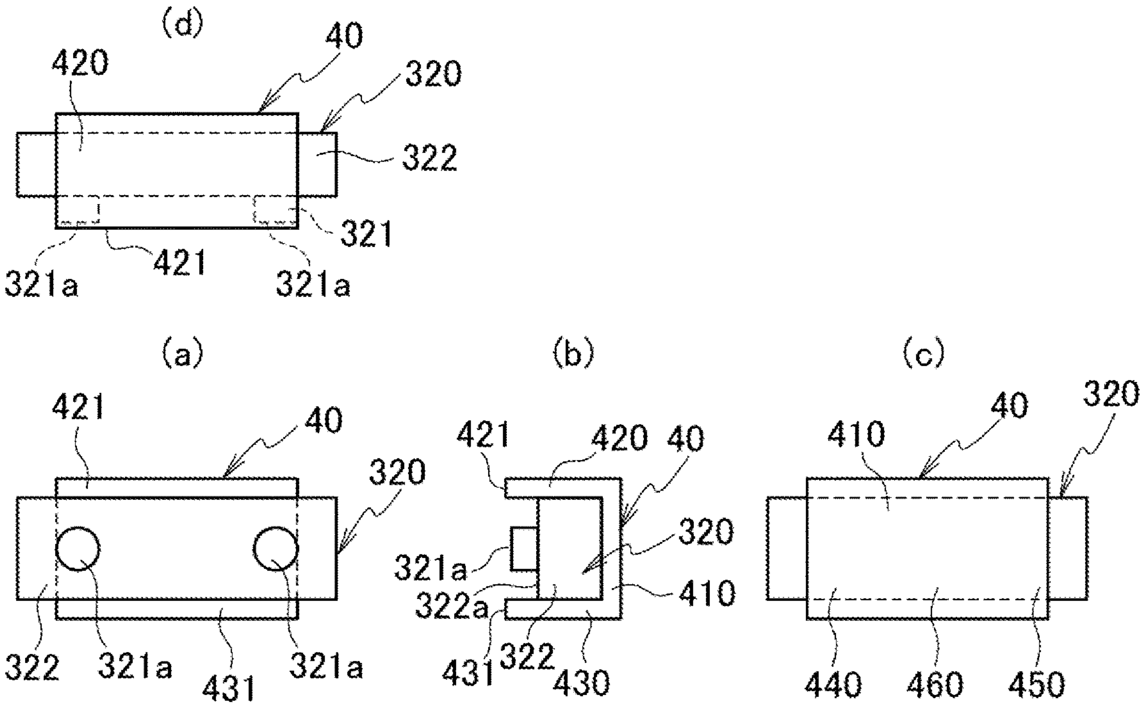
FIG. 23 includes schematic diagrams illustrating a yoke according to a sixth modification arranged adjacent to the movable contact maker, where (a) is a front view, (b) is a side view, (c) is a rear view, and (d) is a plan view.

Alternatively, the yoke 40 shown in FIG. 23 may be realized. The yoke 40 shown in FIG. 23 has substantially the same structure as the yoke 40 shown in FIG. 18.

Here, the yoke 40 shown in FIG. 23 is arranged to overlap the movable contact maker 322 between outer end of one movable contacts 321 and outer end of the other movable contacts 321, when viewed along the axis in which the fixed contacts 311 and the movable contacts 321 move relative to each other.

That is, in FIG. 23, the yoke 40 is arranged so as to surround a region where the two movable contacts 321 are formed in the movable contact maker 322.

This makes it possible to prevent from concentrating the magnetic flux B outer side of the movable contacts 321 where the arc A is not generated. Therefore, it is possible to more concentrate the magnetic flux B near the outer surface of the movable contact maker 322, and it is possible to more increase the intensity of the magnetic flux B acting on the arc A.

Note that, the yoke 40 shown in FIG. 23 is arranged to overlap the entire area of the contact region R2 where the fixed contacts (first contact) 311 and the movable contacts (second contact) 321 come into contact, when viewed along the axis in which the fixed contacts 311 and the movable contacts 321 move relative to each other.

Figure 24:
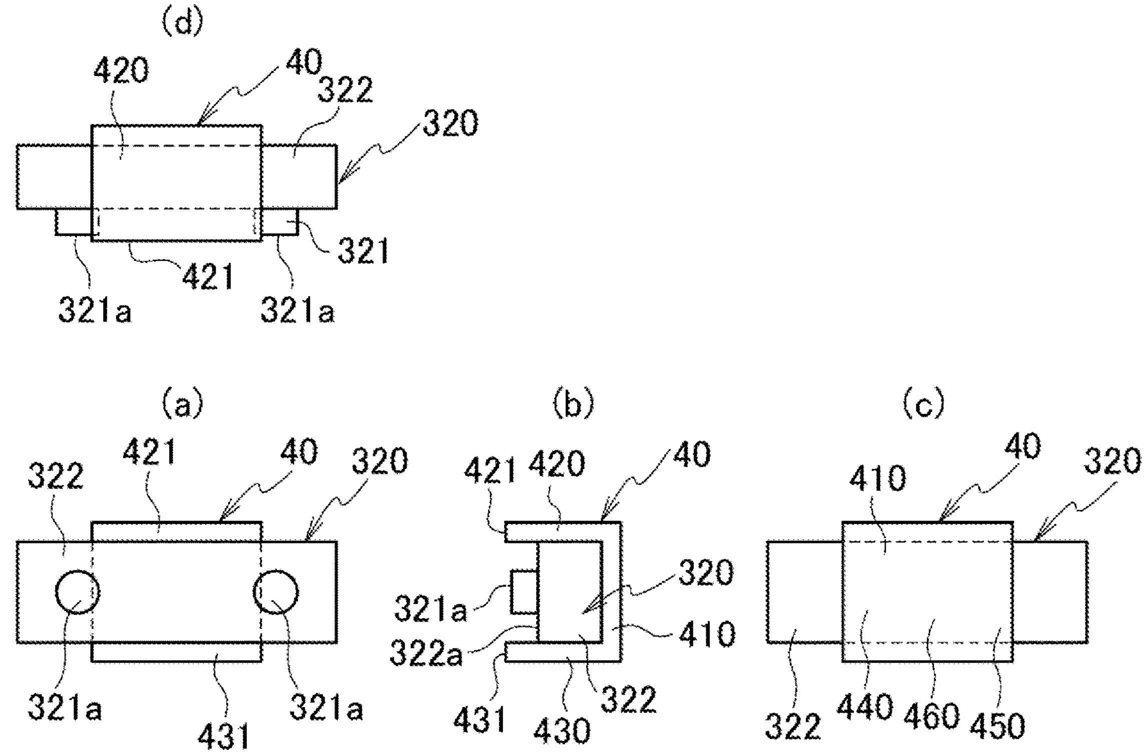
FIG. 24 includes schematic diagrams illustrating a yoke according to a seventh modification arranged adjacent to the movable contact maker, where (a) is a front view, (b) is a side view, (c) is a rear view, and (d) is a plan view.

Alternatively, the yoke 40 shown in FIG. 24 may be realized. The yoke 40 shown in FIG. 24 also has substantially the same structure as the yoke 40 shown in FIG. 23.

Here, the yoke 40 shown in FIG. 24 is arranged to overlap a part of the contact region R2 where the fixed contacts (first contact) 311 and the movable contacts (second contact) 321 come into contact, when viewed along the axis in which the fixed contacts 311 and the movable contacts 321 move relative to each other.

This also makes it possible to more concentrate the magnetic flux B near the movable contacts 321, and it is possible to more increase the intensity of the magnetic flux B acting on the arc A.

Note that, in FIG. 24, only inner ends in the longitudinal axis of the two movable contacts 321 are overlapped to the yoke 40 as an example, but substantially inner half portions in the longitudinal axis of the two movable contacts 321 may be overlapped to the yoke 40.

Figure 25:
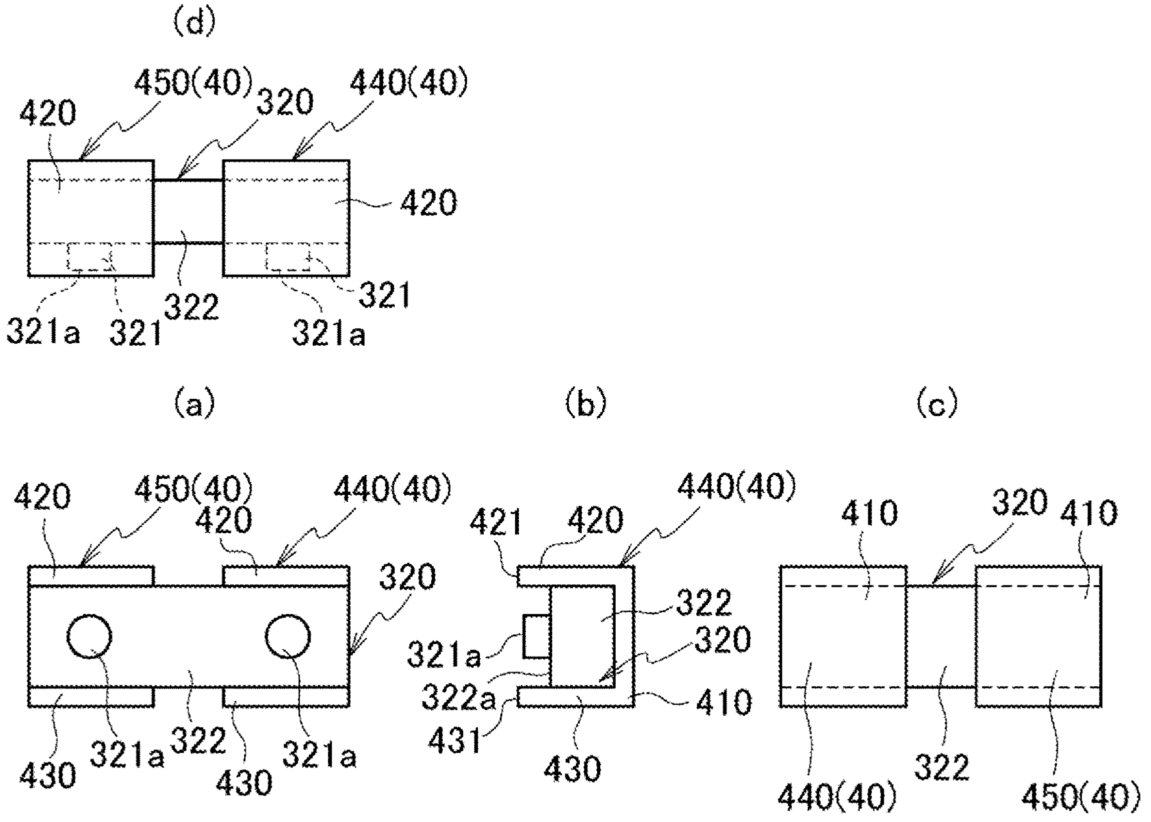
FIG. 25 includes schematic diagrams illustrating a yoke according to an eighth modification arranged adjacent to the movable contact maker, where (a) is a front view, (b) is a side view, (c) is a rear view, and (d) is a plan view.

Alternatively, the yoke 40 shown in FIG. 25 may be realized. In FIG. 25, the yoke (yoke separated into two parts) 40 in which the first yoke 440 and the second yoke 450 are not integrated by the connecting section 460 is exemplified.

That is, in the yoke 40 shown in FIG. 25, the first yoke 440 arranged on the side where one movable contact 321 of the two movable contacts 321 is located and the second yoke 450 arranged on the side where the other movable contact 321 is located are formed separately.

Thus, when the first yoke 440 and the second yoke 450 are not integrated by the connecting section 460, the magnetic flux B that will be generated around the connecting section 460 can be taken into the first yoke 440 or the second yoke 450. Therefore, it is possible to more concentrate the magnetic flux B near the movable contacts 321, and it is possible to more increase the intensity of the magnetic flux B acting on the arc A.

Note that, in FIG. 25, both the first yoke 440 and the second yoke 450 are arranged to overlap the entire area of the contact region R2 when viewed along the axis in which the fixed contacts 311 and the movable contacts 321 move relative to each other, but at least one of the first yoke 440 or the second yoke 450 may be arranged to overlap a part of the contact region R2.

Figure 26:
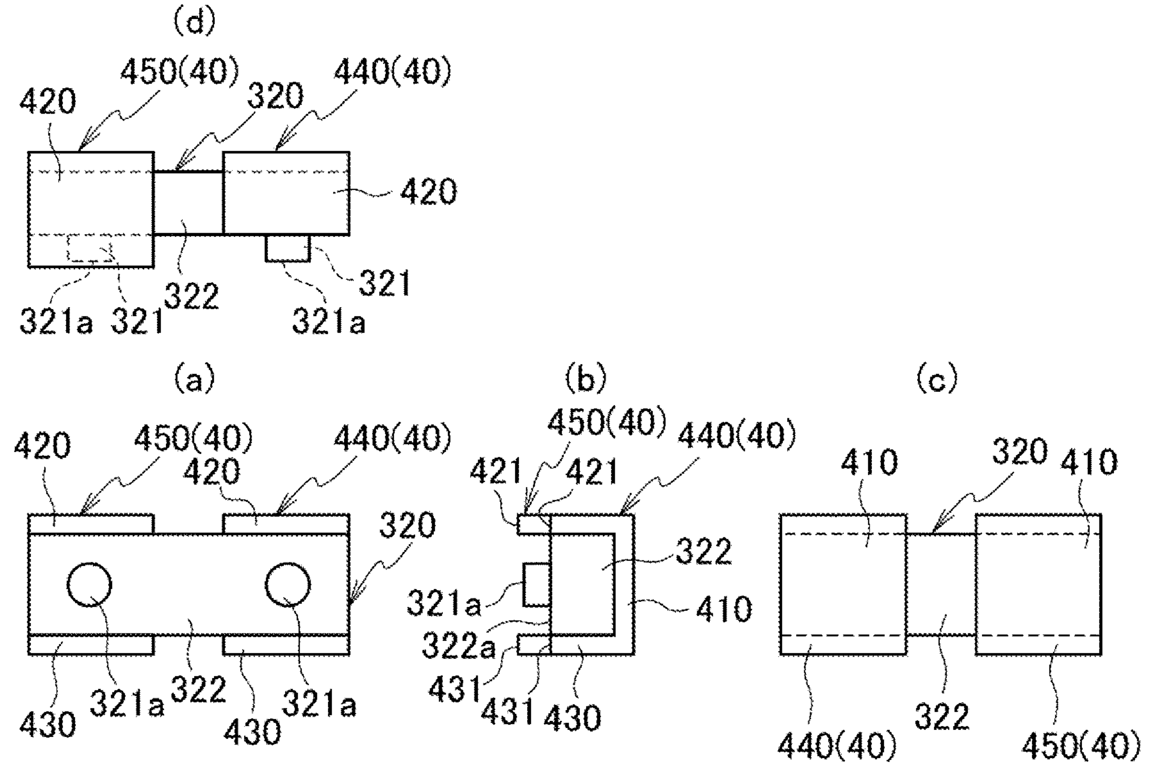
FIG. 26 includes schematic diagrams illustrating a yoke according to a ninth modification arranged adjacent to the movable contact maker, where (a) is a front view, (b) is a side view, (c) is a rear view, and (d) is a plan view.

Alternatively, the yoke 40 shown in FIG. 26 may be realized. In the yoke 40 shown in FIG. 26, the first yoke 440 and the second yoke 450 are formed separately as in the yoke 40 shown in FIG. 25.

Here, in FIG. 26, the shape of the first yoke 440 and the shape of the second yoke 450 are different from each other.

Specifically, the shape of the first yoke 440 is such that the tip 421 of the top wall 420 and the tip 431 of the bottom wall 430 are not made to protrude outward from the front surface (first surface) 322*a* of the movable contact maker 322. In contrast, the shape of the second yoke 450 is such that the tip 421 of the top wall 420 and the tip 431 of the bottom wall 430 are made to protrude outward from the front surface (first surface) 322*a* of the movable contact maker 322.

This makes it possible that the magnetic flux B that will be generated around the connecting section 460 can be taken into the first yoke 440 or the second yoke 450. Therefore, it is possible to more concentrate the magnetic flux B near the movable contacts 321, and it is possible to more increase the intensity of the magnetic flux B acting on the arc A.

Note that, in FIG. 26, at least one of the first yoke 440 or the second yoke 450 may be arranged to overlap a part of the contact region R2.

Alternatively, the first yoke 440 and the second yoke 450 can be different in shape in various ways.

Figure 27:
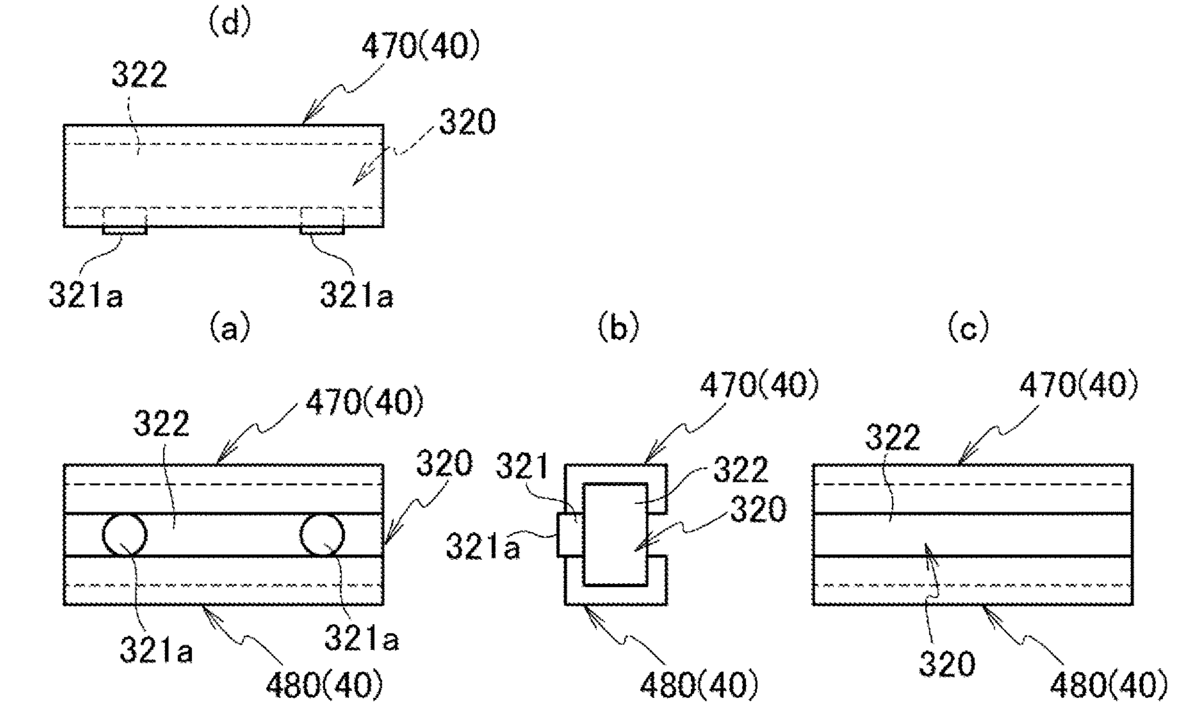
FIG. 27 includes schematic diagrams illustrating a yoke according to a tenth modification arranged adjacent to the movable contact maker, where (a) is a front view, (b) is a side view, (c) is a rear view, and (d) is a plan view.

Alternatively, the yoke 40 shown in FIG. 27 may be realized. The yoke 40 shown in FIG. 27 also has substantially the same structure as the yoke 40 shown in FIG. 21. That is, the yoke 40 shown in FIG. 27 has a shape in which the section of the top wall 420 and the bottom wall 430 protruded outward from the movable contact maker 322 extend to the movable contacts 321.

Here, in FIG. 27, the yoke 40 is composed of two yokes 470,480 which are vertically divided into two.

Specifically, the yoke 40 shown in FIG. 27 has a shape such that the sidewall 410 of the yoke 40 shown in FIG. 21 is separated at the central part in the vertical axis.

Then, a section that the movable contact 321 is formed has a belt-shaped exposed part (part uncovered in the yoke 40) extended from one end to the other end in the longitudinal axis when viewed from the front surface (first surface) 322*a* of the movable contact maker 322 in a state where the two yokes 470,480 which are vertically divided into two are fixed to the movable contact maker 322.

Further, a central part in the vertical axis has a belt-shaped exposed part (part uncovered in the yoke 40) extended from one end to the other end in the longitudinal axis when viewed from the back surface (second surface) 322*b* of the movable contact maker 322 in a state where the two yokes 470,480 which are vertically divided into two are fixed to the movable contact maker 322.

This also makes it possible to concentrate the magnetic flux B near the outer surface of the movable contact maker 322, and it is possible to increase the intensity of the magnetic flux B acting on the arc A.

Further, when the yoke 40 which surround the movable contact maker 322 is divided into two in the vertical axis, it is possible that the yoke 40 is fixed to the movable contact maker 322 more easily.

Figure 28:
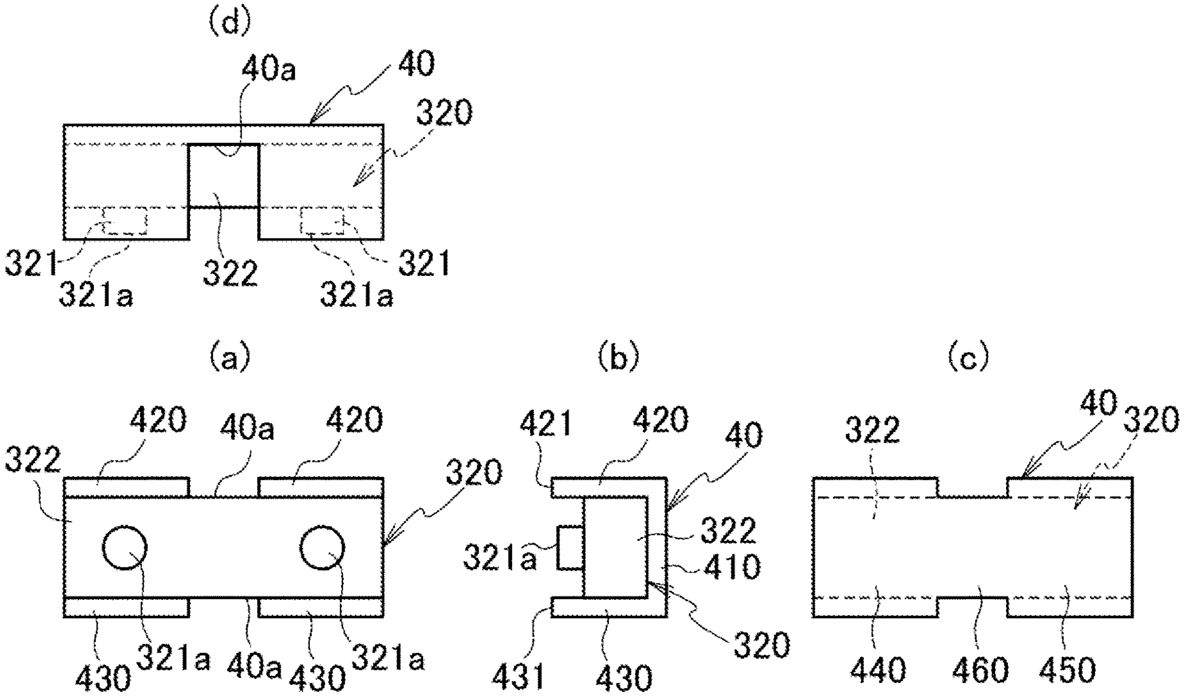
FIG. 28 includes schematic diagrams illustrating a yoke according to a eleventh modification arranged adjacent to the movable contact maker, where (a) is a front view, (b) is a side view, (c) is a rear view, and (d) is a plan view.

Alternatively, the yoke 40 shown in FIG. 28 may be realized. The yoke 40 shown in FIG. 28 also has substantially the same structure as the yoke 40 described in the above embodiment. That is, one in which the first yoke 440 and the second yoke 450 are integrated by the connecting section 460 is exemplified as the yoke 40 shown in FIG. 28.

Also, in the yoke 40 shown in FIG. 28, the notch 40*a* is provided at the connecting section 460.

Here, in the yoke 40 shown in FIG. 28, the notch 40*a* is formed not only at the top wall 420 but also at the bottom wall 430.

That is, in the yoke 40 shown in FIG. 28, the first yoke 440 and the second yoke 450 are connected only the sidewall 410.

This makes it possible to become the length of the connecting section 460 in the vertical axis shorter, and to prevent from concentrating the magnetic flux B near the connecting section 460. Therefore, it is possible to more concentrate the magnetic flux B near the movable contacts 321, and it is possible to more increase the intensity of the magnetic flux B acting on the arc A.

Figure 29:
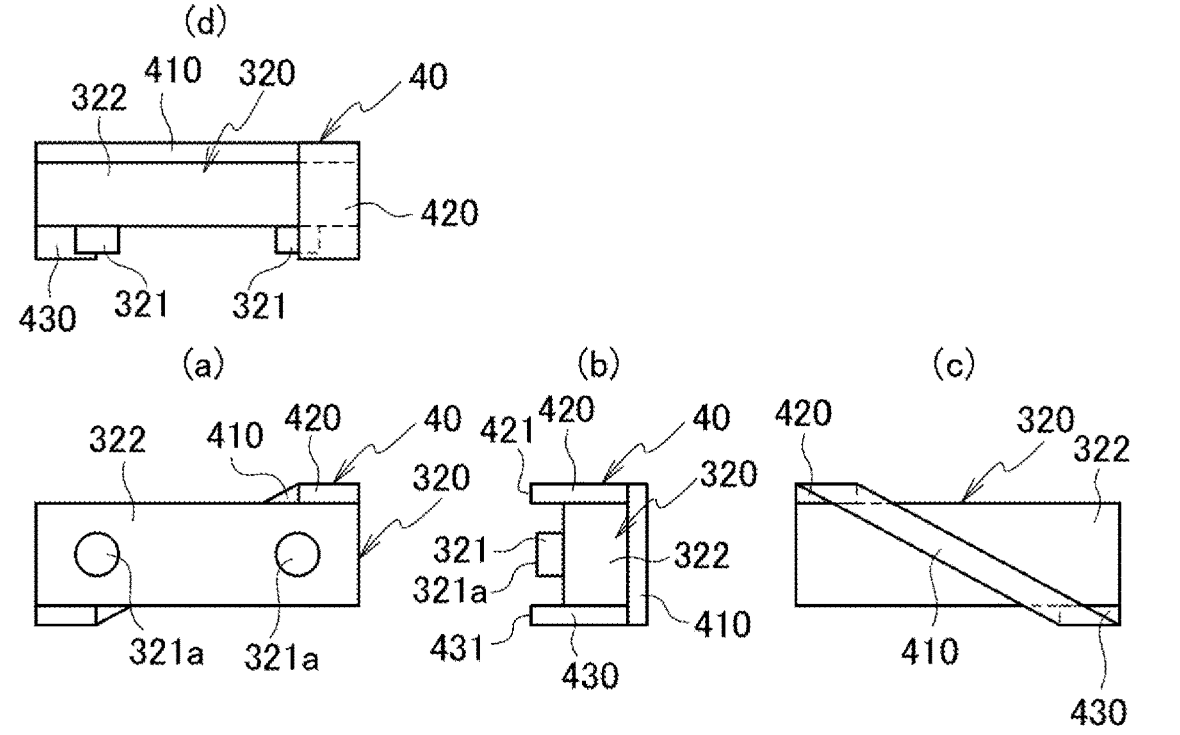
FIG. 29 includes schematic diagrams illustrating a yoke according to a twelfth modification arranged adjacent to the movable contact maker, where (a) is a front view, (b) is a side view, (c) is a rear view, and (d) is a plan view.

Alternatively, the yoke 40 shown in FIG. 29 may be realized. In the yoke 40 shown in FIG. 29, the top wall 420 is arranged on one side in the longitudinal axis and the bottom wall 430 is arranged on the other side in a state of being fixed to the movable contact maker 322.

Then, the top wall 420 and the bottom wall 430 arranged in an offset state in the longitudinal axis are connected by the side wall 410 on the back surface (second surface) 322*b* side of the movable contact maker 322.

In FIG. 29, the side wall 410 is formed so as to extend diagonally along the diagonal line of the movable contact maker 322 when viewed from the back surface (second surface) 322*b* of the movable contact maker 322.

This also makes it possible to concentrate the magnetic flux B near the outer surface of the movable contact maker 322, and it is possible to increase the intensity of the magnetic flux B acting on the arc A.

Figure 30:
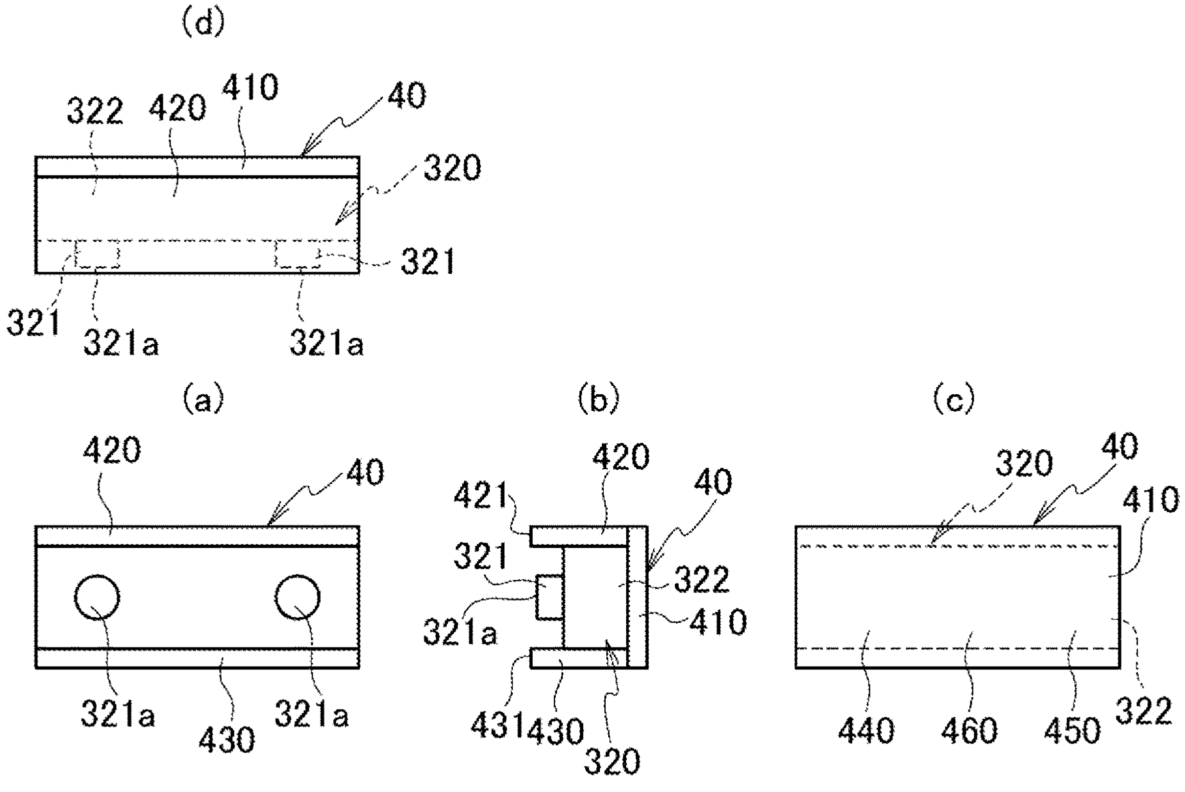
FIG. 30 includes schematic diagrams illustrating a yoke according to a thirteenth modification arranged adjacent to the movable contact maker, where (a) is a front view, (b) is a side view, (c) is a rear view, and (d) is a plan view.

Alternatively, the yoke 40 shown in FIG. 30 may be realized. The yoke 40 shown in FIG. 30 also has substantially the same structure as the yoke 40 shown in FIG. 18.

Here, in the yoke 40 shown in FIG. 30, the side wall 410, the top wall 420, and the bottom wall 430 are formed as separate parts respectively.

Here, the yoke 40 may be composed of the side wall 410, the top wall 420, and the bottom wall 430, which are separately formed by using the same material, or the side wall 410, the top wall 420 and the bottom wall 430 may be formed by using different materials respectively. Alternatively, any one of the side wall 410, the top wall 420 and the bottom wall 430 may be formed by using a material different from the other two.

This also makes it possible to concentrate the magnetic flux B near the outer surface of the movable contact maker 322, and it is possible to increase the intensity of the magnetic flux B acting on the arc A.

Figure 31:
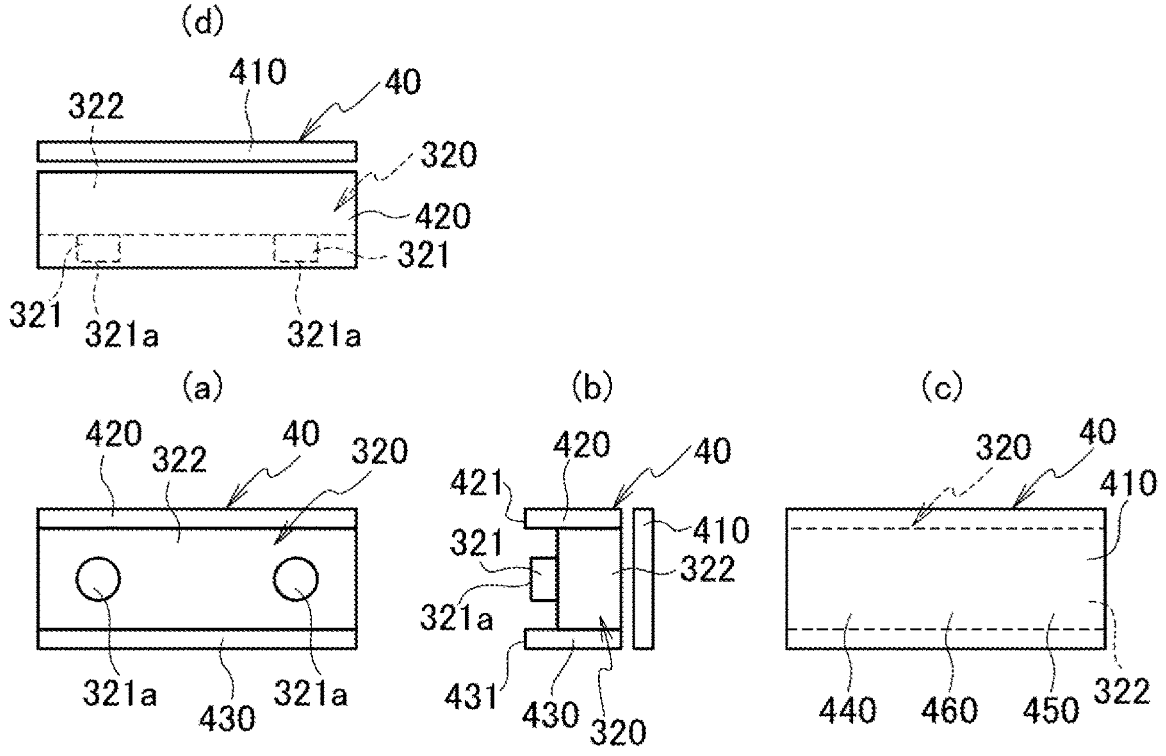
FIG. 31 includes schematic diagrams illustrating a yoke according to a fourteenth modification arranged adjacent to the movable contact maker, where (a) is a front view, (b) is a side view, (c) is a rear view, and (d) is a plan view.

Alternatively, the yoke 40 shown in FIG. 31 may be realized. In the yoke 40 shown in FIG. 31, the side wall 410, the top wall 420, and the bottom wall 430 are formed as separate parts respectively as in the yoke 40 shown in FIG. 30.

Here, the yoke 40 shown in FIG. 31 is arranged so as to surround the movable contact maker 322 with a gap formed between the top wall 420 and the side wall 410 and between the bottom wall 430 and the side wall 410.

Specifically, the side wall 410 is arranged so as to be separated from the back surface (second surface) 322*b* of the movable contact maker 322. By doing so, the gap is formed between the top wall 420 and the side wall 410 and between the bottom wall 430 and the side wall 410.

This also makes it possible to concentrate the magnetic flux B near the outer surface of the movable contact maker 322, and it is possible to increase the intensity of the magnetic flux B acting on the arc A.

Further, when the side wall 410 is separated from the back surface (second surface) 322*b* of the movable contact maker 322, the yoke 40 (side wall 410) is arranged in a space where the distance from the movable contact maker 322 becomes long and the strength of the magnetic flux B becomes weak. This makes it possible to concentrate the magnetic flux B around the movable contact maker 322 more efficiently.

Note that, in FIG. 31, the gap is formed between the top wall 420 and the side wall 410 and between the bottom wall 430 and the side wall 410 as an example, but either one of the top wall 420 and the bottom wall 430 may be in contact with the side wall 410.

Further, any one or more parts selected from the side wall 410, the top wall 420, and the bottom wall 430 may be separated from the movable contact maker 322.

Figure 32:
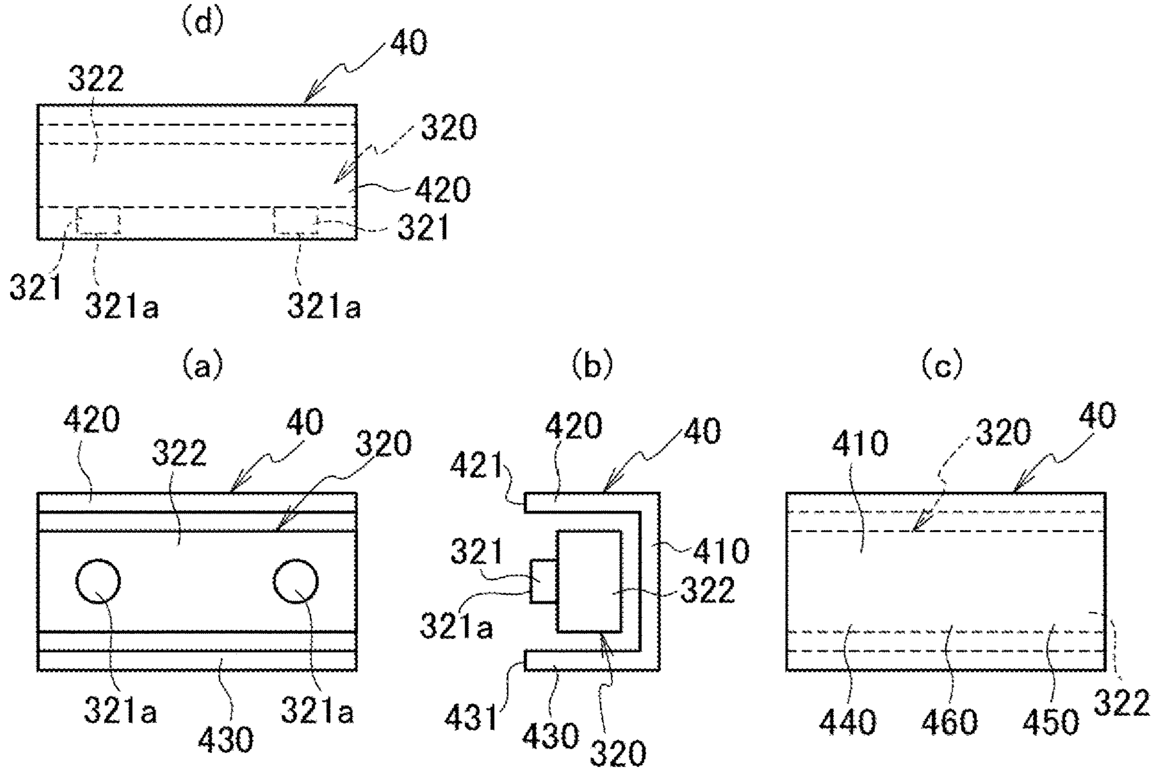
FIG. 32 includes schematic diagrams illustrating a yoke according to a fifteenth modification arranged adjacent to the movable contact maker, where (a) is a front view, (b) is a side view, (c) is a rear view, and (d) is a plan view.

Alternatively, the yoke 40 shown in FIG. 32 may be realized. The yoke 40 shown in FIG. 32 also has substantially the same structure as the yoke 40 shown in FIG. 18.

Here, in FIG. 32, the yoke 40 in which the side wall 410, the top wall 420, and the bottom wall 430 are integrated is used, and the entire yoke 40 is separated from the outer surface of the movable contact maker 322 in such a state that the yoke 40 is arranged so as to surround the movable contact maker 322.

That is, in FIG. 32, a gap is formed between the yoke 40 and movable contact maker 322.

This also makes it possible to concentrate the magnetic flux B near the outer surface of the movable contact maker 322, and it is possible to increase the intensity of the magnetic flux B acting on the arc A.

Next, with reference to FIGS. 33 to 45, description is given of a various arrangement pattern of the yoke 40.

Here, FIGS. 33 to 45 are given of the arrangement pattern of the yoke 40, when the movable contact maker (the body part adjacent to the yoke 40) 322 has one contact (when one body part has only one contact).

Figure 33:
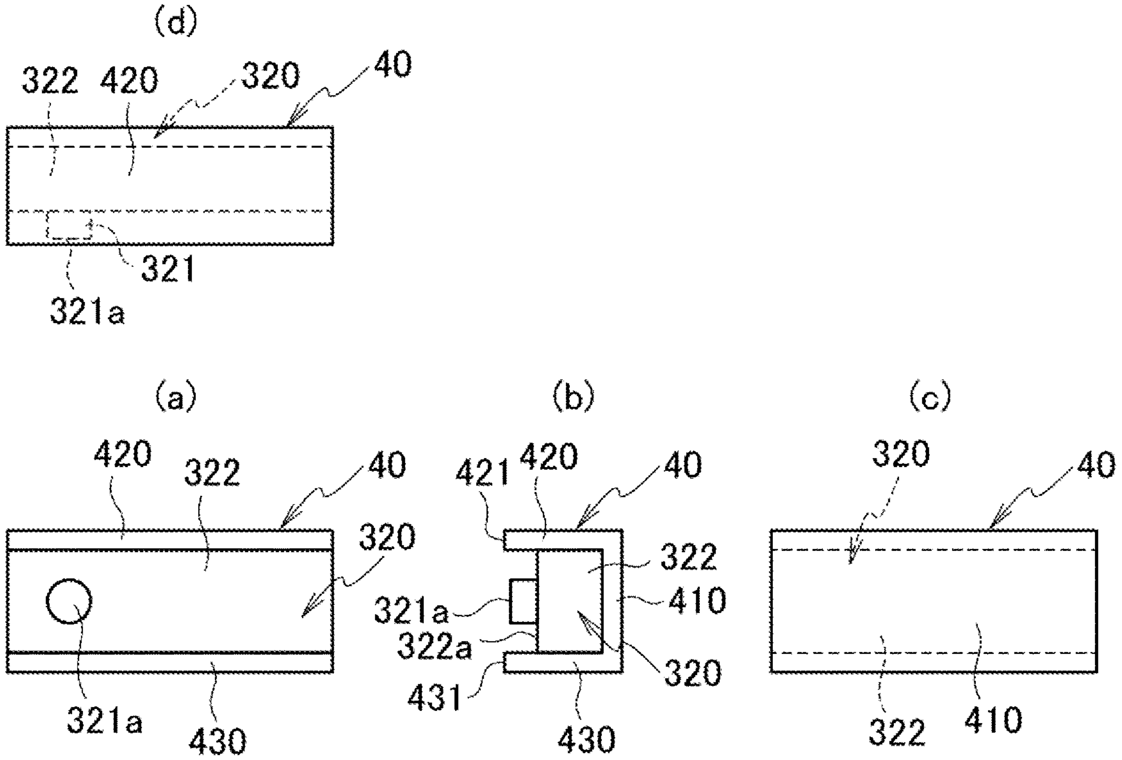
FIG. 33 includes schematic diagrams illustrating a yoke according to a sixteenth modification arranged adjacent to a body part having one contact, where (a) is a front view, (b) is a side view, (c) is a rear view, and (d) is a plan view.

First, it is possible to arrange the yoke 40 shown in FIG. 33 adjacent to the movable contact maker 322 having one contact.

The yoke 40 shown in FIG. 33 has substantially the same structure as the yoke 40 shown in FIG. 18.

Specifically, the yoke 40 shown in FIG. 33 includes the sidewall 410, the top wall 420 and the bottom wall 430, and is fixed to the movable contact maker 322.

Then, the front surface 411 of the side wall 410 is arranged to face the back surface (second surface) 322*b* of the movable contact maker 322 with the tip 421 of the top wall 420 and the tip 431 of the bottom wall 430 facing the opposing body part (in FIG. 33, body part 312).

The side wall 410 is also arranged to overlap the entire area of the contact region R2 where the fixed contacts (first contact) 311 and the movable contacts (second contact) 321 come into contact, when viewed along the axis in which the fixed contacts 311 and the movable contacts 321 move relative to each other.

Here, the yoke 40 shown in FIG. 33 is also arranged in such a state that the front surface 411 of the side wall 410 comes in surface contact with the back surface (second surface) 322*b* of the movable contact maker 322. Thus, when the front surface 411 of the side wall 410 comes in surface contact with the back surface (second surface) 322*b* of the movable contact maker 322, it is possible to concentrate the magnetic flux B near the outer surface of the movable contact maker 322, and it is possible to increase the intensity of the magnetic flux B acting on the arc A.

Also, in the yoke 40 shown in FIG. 33, the tip 421 of the top wall 420 and the tip 431 of the bottom wall 430 are made to protrude outward from the front surface (first surface) 322*a* of the movable contact maker 322.

Further, in the yoke 40 shown in FIG. 33, the tip 421 of the top wall 420 and the tip 431 of the bottom wall 430 are made to protrude outward from tips (tops) 321*a* of the movable contacts 321. This makes it possible to exist the yoke 40 concentrating the magnetic flux B upward and downward of the arc A. Therefore, it is possible to increase the intensity of the magnetic flux B acting on the arc A.

Figure 34:
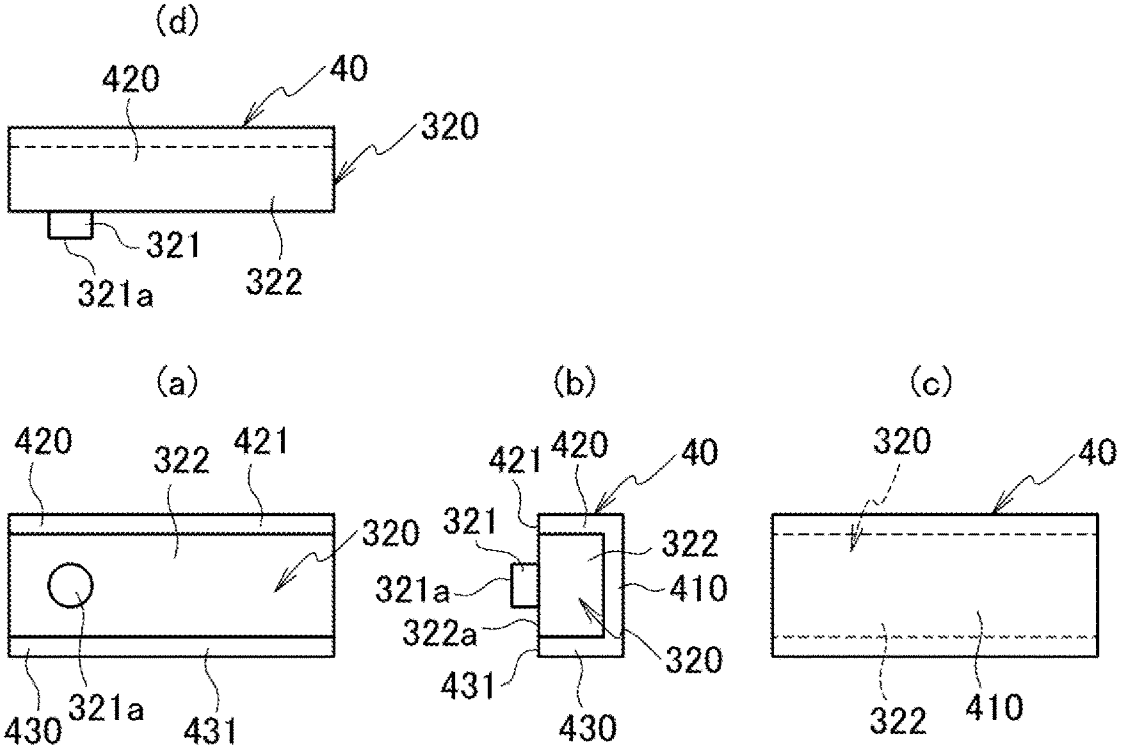
FIG. 34 includes schematic diagrams illustrating a yoke according to a seventeenth modification arranged adjacent to the body part having one contact, where (a) is a front view, (b) is a side view, (c) is a rear view, and (d) is a plan view.

Alternatively, the yoke 40 shown in FIG. 34 may be realized. The yoke 40 shown in FIG. 34 also has substantially the same structure as the yoke 40 shown in FIG. 33.

Here, in the yoke 40 shown in FIG. 34, the tip 421 of the top wall 420 and the tip 431 of the bottom wall 430 are not made to protrude outward from the front surface (first surface) 322*a* of the movable contact maker 322.

Note that, in FIG. 34, the tip 421 of the top wall 420 and the tip 431 of the bottom wall 430 are substantially flush with the front surface (first surface) 322*a* of the movable contact maker 322 as an example, but at least one of the tip 421 of the top wall 420 or the tip 431 of the bottom wall 430 may be located inside to the front surface (first surface) 322*a* of the movable contact maker 322.

Figure 35:
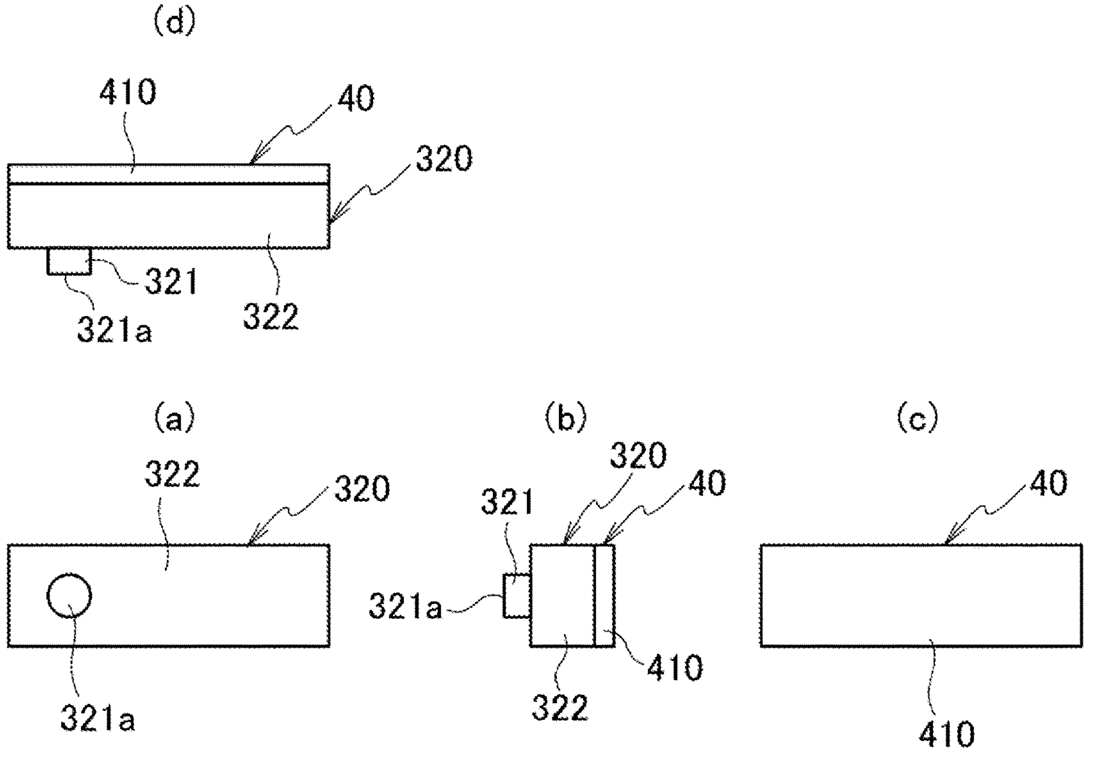
FIG. 35 includes schematic diagrams illustrating a yoke according to an eighteenth modification arranged adjacent to the body part having one contact, where (a) is a front view, (b) is a side view, (c) is a rear view, and (d) is a plan view.

Alternatively, the yoke 40 shown in FIG. 35 may be realized. The yoke 40 shown in FIG. 35 does not include the top wall 420 and the bottom wall 430, only includes the sidewall 410.

That is, the yoke 40 shown in FIG. 35 is only arranged to the back surface (second surface) 322*b* of the movable contact maker 322. This also makes it possible to concentrate the magnetic flux B near the outer surface of the movable contact maker 322, and it is possible to increase the intensity of the magnetic flux B acting on the arc A.

Figure 36:
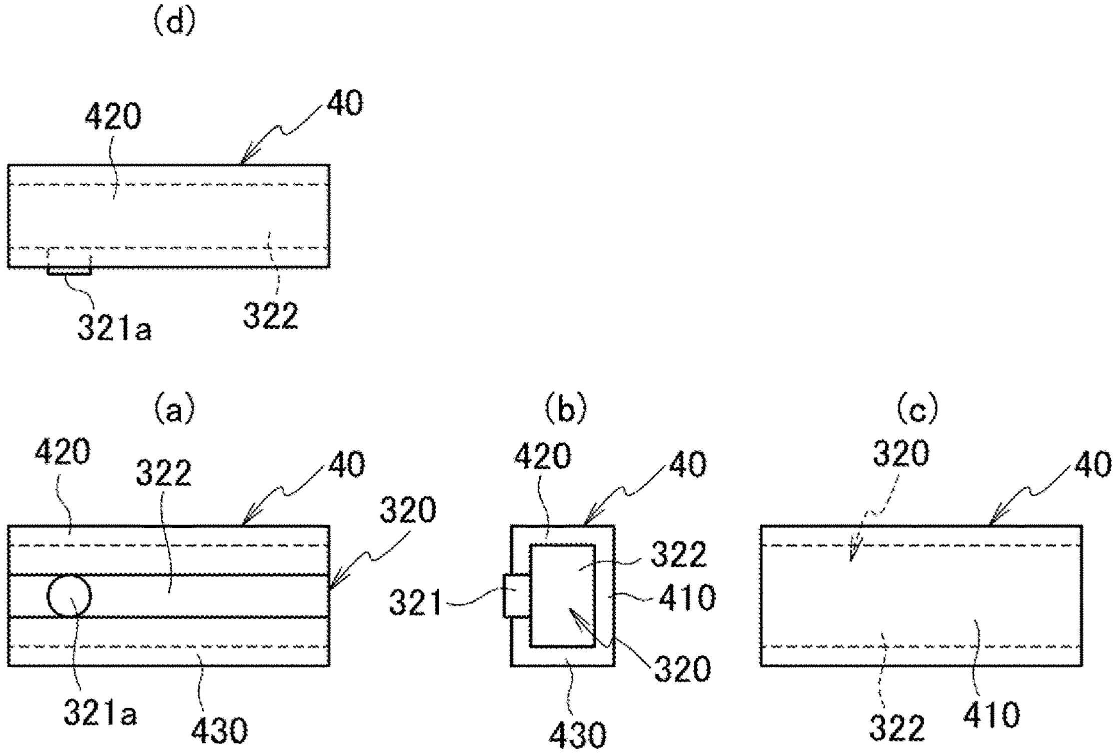
FIG. 36 includes schematic diagrams illustrating a yoke according to a nineteenth modification arranged adjacent to the body part having one contact, where (a) is a front view, (b) is a side view, (c) is a rear view, and (d) is a plan view.

Alternatively, the yoke 40 shown in FIG. 36 may be realized. The yoke 40 shown in FIG. 36 has a shape in which the section of the top wall 420 and the bottom wall 430 protruded outward from the movable contact maker 322 extend to the movable contact 321.

That is, the yoke 40 shown in FIG. 36 is arranged so as to surround the movable contact maker 322. This makes it possible to more concentrate the magnetic flux B near the outer surface of the movable contact maker 322, and it is possible to more increase the intensity of the magnetic flux B acting on the arc A.

Note that, in the yoke 40 shown in FIG. 36, a section that the movable contact 321 is formed has a belt-shaped exposed part (part uncovered in the yoke 40) extended from one end to the other end in the longitudinal axis when viewed from the front surface (first surface) 322*a* of the movable contact maker 322. That is, the yoke 40 shown in FIG. 36 has an approximate C-shape in a state viewed along the longitudinal axis of the movable contact maker 322. This makes it possible to fix the yoke 40 to the movable contact maker 322 without interfering with the movable contact 321.

Figure 37:
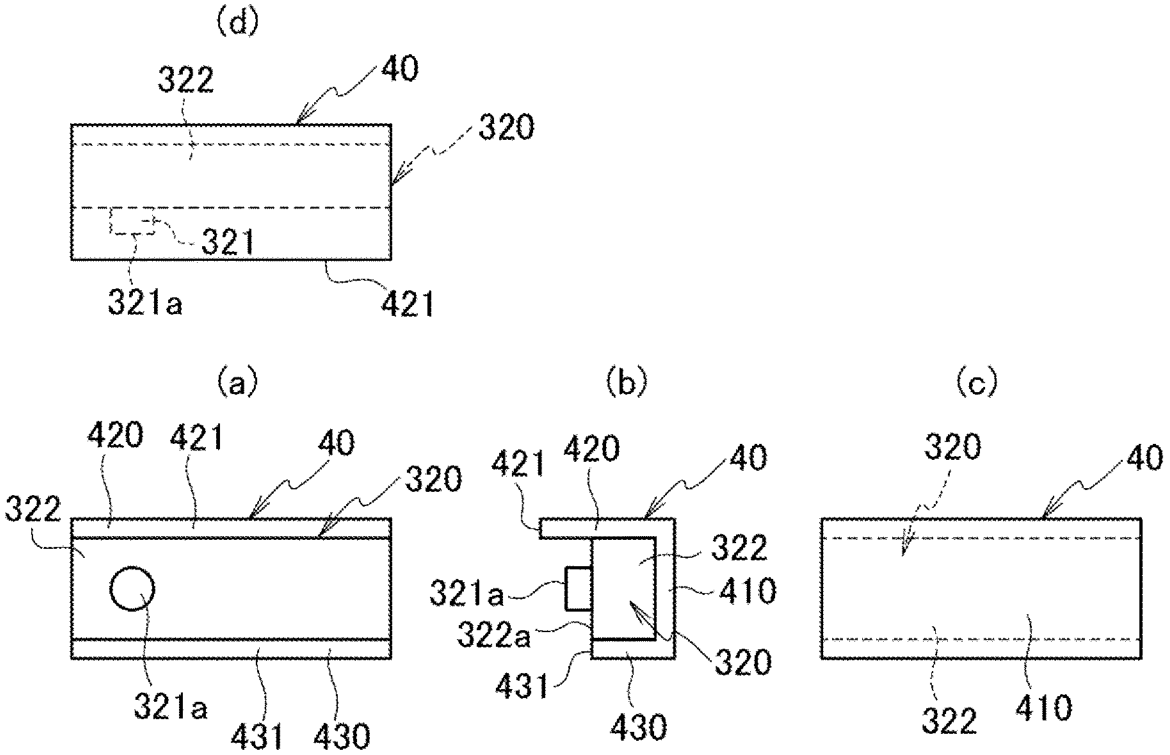
FIG. 37 includes schematic diagrams illustrating a yoke according to a twentieth modification arranged adjacent to the body part having one contact, where (a) is a front view, (b) is a side view, (c) is a rear view, and (d) is a plan view.

Alternatively, the yoke 40 shown in FIG. 37 may be realized. In the yoke 40 shown in FIG. 37, the tip 421 of the top wall 420 is made to protrude outward from tip (top) 321*a* of the movable contact 321, but the tip 431 of the bottom wall 430 is not made to protrude outward from the front surface (first surface) 322*a* of the movable contact maker 322.

That is, the yoke 40 shown in FIG. 37 has an asymmetrical shape in the vertical axis when viewed along the longitudinal axis of the movable contact maker 322.

This also makes it possible to concentrate the magnetic flux B near the outer surface of the movable contact maker 322, and it is possible to increase the intensity of the magnetic flux B acting on the arc A.

Note that, in the yoke 40 shown in FIG. 37, the tip 421 of the top wall 420 is made to protrude outward from tip (top) 321*a* of the movable contact 321 as an example, but the tip 421 of the top wall 420 may be made not to protrude outward from tip (top) 321*a* of the movable contact 321.

Figure 38:
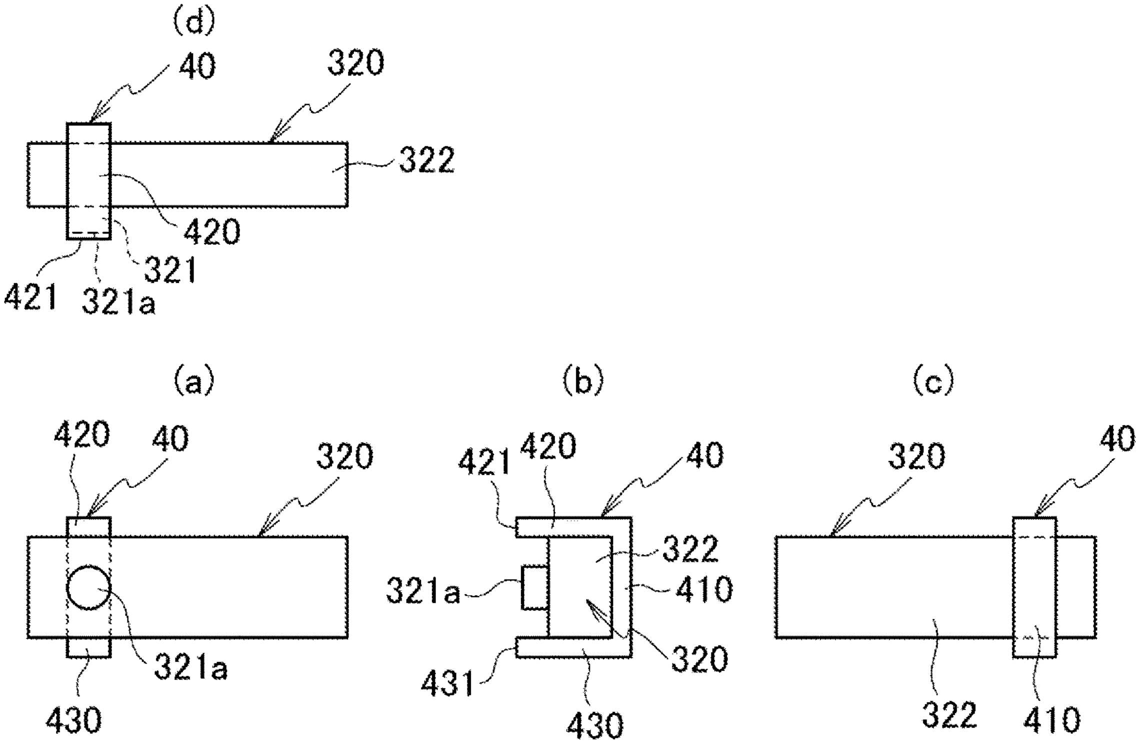
FIG. 38 includes schematic diagrams illustrating a yoke according to a twenty-first modification arranged adjacent to the body part having one contact, where (a) is a front view, (b) is a side view, (c) is a rear view, and (d) is a plan view.

Alternatively, the yoke 40 shown in FIG. 38 may be realized.

The yoke 40 shown in FIG. 38 is arranged to overlap the movable contact maker 322 between outer end of the movable contact 321 in the longitudinal axis and an end of center side, when viewed along the axis in which the fixed contact 311 and the movable contact 321 move relative to each other.

This makes it possible to prevent from concentrating the magnetic flux B outer side of the movable contacts 321 where the arc A is not generated. Therefore, it is possible to more concentrate the magnetic flux B near the outer surface of the movable contact maker 322, and it is possible to more increase the intensity of the magnetic flux B acting on the arc A.

Note that, the yoke 40 shown in FIG. 38 is arranged to overlap the entire area of the contact region R2 where the fixed contact (first contact) 311 and the movable contact (second contact) 321 come into contact, when viewed along the axis in which the fixed contact 311 and the movable contact 321 move relative to each other.

Figure 39:
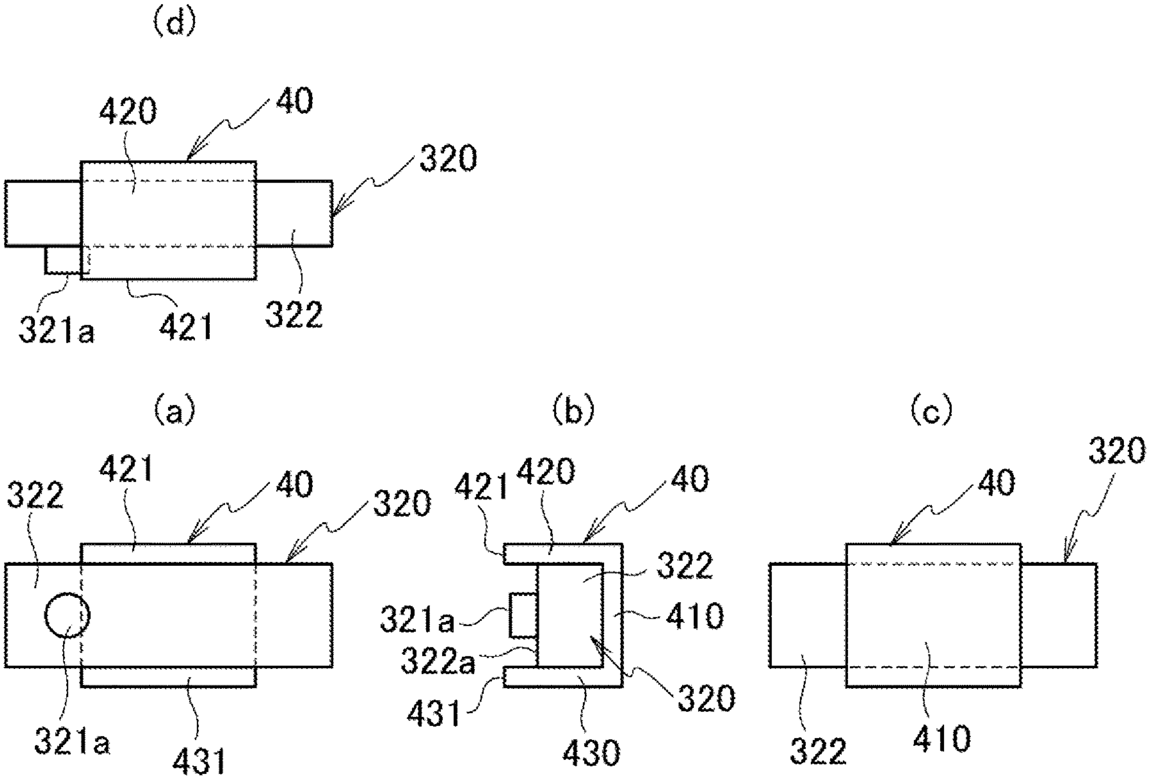
FIG. 39 includes schematic diagrams illustrating a yoke according to a twenty-second modification arranged adjacent to the body part having one contact, where (a) is a front view, (b) is a side view, (c) is a rear view, and (d) is a plan view.

Alternatively, the yoke 40 shown in FIG. 39 may be realized.

The yoke 40 shown in FIG. 39 is arranged to overlap a part of the contact region R2 where the fixed contact (first contact) 311 and the movable contact (second contact) 321 come into contact, when viewed along the axis in which the fixed contact 311 and the movable contact 321 move relative to each other.

This also makes it possible to more concentrate the magnetic flux B near the movable contact 321, and it is possible to more increase the intensity of the magnetic flux B acting on the arc A.

Note that, in FIG. 39, only end of center side in the longitudinal axis of the movable contact 321 is overlapped to the yoke 40 as an example, but substantially half portion of center side in the longitudinal axis of the movable contact 321 may be overlapped to the yoke 40.

Figure 40:
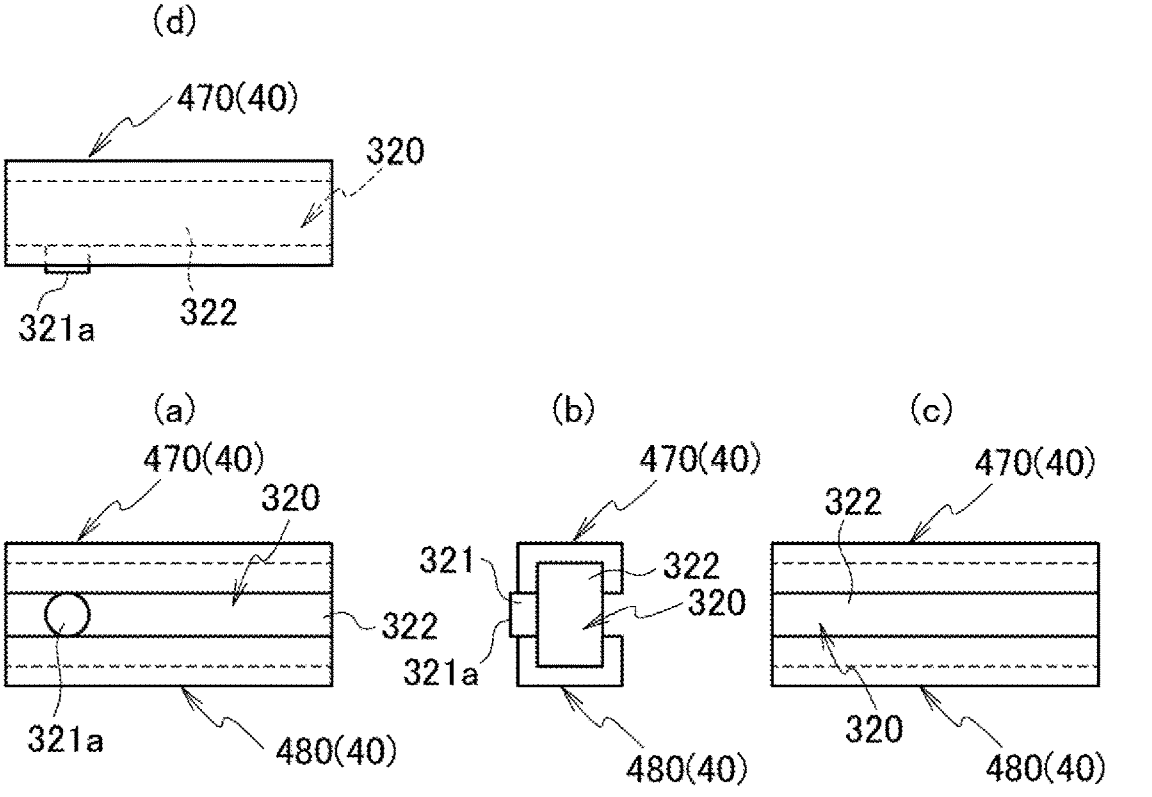
FIG. 40 includes schematic diagrams illustrating a yoke according to a twenty-third modification arranged adjacent to the body part having one contact, where (a) is a front view, (b) is a side view, (c) is a rear view, and (d) is a plan view.

Alternatively, the yoke 40 shown in FIG. 40 may be realized. The yoke 40 shown in FIG. 40 also has substantially the same structure as the yoke 40 shown in FIG. 36. That is, the yoke 40 shown in FIG. 40 has a shape in which the section of the top wall 420 and the bottom wall 430 protruded outward from the movable contact maker 322 extend to the movable contact 321.

Here, in FIG. 40, the yoke 40 is composed of two yokes 470,480 which are vertically divided into two.

Specifically, the yoke 40 shown in FIG. 40 has a shape such that the sidewall 410 of the yoke 40 shown in FIG. 36 is separated at the central part in the vertical axis.

Then, a section that the movable contact 321 is formed has a belt-shaped exposed part (part uncovered in the yoke 40) extended from one end to the other end in the longitudinal axis when viewed from the front surface (first surface) 322*a* of the movable contact maker 322 in a state where the two yokes 470,480 which are vertically divided into two are fixed to the movable contact maker 322.

Further, a central part in the vertical axis has a belt-shaped exposed part (part uncovered in the yoke 40) extended from one end to the other end in the longitudinal axis when viewed from the back surface (second surface) 322*b* of the movable contact maker 322 in a state where the two yokes 470,480 which are vertically divided into two are fixed to the movable contact maker 322.

This also makes it possible to concentrate the magnetic flux B near the outer surface of the movable contact maker 322, and it is possible to increase the intensity of the magnetic flux B acting on the arc A.

Further, when the yoke 40 which surround the movable contact maker 322 is divided into two in the vertical axis, it is possible that the yoke 40 is fixed to the movable contact maker 322 more easily.

Figure 41:
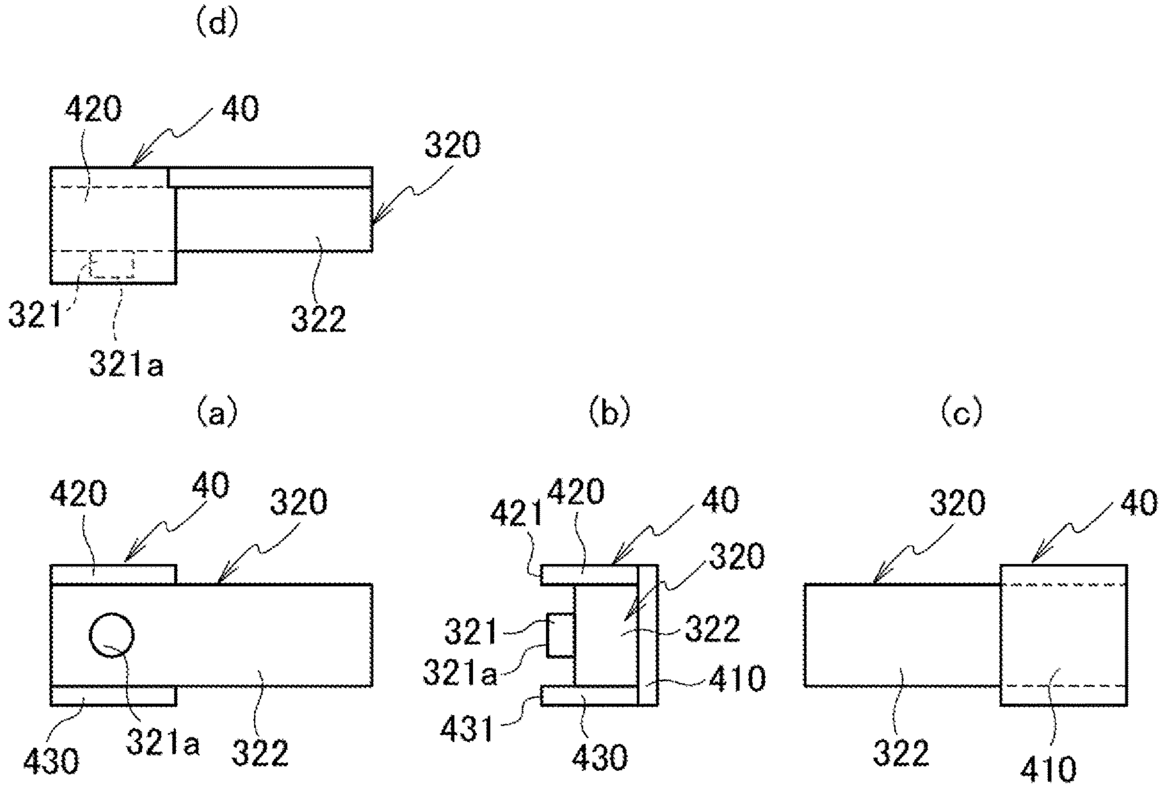
FIG. 41 includes schematic diagrams illustrating a yoke according to a twenty-fourth modification arranged adjacent to the body part having one contact, where (a) is a front view, (b) is a side view, (c) is a rear view, and (d) is a plan view.

Alternatively, the yoke 40 shown in FIG. 41 may be realized.

The yoke 40 shown in FIG. 41 includes the sidewall 410, the top wall 420 and the bottom wall 430.

Here, in the yoke 40 shown in FIG. 41, the top wall 420 and the bottom wall 430 are formed only at the section that the movable contact 321 of the movable contact maker 322 is formed.

That is, the yoke 40 shown in FIG. 41 has a shape in which a section (top wall 420 and bottom wall 430) arranged on a section of the movable contact maker 322 where the movable contact 321 is not formed is cut off.

In this way, the length of the circumference of the yoke 40 arranged on the section of the movable contact maker 322 where the movable contact 321 is not formed is shorter than the length of the circumference of the yoke 40 arranged on a section of the movable contact maker 322 where the movable contact 321 is formed. Therefore, it is possible to more concentrate the magnetic flux B near the movable contact 321, and to more increase the intensity of the magnetic flux B acting on the arc A.

Figure 42:
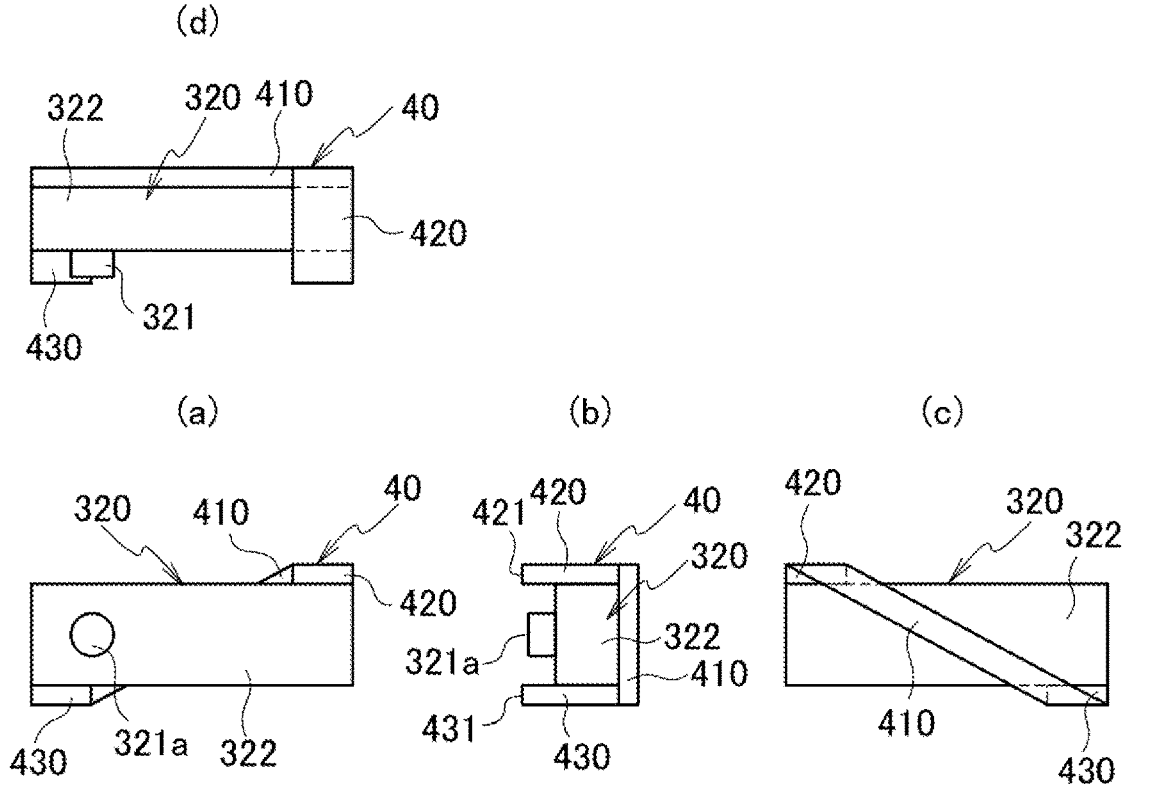
FIG. 42 includes schematic diagrams illustrating a yoke according to a twenty-fifth modification arranged adjacent to the body part having one contact, where (a) is a front view, (b) is a side view, (c) is a rear view, and (d) is a plan view.

Alternatively, the yoke 40 shown in FIG. 42 may be realized. In the yoke 40 shown in FIG. 42, the top wall 420 is arranged on one side in the longitudinal axis and the bottom wall 430 is arranged on the other side in a state of being fixed to the movable contact maker 322.

Then, the top wall 420 and the bottom wall 430 arranged in an offset state in the longitudinal axis are connected by the side wall 410 on the back surface (second surface) 322*b* side of the movable contact maker 322.

In FIG. 42, the side wall 410 is formed so as to extend diagonally along the diagonal line of the movable contact maker 322 when viewed from the back surface (second surface) 322*b* of the movable contact maker 322.

This also makes it possible to concentrate the magnetic flux B near the outer surface of the movable contact maker 322, and it is possible to increase the intensity of the magnetic flux B acting on the arc A.

Figure 43:
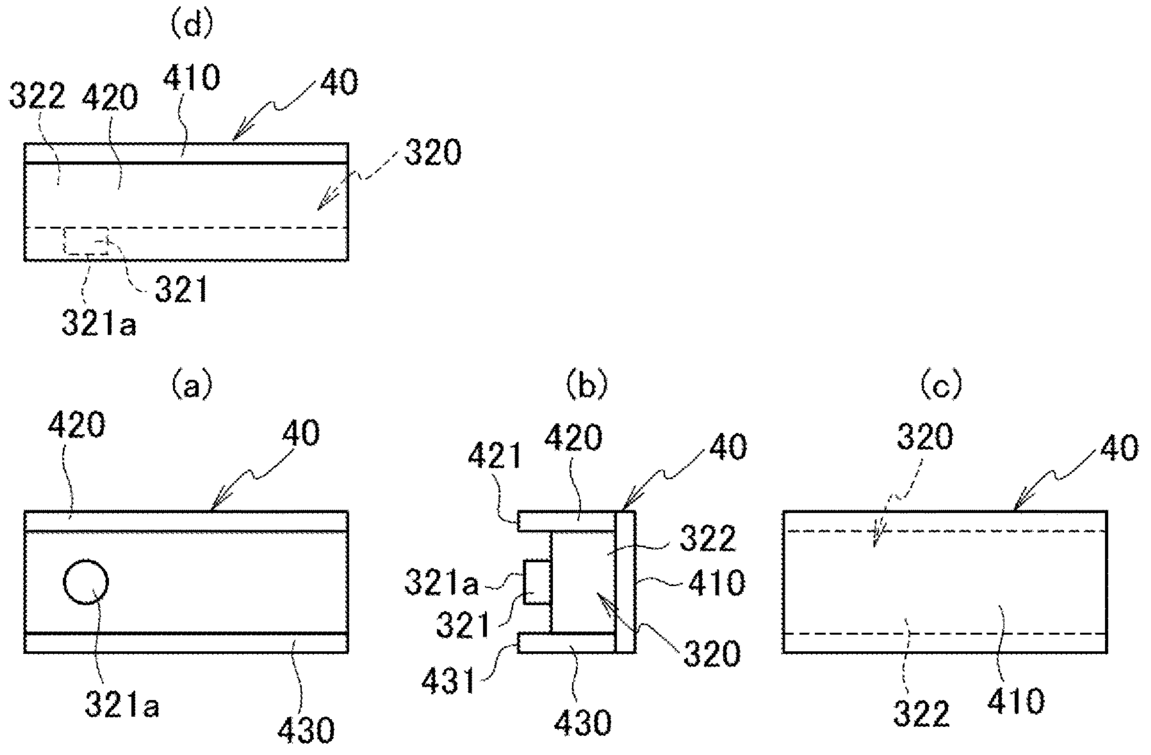
FIG. 43 includes schematic diagrams illustrating a yoke according to a twenty-sixth modification arranged adjacent to the body part having one contact, where (a) is a front view, (b) is a side view, (c) is a rear view, and (d) is a plan view.

Alternatively, the yoke 40 shown in FIG. 43 may be realized. The yoke 40 shown in FIG. 43 also has substantially the same structure as the yoke 40 shown in FIG. 33.

Here, in the yoke 40 shown in FIG. 43, the side wall 410, the top wall 420, and the bottom wall 430 are formed as separate parts respectively.

Here, the yoke 40 may be composed of the side wall 410, the top wall 420, and the bottom wall 430, which are separately formed by using the same material, or the side wall 410, the top wall 420 and the bottom wall 430 may be formed by using different materials respectively. Alternatively, any one of the side wall 410, the top wall 420 and the bottom wall 430 may be formed by using a material different from the other two.

This also makes it possible to concentrate the magnetic flux B near the outer surface of the movable contact maker 322, and it is possible to increase the intensity of the magnetic flux B acting on the arc A.

Figure 44:
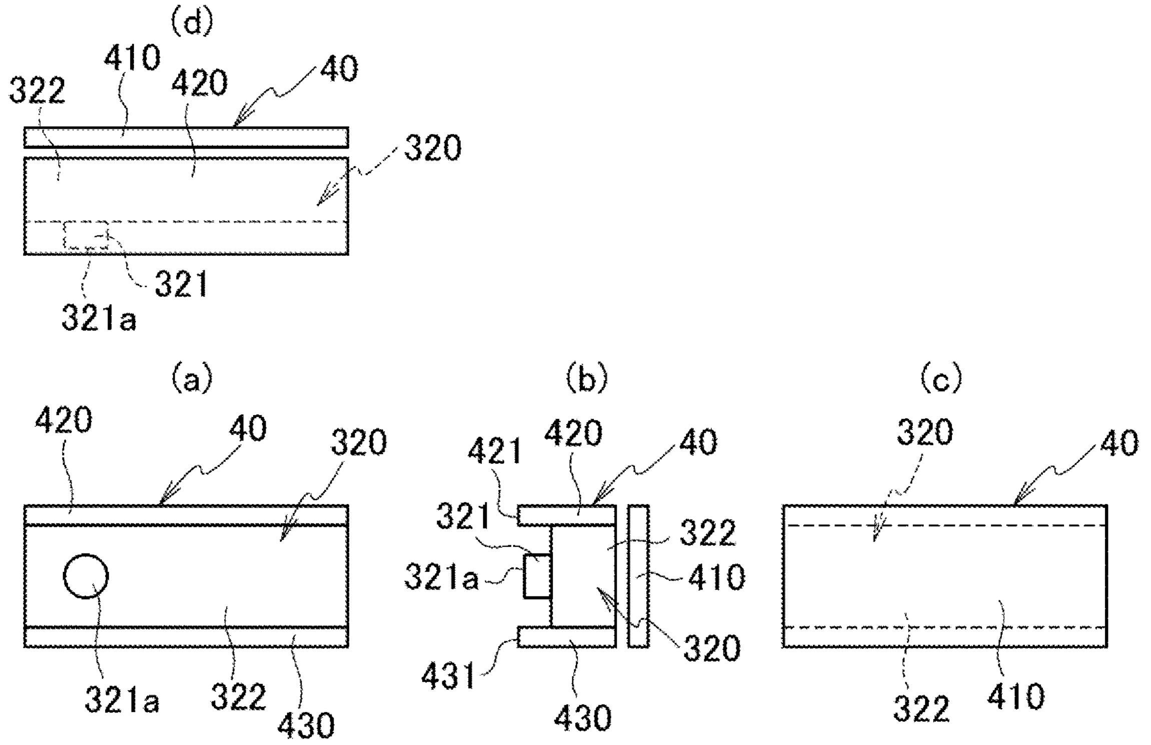
FIG. 44 includes schematic diagrams illustrating a yoke according to a twenty-seventh modification arranged adjacent to the body part having one contact, where (a) is a front view, (b) is a side view, (c) is a rear view, and (d) is a plan view.

Alternatively, the yoke 40 shown in FIG. 44 may be realized. In the yoke 40 shown in FIG. 44, the side wall 410, the top wall 420, and the bottom wall 430 are formed as separate parts respectively as in the yoke 40 shown in FIG. 43.

Here, the yoke 40 shown in FIG. 44 is arranged so as to surround the movable contact maker 322 with a gap formed between the top wall 420 and the side wall 410 and between the bottom wall 430 and the side wall 410.

Specifically, the side wall 410 is arranged so as to be separated from the back surface (second surface) 322*b* of the movable contact maker 322. By doing so, the gap is formed between the top wall 420 and the side wall 410 and between the bottom wall 430 and the side wall 410.

This also makes it possible to concentrate the magnetic flux B near the outer surface of the movable contact maker 322, and it is possible to increase the intensity of the magnetic flux B acting on the arc A.

Further, when the side wall 410 is separated from the back surface (second surface) 322*b* of the movable contact maker 322, the yoke 40 (side wall 410) is arranged in a space where the distance from the movable contact maker 322 becomes long and the strength of the magnetic flux B becomes weak. This makes it possible to concentrate the magnetic flux B around the movable contact maker 322 more efficiently.

Note that, in FIG. 44, the gap is formed between the top wall 420 and the side wall 410 and between the bottom wall 430 and the side wall 410 as an example, but either one of the top wall 420 and the bottom wall 430 may be in contact with the side wall 410.

Further, any one or more parts selected from the side wall 410, the top wall 420, and the bottom wall 430 may be separated from the movable contact maker 322.

Figure 45:
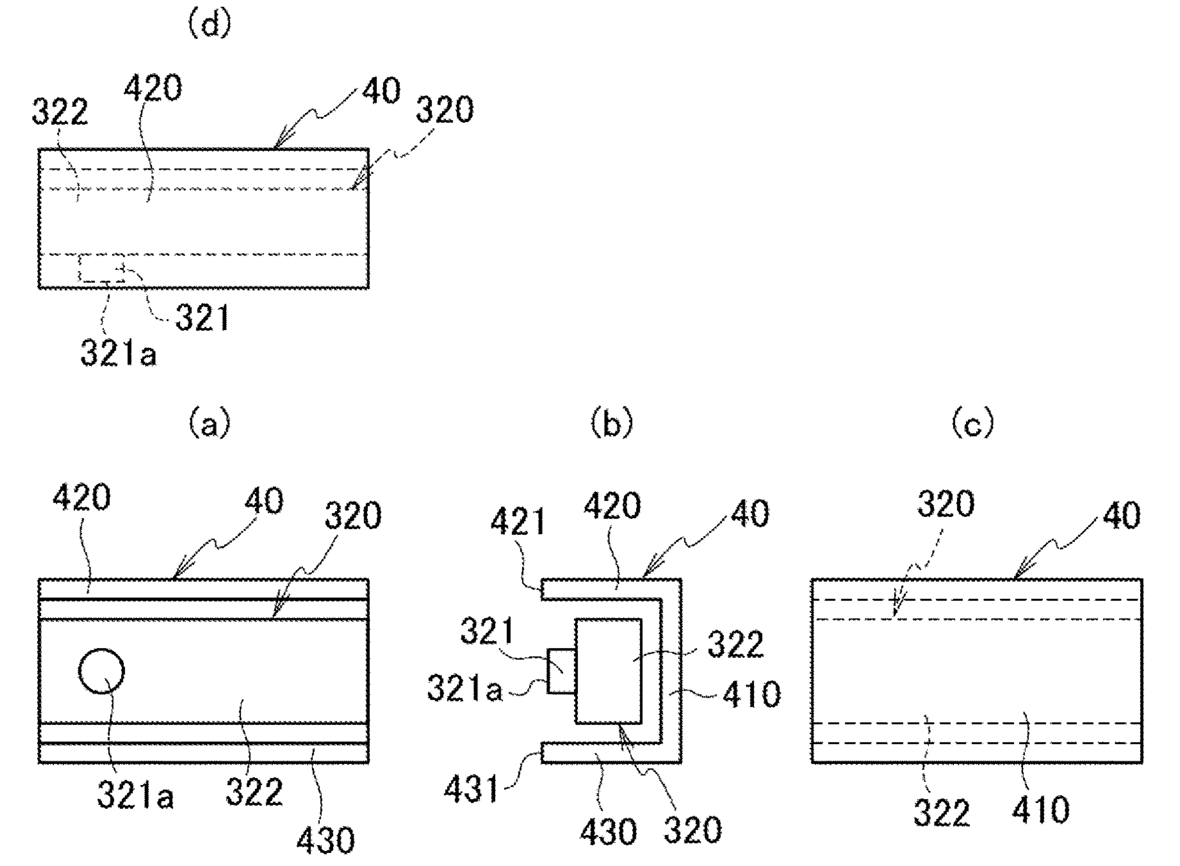
FIG. 45 includes schematic diagrams illustrating a yoke according to a twenty-eighth modification arranged adjacent to the body part having one contact, where (a) is a front view, (b) is a side view, (c) is a rear view, and (d) is a plan view.

Alternatively, the yoke 40 shown in FIG. 45 may be realized. The yoke 40 shown in FIG. 45 also has substantially the same structure as the yoke 40 shown in FIG. 33.

Here, in FIG. 45, the yoke 40 in which the side wall 410, the top wall 420, and the bottom wall 430 are integrated is used, and the entire yoke 40 is separated from the outer surface of the movable contact maker 322 in such a state that the yoke 40 is arranged so as to surround the movable contact maker 322.

That is, in FIG. 45, a gap is formed between the yoke 40 and movable contact maker 322.

This also makes it possible to concentrate the magnetic flux B near the outer surface of the movable contact maker 322, and it is possible to increase the intensity of the magnetic flux B acting on the arc A.

Note that, in the above embodiment and its modifications, the yoke 40 is arranged adjacent to the body part (first body part) 312 or the movable contact maker (second body part) 322 as an example. That is, the yoke 40 is arranged adjacent to only one of the first body part 312 and the second body part 322 as an example.

However, the configuration of the contact device 30 is not limited to the configuration in which the yoke 40 is arranged adjacent to only one body part, and the yoke 40 may be arranged adjacent to both of the body part (first body part) 312 and the movable contact maker (second body part) 322 (see FIGS. 46 to 49).

Further, in FIGS. 46 to 49, the body part (first body part) 312 and the movable contact maker (second body part) 322 are arranged so that the direction in which the current I flows in the region R1 of the body part (first body part) 312 is different from the direction in which the current I flows in the region R1 of the movable contact maker (second body part) 322. That is, the body part (first body part) 312 and the movable contact maker (second body part) 322 are arranged so that an angle formed between the vector of the current I flowing through the body part (first body part) 312 and the vector of the current I flowing through the movable contact maker (second body part) 322 is larger than 0° and less than or equal to 180°.

Here, the region R1 is a region where the body part (first body part) 312 and the movable contact maker (second body part) 322 overlap each other when viewed along the axis in which the fixed contact (first contact) 311 and the movable contact (second contact) 321 move relative to each other.

Figure 46:
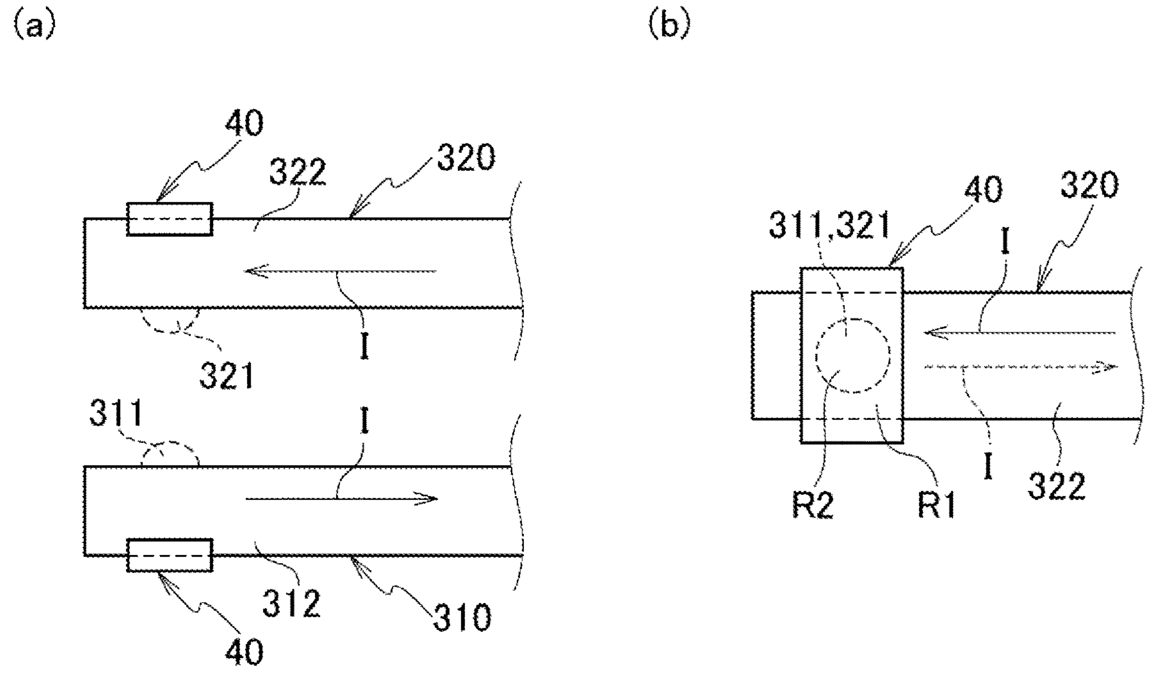
FIG. 46 includes schematic diagrams illustrating a state in which an angle formed by a direction of a current flowing through a body part on which a yoke is arranged and a direction of a current flowing through a movable contact maker on which another yoke is arranged becomes 180 degrees, where (a) is a diagram viewed along an axis crossing a movement axis of the movable contact maker, and (b) is a diagram viewed along the movement axis of the movable contact maker.

In FIG. 46, an angle formed between the direction of the current I flowing through the body part (first body part) 312 in which the yoke 40 is arranged and the direction of the current I flowing through the movable contact maker (second body part) 322 in which the other yoke 40 is arranged is 180° as an example. That is, the body part (first body part) 312 and the movable contact maker (second body part) 322 are arranged so that the current I flowing through the body part (first body part) 312 and the current I flowing through the movable contact maker (second body part) 322 flow in opposite directions to each other.

Figure 47:
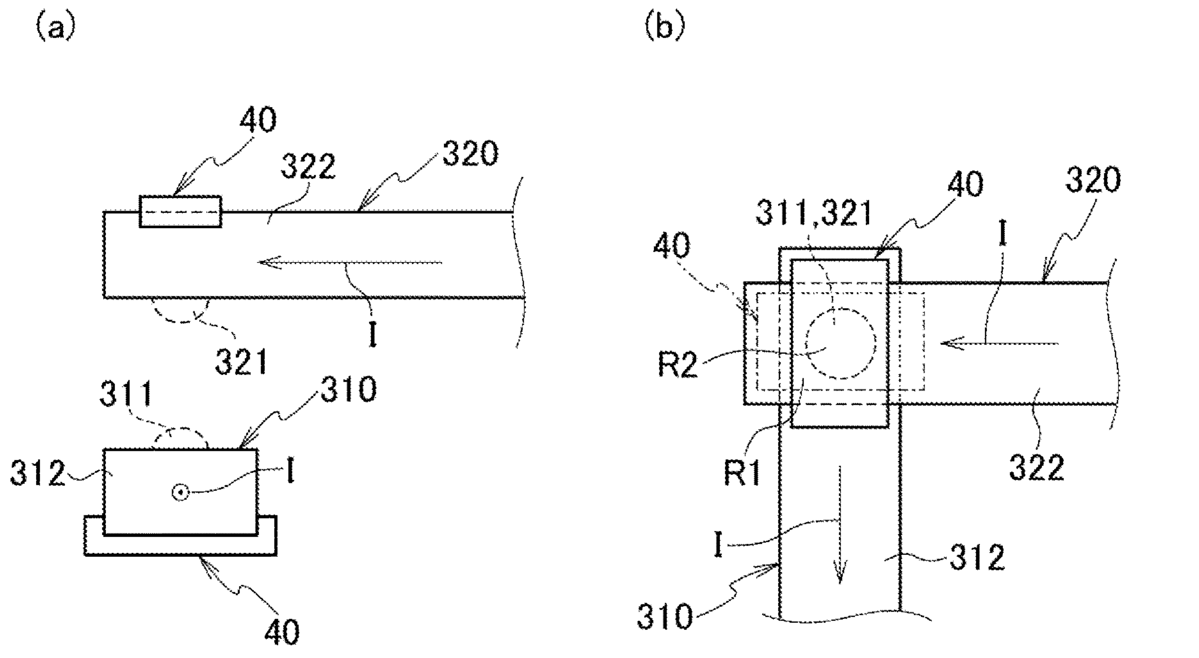
FIG. 47 includes schematic diagrams illustrating a state in which an angle formed by a direction of a current flowing through a body part on which a yoke is arranged and a direction of a current flowing through a movable contact maker on which another yoke is arranged becomes 90 degrees, where (a) is a diagram viewed along an axis crossing a movement axis of the movable contact maker, and (b) is a diagram viewed along the movement axis of the movable contact maker.

In FIG. 47, an angle formed between the direction of the current I flowing through the body part (first body part) 312 in which the yoke 40 is arranged and the direction of the current I flowing through the movable contact maker (second body part) 322 in which the other yoke 40 is arranged is 90° as an example. That is, the body part (first body part) 312 and the movable contact maker (second body part) 322 are arranged so that the current I flowing through the body part (first body part) 312 and the current I flowing through the movable contact maker (second body part) 322 flow in orthogonal directions to each other.

Figure 48:
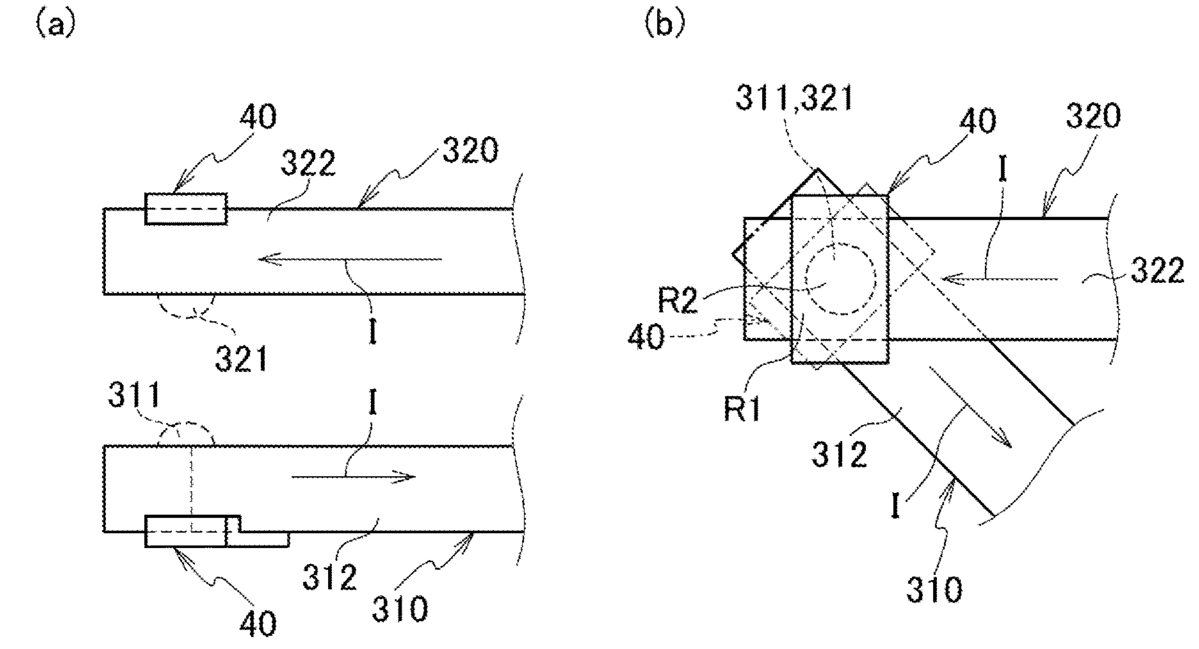
FIG. 48 includes schematic diagrams illustrating a state in which an angle formed by a direction of a current flowing through a body part on which a yoke is arranged and a direction of a current flowing through a movable contact maker on which another yoke is arranged becomes an obtuse angle, where (a) is a diagram viewed along an axis crossing a movement axis of the movable contact maker, and (b) is a diagram viewed along the movement axis of the movable contact maker.

In FIG. 48, an angle formed between the direction of the current I flowing through the body part (first body part) 312 in which the yoke 40 is arranged and the direction of the current I flowing through the movable contact maker (second body part) 322 in which the other yoke 40 is arranged is an obtuse angle (larger than 90° and less than 180°) as an example.

Figure 49:
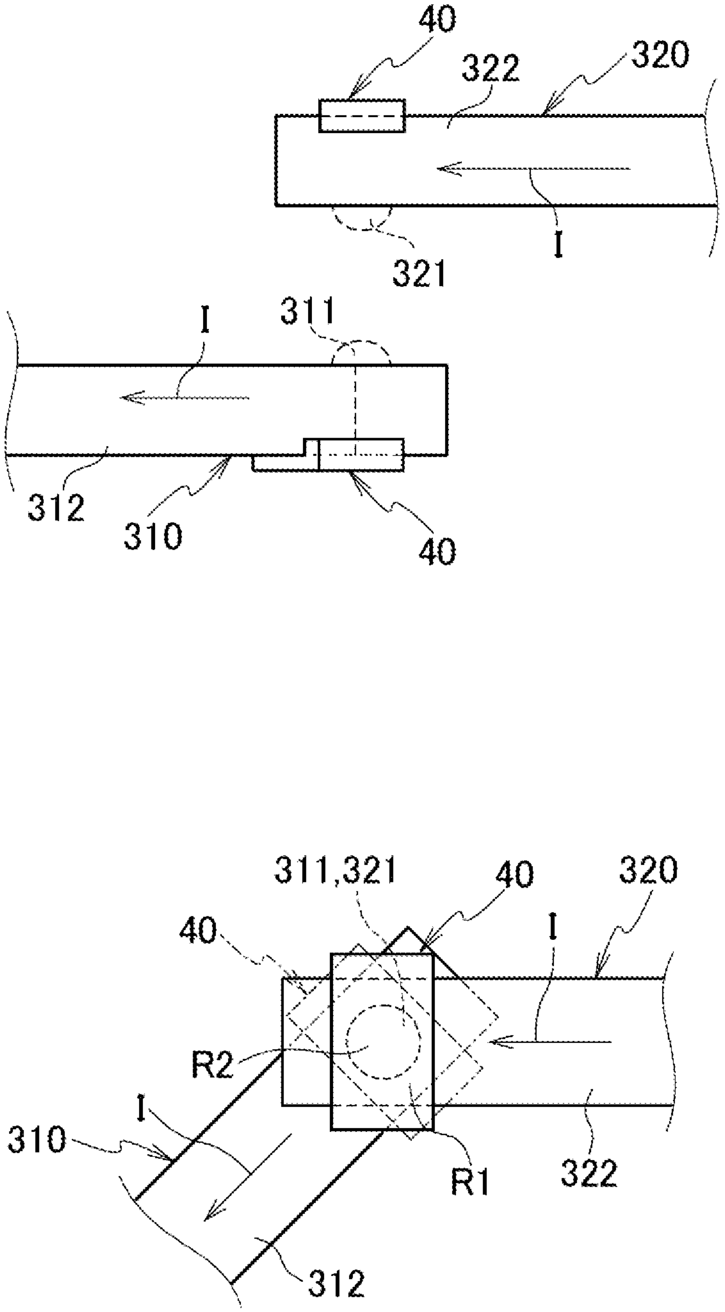
FIG. 49 includes schematic diagrams illustrating a state in which an angle formed by a direction of a current flowing through a body part on which a yoke is arranged and a direction of a current flowing through a movable contact maker on which another yoke is arranged becomes an acute angle, where (a) is a diagram viewed along an axis crossing a movement axis of the movable contact maker, and (b) is a diagram viewed along the movement axis of the movable contact maker.

In FIG. 49, an angle formed between the direction of the current I flowing through the body part (first body part) 312 in which the yoke 40 is arranged and the direction of the current I flowing through the movable contact maker (second body part) 322 in which the other yoke 40 is arranged is an acute angle (larger than 0° and less than 90°) as an example.

In this way, when the direction of the current flowing through each main body parts is different, it is possible to prevent the contact device 30 from increasing in size in one axis (for example, the direction of the current flowing through the first main body part).

Further, when the direction of the current flowing through each main body parts is different, it is preferable that an angle formed between the vectors of the two currents is larger than or equal to 90° and less than or equal to 180°.

This makes it possible to prevent the contact device 30 from increasing in size in one axis more reliably.

Note that, in FIGS. 46 to 49, the yokes 40 are arranged adjacent to both of the body part (first body part) 312 and the movable contact maker (second body part) 322 as an example, but the yoke 40 may be arranged adjacent to only one of the body part (first body part) 312 and the movable contact maker (second body part) 322. That is, it is possible that the direction of the current flowing through each main body parts is different, while being arranged the yoke 40 adjacent to only one of the body part (first body part) 312 and the movable contact maker (second body part) 322. This also makes it possible to prevent the contact device 30 from increasing in size in one axis.

[Action/Effect]

The following describes characteristic configurations of the contact device and the electromagnetic relay illustrated in the above embodiments and its modifications, and the effect obtained by the configurations.

(1) The contact device according to the present embodiment and modifications thereof includes a first contact, a second contact that is movable relative to the first contact and is brought into contact with or separated from the first contact, a first body part including the first contact, a second body part including the second contact, and a yoke arranged adjacent to at least one of the first body part or the second body part.

At least a part of the yoke is arranged along magnetic flux generated by a current flowing through one body part of the first body part and the second body part that is adjacent to the yoke, in a region where the first body part and the second body part overlap each other when viewed along an axis in which the first contact and the second contact move relative to each other while the first contact and the second contact are in contact with each other.

Thus, it is possible to concentrate the magnetic flux generated around the body part adjacent to the yoke in the yoke. Consequently, it is possible to increase the intensity of the magnetic flux generated around the body part adjacent to the yoke (the magnetic field is strengthened) and to extinguish the arcs generated between the first contact and the second contact in a more reliable and quick manner.

As described above, the present embodiment and its modifications make it possible to obtain a contact device capable of preventing the contacts from being affected by arcs in more reliable manner.

(2) In the contact device according to the above (1), the body part adjacent to the yoke may include a first surface that faces an opposing body part, and a second surface on an opposite side to the first surface that faces the opposing body part. The yoke may include a section arranged adjacent to the second surface.

Thus, it is possible to concentrate the magnetic flux generated around the body part adjacent to the yoke in the yoke in a more efficient manner.

It is possible to arrange the yoke around the body part without disturbing the contact and separation between the first contact and the second contact.

(3) In the contact device according to the above (1) or (2), the yoke may include a section that overlaps with a contact region in which the first contact and the second contact make contact with each other when viewed along the axis in which the first contact and the second contact move relative to each other.

Thus, it is possible to increase the intensity of the magnetic flux generated around the first contact and the second contact (the magnetic field is strengthened) and to extinguish the arcs generated between the first contact and the second contact in a more reliable and quick manner.

(4) In the contact device according to any one of the above (1) to (3), the yoke may be arranged to overlap with a contact of the body part adjacent to the yoke when viewed along the axis in which the first contact and the second contact move relative to each other.

Thus, it is possible to increase the intensity of the magnetic flux generated around the first contact and the second contact (the magnetic field is strengthened) and to extinguish the arcs generated between the first contact and the second contact in a more reliable and quick manner.

(5) In the contact device according to any one of the above (1) to (4), the body part adjacent to the yoke may include a first surface that faces an opposing body part, a second surface on an opposite side to the first surface that faces the opposing body part, and a third surface provided in continuation from the first surface and the second surface. The yoke may include a section arranged along the third surface.

Thus, it is possible to further concentrate the magnetic flux around the body part adjacent to the yoke. Consequently, it is possible to increase the intensity of the magnetic flux generated around the body part adjacent to the yoke (the magnetic field is strengthened) and to extinguish the arcs generated between the first contact and the second contact in a more reliable and quick manner.

(6) In the contact device according to (5), the section arranged along the third surface of the yoke may protrude outward from the first surface.

Thus, it is possible to increase the intensity of the magnetic flux acting on the arcs.

(7) In the contact device according to any one of the above (1) to (6), the yoke may include a section arranged spaced apart from an outer surface of the body part adjacent to the yoke.

Thus, the yoke is arranged in a space that is farther from the body part adjacent to the yoke and has a weaker intensity of the magnetic flux, and thus it is possible to concentrate the magnetic flux around the body part in a more efficient manner.

(8) In the contact device according to any one of the above (1) to (7), the yoke may be fixed to the body part adjacent to the yoke.

Thus, it is possible to prevent the yoke from being displaced from the body part and to concentrate the magnetic flux around the body part in a more reliable manner.

(9) In the contact device according to any one of the above (1) to (8), the first contact may include two first contacts, the second contact includes two second contacts, the first body part includes two first body parts, and the second body part includes one second body part. One second contact of the two second contacts may be brought into contact with and is separated from one first contact of the two first contacts, and the other second contact of the two second contacts is brought into contact with and is separated from the other first contact of the two first contacts, The two first contacts may be arranged side by side in an axis intersecting an axis in which the first contacts and the second contacts, which are brought into contact with and are separated from each other, move relative to each other. One of the two first body parts may have the one first contact, and the other of the two first body parts has the other first contact. The one second body part may include the two second contacts.

Thus, it is possible to obtain a contact device having a plurality of contacts that are brought into contact with and are separated from each other and capable of preventing the contacts from being affected by arcs in a more reliable manner.

(10) In the contact device according to the above (9), the yoke may include a first yoke arranged near where the one first contact and the one second contact, which are brought into contact with and are separated from each other, are located, and a second yoke arranged near where the other first contact and the other second contact, which are brought into contact with and are separated from each other, are located.

Thus, it is possible to concentrate the magnetic flux generated around the body part adjacent to the yoke around contacts on one end and around contacts on the other end.

(11) In the contact device according to the above (10), the yoke may include a connecting section connecting the first yoke and the second yoke.

Thus, even in the contact device including a plurality of contacts to be brought into contact with and be separated from each other, it is possible to arrange the yoke around the body part in an easier manner.

(12) In the contact device according to any one of the above (1) to (11), the first body part may include a first protrusion part that protrudes toward the second body part at an end part of the first body part in an axis crossing the axis in which the first contact and the second contact move relative to each other.

Thus, it is possible to move the discharge point (ignition point) on the first body part of the arc generated between the first contact and the second contact to the first protrusion.

(13) In the contact device according to the above (12), a tip of the first protrusion part may be located closer to the second body part than a tip of the first contact to the second body part.

Thus, it is possible to move the discharge point (ignition point) on the first body part of the arc generated between the first contact and the second contact to the first protrusion in a more reliable manner.

(14) In the contact device according to any one of the above (1) to (11), the second body part may include a second protrusion part that protrudes toward the first body part at an end part of the second body part in an axis crossing the axis in which the first contact and the second contact move relative to each other.

Thus, it is possible to move the discharge point (ignition point) on the second body part of the arc generated between the first contact and the second contact to the second protrusion.

(15) In the contact device according to the above (14), a tip of the second protrusion part may be located closer to the first body part than a tip of the second contact to the first body part.

Thus, it is possible to move the discharge point (ignition point) on the second body part of the arc generated between the first contact and the second contact to the second protrusion in a more reliable manner.

(16) In the contact device according to any one of the above (1) to (11), the first body part may include a first protrusion part that protrudes toward the second body part at an end part of the first body part in an axis crossing the axis in which the first contact and the second contact move relative to each other. The second body part may include a second protrusion part that protrudes toward the first body part at an end part of the second body part in an axis crossing the axis in which the first contact and the second contact move relative to each other.

Thus, it is possible to move the discharge point (ignition point) on the first body part of the arc generated between the first contact and the second contact to the first protrusion, and the discharge point (ignition point) on the second body part to the second protrusion. That is, it is possible to pull away the arcs generated between the first contact and the second contact from the first contact and second contact.

(17) In the contact device according to the above (16), a tip of the second protrusion part may be located outside a tip of the first protrusion part in an axis intersecting the axis in which the first contact and the second contact move relative to each other.

Thus, it is possible to pull away the arcs generated between the first contact and the second contact from the first contact and the second contact while extending outward in an axis intersecting the axis in which the first contact and the second contact move relative to each other and toward the first body.

(18) In the contact device according to the above (16), a tip of the second protrusion part may be located inside a tip of the first protrusion part in an axis intersecting the axis in which the first contact and the second contact move relative to each other.

Thus, it is possible to pull away the arcs generated between the first contact and the second contact from the first contact and the second contact while extending outward in an axis intersecting the axis in which the first contact and the second contact move relative to each other and toward the second body part.

(19) In the contact device according to any one of the above (16) to (18), a tip of the first protrusion part may be located closer to the second body part than a tip of the first contact to the second body part.

Thus, it is possible to move the discharge point (ignition point) on the first body part of the arc generated between the first contact and the second contact to the first protrusion in a more quick and reliable manner.

(20) In the contact device according to any one of the above (16) to (19), a tip of the second protrusion part may be located closer to the first body part than a tip of the second contact to the first body part.

Thus, it is possible to move the discharge point (ignition point) on the second body part of the arc generated between the first contact and the second contact to the second protrusion in a more quick and reliable manner.

(21) In the contact device according to any one of the above (1) to (20), the yoke may be arranged adjacent to only one of the first body part and the second body part.

Thus, it is possible to extinguish the arcs generated between the first contact and the second contact in a more reliable and quick manner with a simpler configuration.

(22) In the contact device according to any one of the above (1) to (20), the yoke may include a plurality of yokes arranged adjacent to the first body part and the second body part.

Thus, it is possible to increase the intensity of the magnetic flux acting on the arcs.

(23) In the contact device according to any one of the above (1) to (22), a direction of a current flowing through the first body part may be different from a direction of a current flowing through the second body part in a region where the first body part and the second body part overlap when viewed along the axis in which the first contact and the second contact move relative to each other.

Thus, it is possible to prevent the contact device from being enlarged in one axis.

(24) An electromagnetic relay according to the present embodiment is an electromagnetic relay including the contact device according to any one of the above (1) to (23).

Thus, it is possible to obtain an electromagnetic relay equipped with the contact device capable of performing the actions and effects described in the above (1) to (23).

[Others]

Although the contents of the contact device and the electromagnetic relay according to the present disclosure have been described above, it is obvious to those skilled in the art that various modifications and improvements are possible without being limited to the description.

For example, configurations illustrated in the above-described embodiment and its modifications may be combined in a suitable manner.

Although the above embodiment and its modifications exemplify a contact device provided with only one pair of the fixed contact portions 310 and the movable contact portion 320 that are paired with each other (having contacts that contact each other and separate from each other), the contact device may be provided with multiple pairs.

The specification of the first body part, the second body part, and other details (shape, size, layout, and the like) can be changed in a suitable manner.

The present application claims priority under Japanese Patent Application No. 2020-036026 filed Mar. 3, 2020, and the entire contents thereof are incorporated herein by reference.

INDUSTRIAL APPLICABILITY

According to the present disclosure, it is possible to obtain a contact device capable of preventing the contacts from being affected by arcs in a more reliable manner, and an electromagnetic relay equipped with the contact device.

The invention claimed is:

1. A contact device, comprising:

an electromagnet device including a coil and an iron core to be magnetized by the coil;

an armature arranged to face the iron core and arranged to be swingable by a magnetic field generated by the coil;

a first contact;

a second contact that is movable relative to the first contact by the armature swings and is brought into contact with or separated from the first contact;

a first body part including the first contact;

a second body part including the second contact; and a yoke fixed to at least one of a surface of the first body part, which is a surface opposite to the surface to face the second body part or a surface of the second body part, which is a surface opposite to the surface to face the first body part, wherein at least a part of the yoke is arranged along magnetic flux generated by a current flowing through one body part of the first body part and the second body part that is fixed to the yoke, in a region where the first body part and the second body part overlap each other when viewed along an axis in which the first contact and the second contact move relative to each other while the first contact and the second contact are in contact with each other.

2. The contact device according to claim 1, wherein the body part fixed to the yoke includes a first surface that faces an opposing body part, and a second surface on an opposite side to the first surface that faces the opposing body part, and the yoke includes a section arranged adjacent to the second surface.

3. The contact device according to claim 1, wherein the yoke includes a section that overlaps with a contact region in which the first contact and the second contact make contact with each other when viewed along the axis in which the first contact and the second contact move relative to each other.

4. The contact device according to claim 1, wherein the yoke is arranged to overlap with a contact of the body part fixed to the yoke when viewed along the axis in which the first contact and the second contact move relative to each other.

5. The contact device according to claim 1, wherein the body part fixed to the yoke includes a first surface that faces an opposing body part, a second surface on an opposite side to the first surface that faces the opposing body part, and a third surface provided in continuation from the first surface and the second surface, and the yoke includes a section arranged along the third surface.

6. The contact device according to claim 5, wherein the section arranged along the third surface of the yoke protrudes outward from the first surface.

7. The contact device according to claim 1, wherein the yoke includes a section arranged spaced apart from an outer surface of the body part fixed to the yoke.

8. The contact device according to claim 1, wherein the first contact includes two first contacts, the second contact includes two second contacts, the first body part includes two first body parts, and the second body part includes one second body part, one second contact of the two second contacts is brought into contact with and is separated from one first contact of the two first contacts, and the other second contact of the two second contacts is brought into contact with and is separated from the other first contact of the two first contacts, the two first contacts are arranged side by side in an axis intersecting an axis in which the first contacts and the second contacts, which are brought into contact with and are separated from each other, move relative to each other, one of the two first body parts has the one first contact, and the other of the two first body parts has the other first contact, and the one second body part includes the two second contacts.

9. The contact device according to claim 8, wherein the yoke includes a first yoke arranged near where the one first contact and the one second contact, which are brought into contact with and are separated from each other, are located, and a second yoke arranged near where the other first contact and the other second contact, which are brought into contact with and are separated from each other, are located.

10. The contact device according to claim 9, wherein the yoke includes a connecting section connecting the first yoke and the second yoke.

11. The contact device according to claim 1, wherein the first body part includes a first protrusion part that protrudes toward the second body part at an end part of the first body part in an axis crossing the axis in which the first contact and the second contact move relative to each other.

12. The contact device according to claim 11, wherein a tip of the first protrusion part is located closer to the second body part than a tip of the first contact to the second body part.

13. The contact device according to claim 1, wherein the second body part includes a second protrusion part that protrudes toward the first body part at an end part of the second body part in an axis crossing the axis in which the first contact and the second contact move relative to each other.

14. The contact device according to claim 13, wherein a tip of the second protrusion part is located closer to the first body part than a tip of the second contact to the first body part.

15. The contact device according to claim 1, wherein the first body part includes a first protrusion part that protrudes toward the second body part at an end part of the first body part in an axis crossing the axis in which the first contact and the second contact move relative to each other, and the second body part includes a second protrusion part that protrudes toward the first body part at an end part of the second body part in an axis crossing the axis in which the first contact and the second contact move relative to each other.

16. The contact device according to claim 1, wherein the yoke is arranged adjacent to only one of the first body part and the second body part.

17. The contact device according to claim 1, wherein the yoke includes a plurality of yokes arranged adjacent to the first body part and the second body part.

18. The contact device according to claim 1, wherein a direction of a current flowing through the first body part is different from a direction of a current flowing through the second body part in a region where the first body part and the second body part overlap when viewed along the axis in which the first contact and the second contact move relative to each other.

19. An electromagnetic relay, comprising: the contact device according to claim 1.

* * * * *